United States Patent
Boskovich

(10) Patent No.: US 10,939,182 B2
(45) Date of Patent: Mar. 2, 2021

(54) METHODS AND APPARATUS FOR MEDIA SEARCH, CHARACTERIZATION, AND AUGMENTED REALITY PROVISION

(71) Applicant: WowYow, Inc., San Diego, CA (US)

(72) Inventor: Adam Boskovich, San Diego, CA (US)

(73) Assignee: WowYow, Inc., San Diego, CA (US)

( * ) Notice: Subject to any disclaimer, the term of this patent is extended or adjusted under 35 U.S.C. 154(b) by 0 days.

(21) Appl. No.: 16/258,312

(22) Filed: Jan. 25, 2019

(65) Prior Publication Data

US 2019/0238952 A1    Aug. 1, 2019

Related U.S. Application Data

(60) Provisional application No. 62/624,692, filed on Jan. 31, 2018.

(51) Int. Cl.
*H04N 21/81* (2011.01)
*H04N 21/2668* (2011.01)
(Continued)

(52) U.S. Cl.
CPC ....... *H04N 21/8133* (2013.01); *G06F 16/433* (2019.01); *G06K 9/00201* (2013.01);
(Continued)

(58) Field of Classification Search
CPC ............. H04N 21/8133; H04N 21/858; H04N 19/114; H04N 21/2668; H04N 19/61;
(Continued)

(56) References Cited

U.S. PATENT DOCUMENTS 6,099,319 A    8/2000  Zaltman et al.
6,228,038 B1   5/2001  Claessens
(Continued)

FOREIGN PATENT DOCUMENTS

KR    20090091546 A    8/2009
WO    WO-2009111699 A2  9/2009

OTHER PUBLICATIONS

IEEE Std. 802.11 standard.
(Continued)

*Primary Examiner* — Cythnia M Gogg
(74) *Attorney, Agent, or Firm* — Gazdzinski & Associates, PC

(57) ABSTRACT

Methods and apparatus for providing attribute-based search of media assets such as video and audio assets, and associated augmented reality functions including dynamic provision of relevant secondary content relating to the identified attribute(s). In one embodiment, media or content assets are ingested into a processing system and processed according to one or more attribute detection, identification, and characterization algorithms. Attributes detected may include for example the presence of tangible items such as clothing or chattels, particular persons such as celebrities, and/or certain contexts such as sporting activities and musical performances, as rendered within the media asset. In one implementation, the characterized assets are provided a unique ID, and stored so as to permit cross-correlation based on, e.g., the identified and characterized attributes. Secondary content (e.g., advertising or promotional content) is correlated to each identified asset, and dynamically served upon a user providing some threshold level of interaction with the attribute.

18 Claims, 19 Drawing Sheets

(51) Int. Cl.
*H04N 21/858* (2011.01)
*G06F 16/432* (2019.01)
*G06K 9/00* (2006.01)
*H04N 19/114* (2014.01)

(52) U.S. Cl.
CPC ....... *H04N 19/114* (2014.11); *H04N 21/2668* (2013.01); *H04N 21/858* (2013.01)

(58) Field of Classification Search
CPC ............... H04N 19/46; H04N 21/4728; H04N 21/23418; H04N 21/44008; H04N 5/23219; H04N 5/23229; G06K 9/00201; G06F 16/433
USPC .......................................................... 725/32
See application file for complete search history.

(56) References Cited

U.S. PATENT DOCUMENTS

| | | | |
|---|---|---|---|
| 6,698,020 B1 | 2/2004 | Zigmond et al. | |
| 7,158,676 B1 | 1/2007 | Rainsford | |
| 7,325,245 B1 | 1/2008 | Clapper | |
| 7,711,770 B2 | 5/2010 | Purvis et al. | |
| 8,196,164 B1 * | 6/2012 | Oztaskent | H04N 21/435 725/137 |
| 9,043,828 B1 * | 5/2015 | Jing | H04N 21/258 358/1.6 |
| 2002/0083469 A1 | 6/2002 | Jeannin et al. | |
| 2005/0137958 A1 | 6/2005 | Huber et al. | |
| 2006/0053048 A1 | 3/2006 | Tandetnik | |
| 2008/0033812 A1 | 2/2008 | McKenna et al. | |
| 2008/0074424 A1 | 3/2008 | Carignano | |
| 2008/0097854 A1 | 4/2008 | Young | |
| 2008/0163283 A1 | 7/2008 | Tan et al. | |
| 2008/0294694 A1 | 11/2008 | Maghfourian et al. | |
| 2008/0304805 A1 | 12/2008 | Baharav et al. | |
| 2008/0307454 A1 | 12/2008 | Ahanger et al. | |
| 2009/0006213 A1 | 1/2009 | Lerman et al. | |
| 2009/0024447 A1 | 1/2009 | Pradeep et al. | |
| 2009/0025023 A1 | 1/2009 | Pradeep et al. | |
| 2009/0079871 A1 | 3/2009 | Hua et al. | |
| 2009/0083129 A1 | 3/2009 | Pradeep et al. | |
| 2009/0143881 A1 | 6/2009 | Smyers | |
| 2009/0327068 A1 | 12/2009 | Pradeep et al. | |
| 2010/0154007 A1 | 6/2010 | Touboul et al. | |
| 2010/0164989 A1 | 7/2010 | Margalit et al. | |
| 2010/0220112 A1 | 9/2010 | Evans | |
| 2010/0306058 A1 | 12/2010 | Johnson et al. | |
| 2011/0107368 A1 | 5/2011 | Rouse et al. | |
| 2011/0137753 A1 * | 6/2011 | Moehrle | H04N 21/2547 705/27.1 |
| 2012/0303466 A1 | 11/2012 | Boskovich | |
| 2014/0282644 A1 * | 9/2014 | Terrazas | H04N 21/44218 725/12 |
| 2015/0312649 A1 * | 10/2015 | Gopalan | H04N 21/23418 725/32 |

OTHER PUBLICATIONS

Wi-Fi Direct (includingi *inter alia*, the Wi-Fi Peer-to-Peer (P2P) Specification.
*Inter ali, Internet Protocol DARPA Internet Program Protocol Specification*, IETF RCF 791 (Sep. 1981).
Deering et al., *Internet Protocol, Version 6 (IPv6) Specification*, IETF RFC 2460 (Dec. 1998).

* cited by examiner

FIG. 9

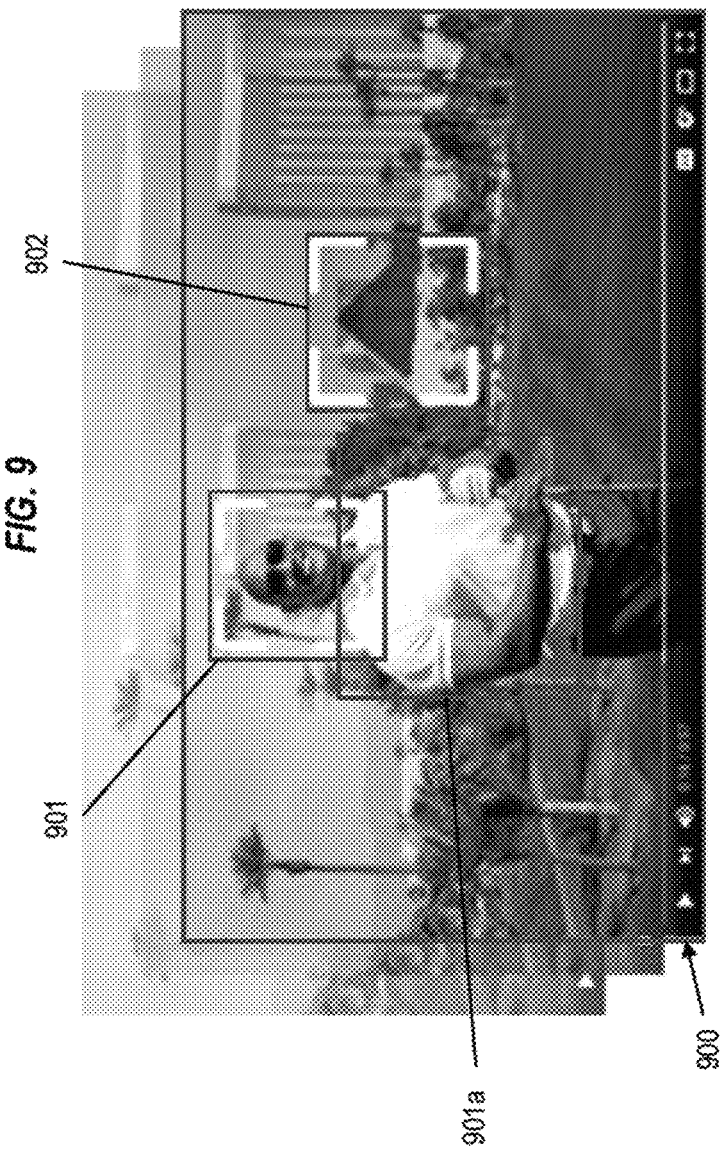

1. Base Object Detection -> text, person, place, other general descriptors
2. Person -> Coordinates -> Face -> Coordinates -> Crop Face -> Gender -> Human Color Tone
   -> Face Pool Compare = First Name, Last Name = Dwayne Johnson
3. Person -> Coordinates -> Upper Body -> Coordinates -> Crop Upper -> Color ->
   -> Use Contextual Relevancy Engine
   = Gender, Dwayne Johnson, Highest % Color Fill -> Object Pool Compare
   = Men's White Polo Shirt

METHODS AND APPARATUS FOR MEDIA SEARCH, CHARACTERIZATION, AND AUGMENTED REALITY PROVISION

PRIORITY AND RELATED APPLICATIONS

This application claims the benefit of and priority to and U.S. Provisional Patent Application No. 62/624,692 filed on Jan. 31, 2018 and of the same title, which is incorporated herein by reference in its entirety.

This application is related to co-owned and co-pending U.S. patent application Ser. No. 13/472,406 filed May 15, 2012 and entitled "Shape-based Advertising for Electronic Visual Media," which claims priority to both U.S. Provisional Patent Application Ser. No. 61/490,894, entitled "Shape-Based Advertising for Visual Media" and filed on May 27, 2011, and U.S. Provisional Patent Application Ser. No. 61/536,535, entitled "Shape-Based Advertising for Visual Media" and filed on Sep. 19, 2011, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of computerized media processing and augmented reality, in one or more exemplary embodiments, to shape-based advertising for visual media.

2. Description of Related Technology

Marketers use a myriad of ways via computers and other computerized devices to present promotional or advertising information relating to products and services to users. Notably, many web pages use banner ads, pay-for-placement ads, and pop-up advertisements to generate revenue through advertising. Moreover, with different wired and wireless networks in place including capabilities ranging from very short range (e.g., so-called PANs or personal area networks) to longer range cellular and WMAN (wireless metropolitan area network), to broadband capability via e.g., coaxial cable and optical fiber, and a multitude of fixed or portable devices capable of connecting and interconnecting via those many networks, the possible ways of receiving advertising or other such "secondary content" on such devices has increased dramatically with time.

However, all of the foregoing types of secondary content rely on planning and creating the text, graphics, audio and/or video to use specifically for the marketed product or service and the targeted audience. This type of advertising is very costly and time consuming to create, and based on the efficacy of the targeting process, may not be applicable broadly to consumers of the secondary content.

For media content publishers (e.g., operators of news or other websites which integrate primary content from a variety of sources) and advertisers alike, a major issue is how to more accurately target population segments for advertising or promotional campaigns based on particular characteristics of an audience so that broad (or at least broader) applicability of the secondary content is achieved. So-called "targeted" advertisements are pushed to the user based on e.g., prior interactions of that user with various sites, demographic data, or other logic, rather than any affirmative expression of interest in the particular subject matter by the user. In effect, targeted advertisements attempt to predict what secondary content a user might be interested in, and pre-place such secondary content within a web page, video, streaming television program, etc., such that the user is presented with it upon accessing the web page or video.

Publishers and advertisers may also "manually" analyze primary content for its content (and associated contexts reflected therein) so as to better target their secondary content; e.g., cause placement of a contextually relevant ad within or before a primary content asset, such that a viewer's putative interest in the primary content will have a "spill-over" effect and generate at least some level of interest in the secondary content. However, this process is highly labor-intensive, and does not scale well to large numbers of assets, such as shorter YouTube or similar videos which have proliferated on the web in recent years. Such videos may have widely ranging themes, different formats and encodings (and hence utilize different media player application for rendering), highly variable quality (e.g., some may have high production values, while others are basically user-generated content from their smartphone or the like). Literally millions of such videos now populate the web, and based especially on their high turnover and/or update rates, are not amenable to any meaningful analysis by manual (prior art) means alone.

Moreover, the foregoing needs and desires of the publishers and advertisers to provide secondary content to users (whether targeted or not) must be balanced against the needs and desires of their customers (users or subscribers of the websites or primary content, and consumers of the goods and services), in that it is ultimately end user/subscriber satisfaction which keeps a given individual or household or business using that publisher's content, or purchasing the advertised goods or services.

One facet of this user/subscriber satisfaction relates to not unnecessarily inundating the subscriber with advertisements or promotions. User or subscriber frustration can readily result from, e.g.: (i) repetition of the same advertisement or promotion over and over, especially within a comparatively short period; (ii) advertisements or promotions which are unduly long (whether taken individually, or in combination with other advertisements or promotions), so as to keep a user away from the primary content (e.g., web videos, streaming television shows, movies, games, etc.); and/or (iii) advertising or promotional content which is not applicable or even inappropriate for viewing by a given user at, e.g., a specific time, or in general.

Moreover, users are generally not receptive to being "forced" to watch secondary content as a pre-condition or requirement of viewing the primary content; e.g., so-called "pre-roll" advertisements are often viewed as annoying, and either skipped when possible by the user, or cause the user to terminate viewing of the content stream even before the primary content begins.

Aside from the foregoing "frustration" aspect, many content viewers today simply pay less attention to video advertising or promotions, as they can often find a corresponding video on the same or another site that is less laden (or not laden) with associated advertising, such as via a simple search engine (e.g., Google®) search. Users may also simply walk away from their computer or television and/or engage in some other activity.

Notably, two of the most predominant forms of advertisements (pre-rolls and banner ads) have demonstrably low efficacy or penetration (sub-one (1) percent); however, spending on such advertising modalities unexplainably continues to increase with time.

Impressions—

So-called "impressions" (i.e., countable event relating to consumption of a given media asset) are widely used for a variety of purposes, including for example determining the efficacy or penetration of secondary content, assessing user interest in a product/service, and as a basis for charging advertisers for placement of their secondary content. These impressions may utilize data on a statistical or anecdotal basis; for example, impression data may be correlated to users on an individual basis (e.g., to determine whether User A actually viewed or interacted with Advertisement X), or alternatively may be drawn across a broader pool (e.g., via a statistical distribution of user interaction or viewing of advertisements broadcast in association with a television program or media stream).

Traditionally, a user selecting a given video or segment would be considered an impression, since it was historically the best indicator of a user actually (ostensibly) watching the video. For example, a web page showing ten (10) selectable videos/segments might not count a user viewing that web page as an "impression" (since there is no indication that that the user selected any of those videos at any point); however, the same user selecting a URL of one of the individual videos indicates at least an affirmative intent to call up the video (albeit not necessarily watch it in its entirety or even any significant part, especially where "pre-roll" advertising of the type previously described is utilized in conjunction with the selected video).

However, even if the user does select a given video, and even goes so far as to watch it in its entirety (including the pre-roll ad), there is no guarantee that: (i) the user was paying attention or was cognitive of any portion or element of the video (or pre-roll ad); (ii) assuming the user to have been cognate of the advertising, to have any actual level of interest in it; or (iii) assuming the user to have a level of interest in the advertisement, there was any interest in any particular aspect of the advertisement (e.g., they may have no interest in the product/service being advertised, but rather an attractive spokes-model or some other ancillary element. Moreover, they may simply have watched the ad to get to the real content of interest (the primary content), and may in fact have a negative view or opinion of that ad in particular, or any advertisements presented to them (in general).

While the aforementioned targeting has some efficacy at avoiding placement of wholly inappropriate advertisements (e.g., those for lipstick or women's clothing for a man), prior art targeting processes simply cannot "get inside the head" of a given user at a given moment in time. Individual user tastes may change with time (e.g., what they like or are interested in around a holiday or particular day in the week or time of their life may be of no interest to them at other times), and further may be subject to mood changes, recent purchases of similar goods or services (thereby obviating the desire to see advertising related thereto), and any other number of largely un-modeled factors that determine their particular response at any given point in time.

This shortfall underscores a fundamental problem with effectively all advertising or promotional platforms in use at present; i.e., they rely on a prognostication or modeling of in what a user is projected to have interest, as opposed to what the user actually has a viable interest in at that moment in time (i.e., when watching that specific video in that specific setting under the then-prevailing circumstances). One could, conceivably, actively canvass the user as to their actual interest at that point in time, but not only would this become highly tedious for users (and likely cause a decidedly negative reaction thereby), but also would be ineffective since it basically requires a user to recall and list anything they might be interested in with a degree of specificity that is wholly untenable, especially in a dynamic viewing environment such as online web browsing or video consumption.

"Telescoping" Information—

Generally related to advertising or promotions, informational forms of secondary content are often desired by users when perceiving a media asset; e.g., while watching a video or listening to a digital media stream, the user may wish to obtain additional information on a topic or element reflected within the media being rendered. For example, in a news video on recent events in a war-torn area, the user may wish to "telescope" for additional information on an airplane or piece of military hardware shown in the video. As is well known, so-called telescoping content enables the user to obtain additional information on a topic reflected within primary content while maintaining the context of the primary content. One more simple implementation of telescoping is found in online articles or documents; hyperlinks embedded within the primary content (e.g., news article) enable the user, upon selection thereof, to obtain ancillary or secondary content relating to the word or phrase with which the hyperlink is associated (e.g., a definition or pronunciation thereof, short informational blurb, etc., such as via a newly spawned or pop-up display window or viewport). Similarly, telescoping advertisements are extended advertising content (whether selected or automatically expanded) from a smaller and/or shorter version of an ad to a larger and/or longer version thereof.

While ostensibly more useful and relevant than banner advertisements or pre-roll advertisements (or other forms of allegedly targeted content), telescoping information also suffers from a number of drawbacks. Specifically, while hyperlinks to other URLs can be readily embedded in a news article or other textual representation of content, there is no current technique available for logically extending this model to video or audio media, other than use of targeted telescoping advertisements; i.e., where someone must use traditional targeting techniques, and insert secondary content into or along with the primary media content as a "branch-off point" for the additional information. For example, a telescoped video under the prior art may have a banner or window associated therewith such that a user can select the banner or window (or a portion thereof) using their input device—e.g., click on the banner—to invoke instantiation of a new window or applet with more information about the topic of the banner. This approach suffers from the same disabilities as described above, including possible annoyance to a user (as well as obfuscation of a portion of the display), and reliance on a priori sources of information such as demographics, prior user interactions, etc. to predict or estimate a user's interest in the topic.

Moreover, such telescoping secondary content may not have any temporal contextual relationship with the primary content. A pre-roll ad that can telescope, even if contextually related to one or more contexts of the primary content (e.g., a gold club ad pre-rolled for a golf instructional video having a celebrity instructor), will not be synchronized with the appearance of the corresponding element(s) within the primary content, where/when it would be most effective.

Cloud-Based Functions

In order to gain operational and economic efficiencies, technology stacks have over time generally migrated towards the "cloud" or network side of content delivery networks, and away from the end user (client) consuming devices. Hence, the client device's content presentation capabilities are dictated increasingly by these cloud-based functions (including network-side caching architecture), along with the on-board storage and processing power of the client device and its associated software stack.

For example, Internet websites are increasingly configured to provide a streamlined user experience, reduced device processing and storage footprint, and a consistent and simple mechanism for software upgrades across multiple different types of HW/SW platforms (e.g., different OEM devices). For instance, HTML 5-based cloud apps are increasingly replacing native apps (i.e., those incorporated into the design of the device at time of manufacture) for implementing such functions.

However, implementations of certain websites are growing more labor intensive for the client, due largely to the need for client processes or functions (e.g., web browsers) to interface with network-side entities or processes to obtain content, imagery, "look and feel" elements, audio, etc., as opposed to being indigenously generated by the client. Specifically, the website elements (e.g., graphics, images, text, etc.) are served by typically multiple different sources (servers), and any advertisements come from yet another location. This approach can present several challenges in performance, specifically with respect to latency associated with transitions from one video or content source to another, from one type of content to another, as well as advertising content service and transitions.

Based on the foregoing, improved apparatus and methods are needed to address the shortfalls of current secondary content (e.g., advertising or promotions, or informational content) targeting and provision mechanisms, such as banner advertisements or pop-up windows or pre-roll video or audio ads. Such improved apparatus and methods would ideally more accurately divine a particular user's interest in attributes or aspects of media content in a dynamic fashion, such that the user could be seamlessly provided with relevant secondary content of interest within the then-prevailing cognitive context (e.g., within the same video asset, same audio stream, etc.), and without significant latency.

Moreover, content publishers and advertisers (as well as, inter alia, service providers such as broadband Internet or cellular service providers or the like) would be able to more accurately and efficiently target subsets or "slices" of the consuming public or market as to goods and services of interest, thereby increasing user/subscriber satisfaction, and enabling greater secondary content penetration, and utility to the consuming user(s).

SUMMARY

The present disclosure addresses the foregoing needs by providing, inter alia, methods and apparatus for media search, characterization, and augmented reality provision.

In one aspect, a computerized method for automatically providing a user with secondary content relating to a user-cognizable element present in a content asset, is disclosed. In one embodiment, the method includes: identifying a plurality of content assets; processing, using a plurality of computer programs, the plurality of content assets, the processing including: identifying at least one user-cognizable element within each of the plurality of identified content assets; characterizing each of the identified user-cognizable elements to generate characterizing data; assigning a unique identifier to each of the plurality of identified content assets; storing the generated characterizing data along with at least a portion of the unique identifier in a database; and forming an association between at least a portion of the stored generated characterizing data of at least one of the identified user-cognizable elements of at least one of the identified content assets and secondary content; receiving data indicating interest by a user in the at least one identified user-cognizable element; and based at least on the received data, causing provision of the secondary content to the user.

In one variant of the method, the plurality of identified content assets comprise digitally encoded video data having a plurality of I-Frames, P-Frames, and B-Frames; and the identifying at least one user-cognizable element within each of the plurality of identified content assets includes utilizing at least one shape recognition algorithm to analyze at least one I-Frame associated with the digitally encoded video data of each of the plurality of identified content assets.

In one implementation, the utilizing at least one shape recognition algorithm to analyze at least one I-Frame associated with the digitally encoded video data of each of the plurality of identified content assets includes: decoding the digital video data; identifying the at least one I-frame within the decoded digital video data; and utilizing the at least one polygonal shape recognition algorithm on data of the identified at least one I-frame to identify at least one polygon therein; and utilizing the identified at least one polygon to identify an attribute. The utilizing the identified at least one polygon to identify an attribute includes e.g., using one or more geometric relationships associated with the polygon to search a database of known geometric relationships associated with one or more tangible items.

In another variant, the processing, using a plurality of computer programs, the plurality of content assets, includes pre-processing the plurality of content assets during a first prescribed period of time and prior to a second, later prescribed period of time during which the pre-processed plurality of content assets are made available to one or more users.

In yet another variant, the receiving data indicating interest by a user in the at least one identified user-cognizable element includes receiving data generated by a JavaScript element operatively associated with an Internet website, the data received as part of an protocol (e.g., HTTP/HTTPS) session established between a computerized device of the user and at least one server apparatus.

In still a further variant, the receiving data indicating interest by a user in the at least one identified user-cognizable element includes receiving data generated by a JavaScript element operatively associated with an Internet website, the data generated based at least in part on a user performing at least one of the following via an input device of a computerized device utilized by the user: (i) causing, via the input device, a cursor to be located within a boundary of the at least one identified user-cognizable element that is rendered on a display device of the computerized device; and/or (ii) using the input device to pause rendering of the at least one identified content asset by the computerized device.

In yet another variant, the forming an association between at least a portion of the stored generated characterizing data of at least one of the identified user-cognizable elements of at least one of the identified content assets and secondary content includes: receiving data indicative of an identity of a tangible item; searching the generated characterizing data of the database based at least in part on the data indicative of the identity of the tangible item to identify one or more instances of the tangible item within the generated characterizing data; and associating the secondary content to the identified one or more instances, the secondary content comprising digitally rendered content relating to the tangible item.

In a further variant, the identifying at least one user-cognizable element within each of the plurality of identified content assets includes: decoding an audio stream of each of the plurality of identified content assets; and processing the decoded audio stream of each of the plurality of identified content assets to identify at least one user-cognizable audio element within each; and the characterizing each of the identified user-cognizable elements to generate characterizing data includes characterizing each of the identified user-cognizable audio elements based on a plurality of tones or sounds therein, the plurality of tones or sounds corresponding to at least one of a (i) trademark or service mark, and/or (ii) a trade dress element, associated with a particular good or service.

In another aspect of the disclosure, a computerized system for media processing, analysis, and selective provision of secondary content is disclosed. In one embodiment, the computerized system includes: a computerized server apparatus; a database in data communication with the computerized server apparatus; and a customer portal environment operative to execute on a computerized device of one or more customers of an operator of the system. The computerized server apparatus includes in one variant an API (application programming interface) by which computerized user devices (e.g., smartphones, tablets, laptops/desktops, smart TVs, etc.) can, via a lightweight script operative to execute on a network site accessed by the computerized devices, transparently access augmented reality (AR) information including secondary content associated with one or more identifiable elements within data frames or containers of media assets accessed on the network site and rendered by the computerized user device.

In one implementation, the server apparatus includes a plurality of servers operating in logical and data communication with one another so as to enable substantially real time (near-real time) processing of user-selected media assets so as to identify an characterize the identifiable elements, and dynamically return related secondary content to the user while the rendering of the media asset occurs.

In another aspect of the disclosure, a computerized controller apparatus for use with a media processing system is disclosed. In one embodiment, the controller apparatus is configured to control, inter alia, selection and processing of media assets and inventory within the system, and includes: a processor apparatus; and a storage apparatus in data communication with the processor apparatus and having a non-transitory computer-readable storage medium, the storage medium comprising at least one computer program having a plurality of instructions stored thereon. In another embodiment, the controller apparatus is implemented as software or firmware resident on another computerized device (such as a back-end server of the aforementioned system) and configured to execute thereon.

In another aspect, methods and apparatus for shape-based analysis of digital visual media are presented.

In yet a further aspect, methods and apparatus for color-based analysis of digital visual media are presented.

In still a further aspect, methods and apparatus for texture-based analysis of digital visual media are presented.

In another aspect, methods and apparatus for audio-based analysis of digital audio media is presented. In one variant, the audio analysis is of a temporally associated audio track that is part of a digitally rendered video encoding. In another variant, the audio analysis is of a digitally rendered audio media encoding (e.g., MP3 or MP4) or audio media stream only.

In yet another aspect, methods and apparatus for context determination with digital visual and/or audio media asset are presented. In one embodiment, the methods and apparatus utilize speech recognition (SR) of audio track portions temporally correlated to frames or GOPs of the corresponding video data having the detected identifiable elements (e.g., goods, services, logos, etc.) to determine context. In another embodiment, textual and/or metadata associated with the media asset is utilized for context determination.

In another aspect, computer readable apparatus comprising media adapted to contain one or more computer programs is disclosed. In one embodiment, the program has a plurality of instructions, which, when executed, selectively process media assets to identify attributes or elements within video data frames and/or audio data frames or containers.

In another aspect, a computerized method of doing business is disclosed. In one embodiment, the method includes providing a cloud-based customer portal generatable on a customer client device, enabling users thereof to obtain data including listings of media assets within which one or more identifiable elements are rendered, and associate secondary content to one or more of the identifiable elements.

In a further aspect, a plug-in code module is disclosed. In one embodiment, the plug-in code module comprises a lightweight module comprising a JavaScript-based code script configured for utilization on an Internet website, or in association with a web page thereof. In one variant, the script is used with a media player application and is configured to, when executed: receive data generated through use of an input device of a computerized user device (e.g., mouse, or capacitive/resistive touch screen, or speech recognition algorithm) indicative of user interaction with a prescribed frame or element of a media asset being rendered via the website (e.g., via a player or codec within the user's local Internet browser application).

In yet another aspect, a method of ensuring anonymity and privacy relating to media assets is disclosed. In one embodiment, the method includes utilizing a cryptographic mechanism such as a one-way cryptographic hash of at least one asset or source identifier, so that back-end users of the system portal have restricted access to data or other information of particular assets (i.e., to only that specifically provided by the system operator).

In an additional aspect, a method of providing media player-agnostic processing of media data is disclosed.

In yet another aspect, a method of utilizing a sponsorship relationship in a computerized secondary content system is disclosed. In one embodiment, the method includes: (i) identifying a sponsorship or other association between an individual or entity and a source of goods or services; (ii) using a computerized process to process a plurality of media assets to identify instances of the individual or entity within the plurality of media assets, and (iii) enabling one or more computerized interactive elements within the identified media assets with respect to targeted secondary content of the source.

In one variant, the method includes using the computerized process to identify both: (a) instances of the individual or entity, and (b) instances of the goods or service services, or the source (e.g., a logo or recognizable trade dress or mark thereof), within the same media asset; and enabling one or more computerized interactive elements within the identified media assets with respect to targeted secondary content of the source, the one or more computerized interactive elements corresponding to the instances of the goods or service services, or the source.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 9 is graphical representation illustrating exemplary visual object parsing and processing according to the present disclosure.

FIG. 9a-1 is logical flow diagram illustrating one embodiment of a media visual object processing routine hierarchy selection within the method of FIG. 9a.

FIG. 9a-2 is logical flow diagram illustrating one embodiment of a media visual object routine execution within the method of FIG. 9a-1.

Figure 1:
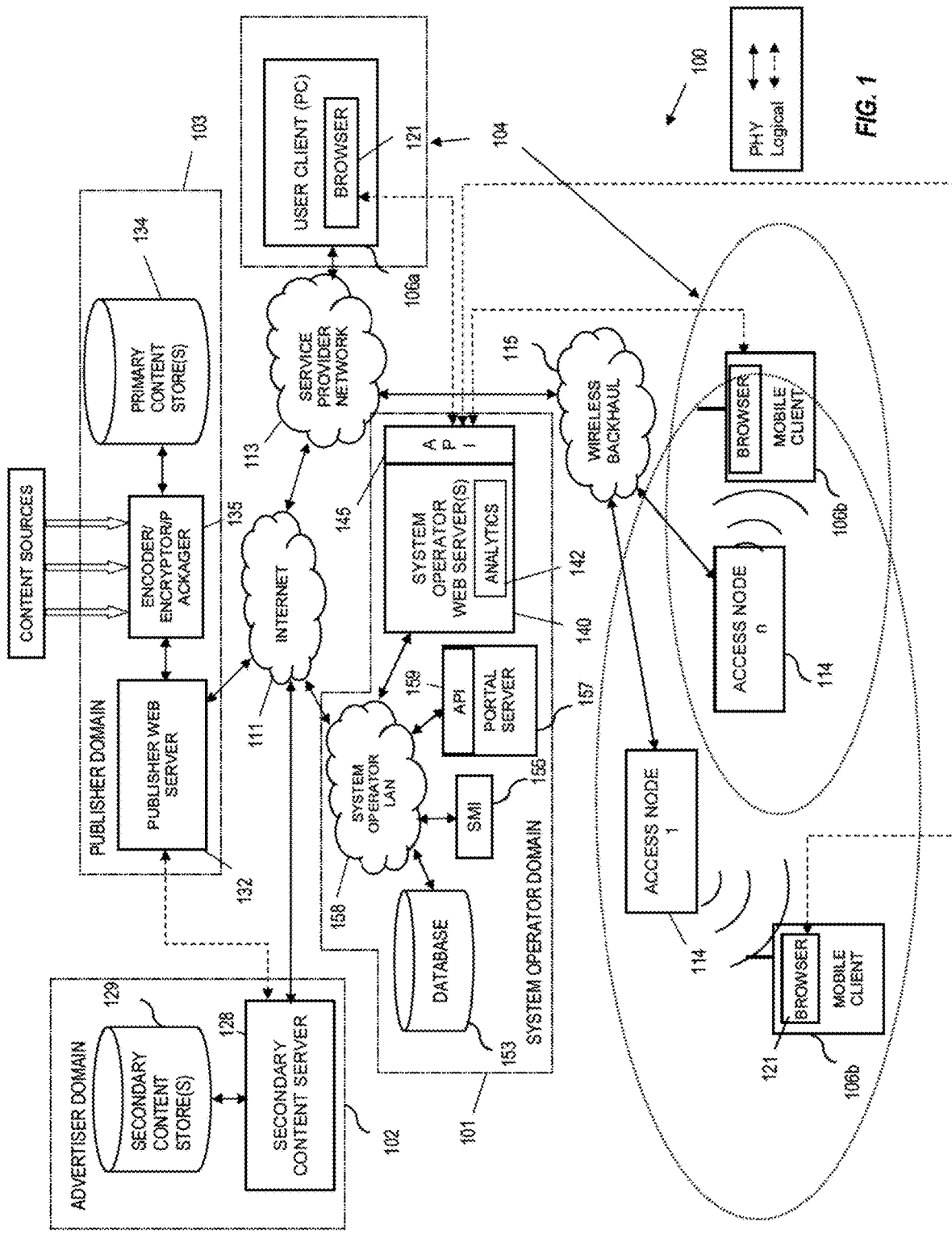
FIG. 1 is a functional block diagram illustrating an exemplary embodiment of a secondary content processing and management architecture according to the present disclosure.

Figures © Copyright 2017-2018 WowYow Inc. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example an LTE femtocell or eNB, Wi-Fi AP, or a Wi-Fi-Direct enabled client or other device acting as a Group Owner (GO).

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "client device" or "user device" include, but are not limited to, set-top boxes (e.g., DSTBs), gateways, modems, personal computers (PCs), and mini-computers, whether desktop, laptop, or otherwise, and mobile devices such as handheld computers, PDAs, personal media devices (PMDs), tablets, "phablets", smartphones, smart TVs, USB-based devices, and vehicle infotainment or navigation systems. Client devices or UEs may also comprise one or more IoT devices (defined below).

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like. Such displays may also have integrated or associated input devices (e.g., resistive or capacitive touch screen functionality).

As used herein, the term "back-end" refers generally to a networked system controlled by an operator (e.g., an SO) that distributes content to clientele, such as using client devices.

As used herein, the terms "Internet" and "internet" are used interchangeably to refer to inter-networks including, without limitation, the Internet.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), LTE-M, and other related wireless data standards (as applicable).

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "service provider" refers to a cable, satellite, or terrestrial network provider having infrastructure required to deliver services including broadband data, programming, and/or other services over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, cable modem, Wi-Fi (802.11, Wi-Fi Direct, etc.), LTE/LTE-A, WiMAX (802.16), power line carrier (PLC), or IrDA families.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information, whether local, virtual, or cloud-based.

As used herein, the term "Wi-Fi" refers to, without limitation and as applicable, any of the variants of IEEE Std. 802.11 or related standards including 802.11a/b/g/n/s/v/ac/ax or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE/Bluetooth Mesh Networking, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), CBRS (3.5 GHz), 802.20, Zigbee®, Z-wave, NFC (near field communication), RFID, narrowband/FDMA, OFDM, PCS/DCS, LTE/LTE-A/LTE-U/LTE-LAA, analog cellular, CDPD, satellite systems, millimeter wave or microwave systems, acoustic, Li-Fi, and infrared (i.e., IrDA).

Overview

In one exemplary aspect, the present disclosure describes improved methods and apparatus for providing attribute-based search of media assets such as on-line videos and audio, and associated augmented reality (AR) functions including dynamic provision of relevant secondary content (e.g., advertising, product or service information, or even general background information) relating to the identified attribute(s).

In one embodiment, media assets such as digitally encoded videos or audio files are ingested into a processing system and processed according to one or more attribute detection, identification, and characterization algorithms and hierarchies. Attributes detected may include for example the presence of tangible items such as clothing or chattels (and associated attributes thereof), particular persons such as celebrities, and/or certain contexts such as sporting activities and musical performances, as rendered within the media asset. In one implementation, the characterized elements and assets are provided unique IDs, and stored so as to permit cross-correlation based on, e.g., the identified and characterized attributes. Secondary content (e.g., advertising or promotional content) can be correlated to each identified asset, and dynamically served upon a user providing some threshold level of interaction with the attribute.

Moreover, products and services of advertisers can be algorithmically correlated to elements or attributes within the assets, thereby allowing for a high degree of placement contextual correlation.

A number of useful functions are provided to users of the system, such users which may include among others: (i) consuming or viewing end-users; (ii) advertisers of goods/services; (iii) online publishers of media content (including their own indigenous advertiser base), and (iv) service providers such as cellular or broadband cable, fiber-optic, or satellite providers). These useful functions include, among others, the ability to rapidly identify visual "inventory" which may be a useful platform for contextual advertising content, and purchase such inventory via a substantially automated computerized portal. Moreover, additional engagement opportunities for end-users and publishers/advertisers are provided via integration of internal and external content, and social media.

Users of the system (such as content publishers) may also readily gain access, via the back-end portal(s), to in-depth analytics that provide new audience insights to enhance their video strategy, including data on what content the audience is truly consuming, interactions, and products/services that are being consumed by users. Likewise, advertiser users of the system immediately know where within the Internet/intranet that their advertisements are being served, and publishers are provided insight into which what advertisers are utilizing their inventory (e.g., available advertising space with web host sites).

In one exemplary application use case, so-called "in-scene" management is utilized by the system to, inter alia, serve contextually relevant product and content recommendations. In one such implementation, secondary content such as advertisements is/are exposed before a media player application function is invoked (e.g., the "play" button is selected), and disappear if the user decides to play the video asset. At any time the user can re-open the viewport to explore and/or shop onscreen interests. In another exemplary application use case, so-called "in-carousel" management is utilized by the system to, inter alia, serve contextually relevant product and content recommendations as part of a carousel displayed below the primary content viewport (e.g., that associated with the media player application). This approach is well suited for e.g., publishers who wish to provide content viewers (i.e., those accessing their website) with an explore-able video feature outside of the primary content rendering experience.

Notably, anecdotal data obtained by the Assignee hereof indicates a very high rate of penetration by the technology described herein as compared to the prior art (i.e., on the order of 6%, versus sub-1% rates of penetration characteristic for prior art banner ad/pre-roll ad technologies), thereby greatly enhancing the efficacy of secondary content utilization.

Additional aspects of the disclosure enable, inter alia, anonymous identification of assets for system users/customers, as well as utilization of sponsor relationships between celebrities and particular good or services.

Advantageously, exemplary embodiments of the system described herein, including generation and display of "augmentation" layer(s) on top of video rendering, require no modifications or additions to the rendering client device; such client devices can utilize the features of these embodiments without any specialized or additional hardware or software needing to be installed or downloaded. Specifically, in one variant, the script and other code components are all embedded within the hosting site; when a user calls up website with embedded code, and interacts with an element in a rendered video, the information relating to the interacted-with element (e.g., pause button on player) is used to call the relevant API of the backend system to produce data for rendering on the client. As such, these functions can be used across literally any extant type of platform, operating system, and networking environment.

Detailed Description of Exemplary Embodiments

Exemplary embodiments of the apparatus and methods of the present disclosure are now described in detail. While these exemplary embodiments are described in the context of a data network with IP content capability, and a plurality of client devices (such as e.g., the Internet), the general principles and advantages of the disclosure may be extended to other types of networks and architectures that are configured to deliver digital data (e.g., text, images, games, software applications, files, or streaming video and/or audio), including other types of internetworks, intranets, LANs, WANs, MANs, whether wired, wireless, or combinations thereof. Such other networks or architectures may be broadband, narrowband, or otherwise, the following therefore being merely exemplary in nature.

It will also be appreciated that while described generally in the context of a network entity or system providing service to a customer or consumer or end user (i.e., a consumer using an Internet website), the present disclosure may be readily adapted to other types of environments including, e.g., non-commercial, educational, or enterprise domain (e.g., businesses), or even governmental uses. Yet other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while, generally, the embodiments disclosed herein have been described in terms of digital video and/or audio data, these descriptions are strictly exemplary and are not meant to limit the scope of the overall disclosed concepts. For example, the concepts herein are equally applicable to different types of digital media, including without limitation digital video games and full length Blu-Ray™ or other formatted content such as movies can benefit from the concepts disclosed herein. Likewise, any digital media or representation that has the possibility for viewer cognizance and interaction may benefit from the concepts disclosed herein.

Throughout this specification, reference will be made to a frame of e.g., a video stream or digital audio format (e.g., MP3). However, those skilled in the art will understand that the techniques taught herein are equally applicable to a single image (e.g., JPEG, GIF, TIF, BMP, etc.) and/or any multi-image compilation (e.g., a slideshow, gallery, album, etc.), as well as to individual frames and sets of frames of a video or audio stream. As used herein, either alone or in combination with other words, the term "frame" may refer to a picture, a frame, aggregation or group of frames (e.g., GOP), or a field or a slice thereof.

Other features and advantages of the present disclosure will immediately be recognized by persons of ordinary skill in the art with reference to the attached drawings and detailed description of exemplary embodiments as given below.

System Architecture—

Referring now to FIG. 1, an exemplary embodiment of a system architecture configured for providing secondary content provision to a plurality of users is shown and described in detail.

As illustrated in FIG. 1, the system architecture 100 is comprised generally of three logical domains (i.e., a system operator domain 101, advertiser domain 102, and publisher domain 103, as well as one or more distributed user domains 104), each managed and operated in the illustrated embodiment by their respective entities, although it will be appreciated that these domains may be further divided or combined in various ways, and/or be managed by more or fewer entities. Data communications between the domains is accomplished via public internetworking (e.g., the Internet 111), although other approaches including enterprise WLAN, wired or wireless WAN, MAN, intranet, and the like may be used in place of or in combination with the foregoing internetwork architecture for some or all of the communications functionality described herein.

Similarly, a number of different users access the various functions of the domain (as applicable) via the public Internet 111, via e.g., PCs 106a or wireless enabled mobile devices 106b, such as via a service provider network 113, and/or WLAN or LTE data bearer access node (e.g., Wi-Fi AP or LTE eNB) 114 and associated wireless data backhaul infrastructure 115.

In operation, the browser applications 121 of the user clients 106a, 106b establish respective data communication sessions with website (URLs) of the various web content publishers, such as via the HTTP/HTTPS protocol(s). The application layer browsers 121 communicate data via the interposed infrastructure 113, 115 and public/unmanaged Internet 111 to access servers 132 of the publisher(s), and when advertising or other secondary content is served, the server(s) 128 of one or more advertiser domains.

Intercommunication between the domains of advertisers and publishers may also occur, such as to facilitate consumption of advertising space or "avails" within the publishers content (e.g., on a given web page) by the advertiser(s), including embedding content within the published web page(s), and URLs to the advertiser's domain for serving the secondary (e.g., advertising or promotional) content when selected by a viewing user via their browser 121.

Within the system operator domain 101, a number of components and processes are data-interconnected via a LAN 158, including one or more web servers 140, a portal server 157, a database 153, and a system management interface (SMI) 155. The web server(s) 140 include, in one embodiment, one or more analytics engines 142 operative to run thereon, the functionality and operation of which is/are described in detail subsequently herein.

Also operative to run on the web server(s) 140 are one or more APIs (application programming interfaces) 145, also described in detail subsequently herein, which provide inter alia, user-facing (i.e., end-user, or consumer-facing) software interface for scripts embedded within the publisher web pages, such as via the plug-in software module described elsewhere herein.

Similarly, one or more APIs 159 are operative to run on the portal server(s) 157, which provide inter alia, customer-facing (i.e., advertiser- or publisher-facing) software interface for provision of search data, analytics data, and other portal-related functions as described elsewhere herein.

Within the publisher domain 103, one or more primary content stores 135 are accessible via the publisher web (content) server(s) 132, so as to enable serving of the primary content to requesting users (e.g., client browsers 121 which invoke URLs associated with the browsed website hosted or published by the cognizant publisher).

Figure 1A:
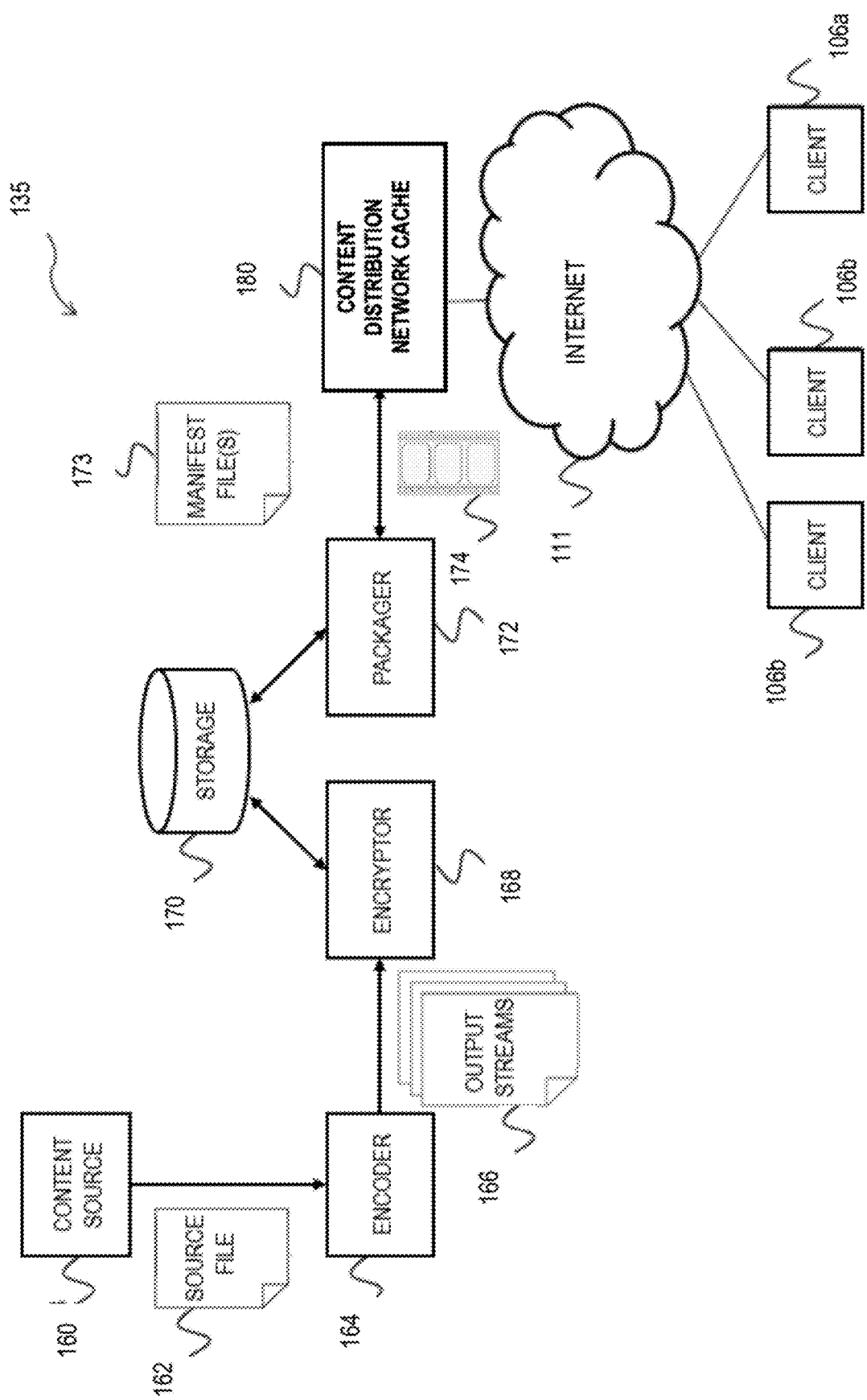
FIG. 1a is a functional block diagram of an exemplary packet content processing system useful in conjunction with the system architecture of FIG. 1.

The publisher domain may also include, as shown, primary content processing infrastructure including a content encoder/encryptor/packager apparatus 135 for processing ingested media content from one or more content sources, and causing storage of it within an appropriate storage system 134 (which may include for example a delivery cache; see discussion of FIG. 1a below).

Within the advertiser domain 102, one or more secondary content stores 129 are accessible via the secondary content server(s) 128, so as to enable serving of the secondary content to requesting users (e.g., client browsers 121 which invoke URLs associated with the advertising placed by that advertiser within a browsed website). FIG. 1a discloses an exemplary configuration of an architecture 135 for providing video or other media content to client devices 106a, 106b via a service provider network 113. The content provision entities (e.g., packager(s) 172) are in communication with client devices 106 via the distribution network 111 and the content cache 180. In one embodiment of the present disclosure, the distribution network 111 comprises an internet, such as e.g., the Internet. While described in the context of an Internet Protocol network, it will be recognized that the principles of the disclosure may be extended to other transport modalities and network paradigms.

The requesting user client devices 106a, 106b include media-enabled client devices, e.g., tablets, phablets, smart phones, smart televisions (TVs), desktop and laptop personal computers (PC), and portable media players. In another embodiment, the media client device may comprise a file server. For example, a user may have a PC which can play media files, but which also serves his/her other consumer electronics (e.g., smart phone and tablet).

In one embodiment of the present disclosure, an encoder process 164 encodes a source file 162 from a content source 160 into at least one encoding format (e.g., transcodes a source file from one format to at least one other format). In another variant, the source file 162 is encoded into a plurality of encodings that correspond to a respective plurality of one or more device types, codecs, resolutions, file formats, audio encodings, bit rates, etc. The variety of encodings may be utilized by the cache 180 (and the packager 172) as well as other entities of the network, via adaptive bitrate (ABR) streaming.

As a brief aside, video compression is used in many current and emerging products, such as digital satellite systems (DSSs), high definition television (HDTV) decoders, mobile devices such as tablets, smartphones, and personal media devices (PMDs), digital versatile disk (DVD) players, video conferencing, Internet video and multimedia content, and other digital video applications. Without video compression, digital video content can be extremely large, making it difficult or even impossible for the digital video content to be efficiently stored, transmitted, or viewed. Such compression typically comes at the price of loss of information present in the original (non-compressed) version, and hence are "lossy."

There are numerous video coding methods that compress digital video content. Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

Most modern video coding standards, such as H.264, are based in part on a temporal prediction with motion compensation (MC) algorithm. Temporal prediction with motion compensation is used to remove temporal redundancy between successive frames in a digital video broadcast. The temporal prediction with motion compensation algorithm includes a motion estimation (ME) algorithm that typically utilizes one or more reference pictures to encode a particular picture. A reference picture is a picture that has already been encoded. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm.

Motion estimation in an encoder is typically a computationally intensive process, and hence where speed and reduced processing overhead are desired, reduction or even removal of motion compensation processing can greatly expedite e.g., display or rendering of video data.

Adaptive bitrate (ABR) streaming is a technique to distribute program content over a large distributed network. Multiple bitrates of a particular piece of content are available to stream to a viewer, and the selection of the bit rate is based on current network conditions. This means that when there is greater bandwidth availability, a larger bitrate version of the content may be selected. If available bandwidth narrows, a lower bitrate (i.e., smaller) version of the content may be selected to provide a seamless user experience. Non-limiting examples of ABR streaming include, without limitation, MPEG-Dynamic Adaptive Streaming over HTTP (DASH), Adobe® Dynamic Streaming for flash, Apple® HTTP Adaptive Streaming, Microsoft® Smooth Streaming, QuavStreams® Adaptive Streaming over HTTP, and upLynk®.

Returning again to FIG. 1a, a source file 162 from a content source is input to the encoder 164. Various content sources 160 may provide source files to the encoder. For instance, content may be received from linear analog or digital feeds, as well as third party content sources. Internet content sources (such as e.g., a web server) may also provide Internet content to the encoder 164. In yet another embodiment, content may be received from subscriber and/or non-subscriber devices (e.g., a PC or smartphone-originated user made video).

The source file 162 may be encoded in a variety of formats (both audio and video), bit rates, resolutions, which are each playable on a variety of devices. Accordingly, one or more output streams 166 are produced by the encoder. For example, a content delivery network may enable a wide variety of user devices to play a certain piece of content. Accordingly, a publisher or other entity selects to have the encoder 164 encode the content into multiple formats for use on the variety of players. Adaptive bitrate streaming may also be used such that multiple bit rate streams are utilized by selecting an optimized stream from the output streams 166, e.g., the stream that best utilizes the viewer's device and current network delivery constraints to provide an optimal playback experience. The optimization occurs via a process or application running at the encoder 164.

As a brief aside, video decoding generally comprises three frame types, Intra frames (I-frames), Predictive frames (P-frames), and Bi-directional frames (B-frames). H.264 allows other types of coding such as Switching I (SI) and Switching P (SP) in the Extended Profile (EP). I-frames are generally more important to a video codec than P-frames, and P-frames are generally more important to a video codec than B-frames. B-frames are dependent on previous I-frames and P-frames. A GOP (group of pictures) can contain each of I-frames (i.e., one I-frame per GOP in MPEG2), P-frames, and B-frames. The I-frames contain the full image, and do not require any additional information to reconstruct it.

Two types of GOPs exist: open and closed. Open GOPs are most efficient because they allow an extra B-frame in the GOP pattern, and start with a B-frame that is able to look at the last P-frame from the preceding GOP (as well as the first I-frame of its own GOP). In contrast, closed GOPs cannot contain any frame that refers to a frame in the previous or next GOP, and begin with an I-frame. B-frames are interpolated from one or more preceding or successive reference frames (either I-frames or P-frames).

Open GOPs generally provide better compression than do closed GOPs of the same structure and size, due in part to the fact that a closed GOP contains one more P-frame than does an open GOP of the same length. Since P-frames generally require more bits than do B-frames, the open GOP achieves better compression. However, there are limitations to using open GOPs, depending on the application. For example, certain formats require closed GOPs at certain boundaries (e.g., chapter markers). An output stream 166 such as in FIG. 1a comprises a series of open and/or closed GOPs; most often, open and closed GOPs are intermixed unless "closed GOP" only is specified at the encoder.

A typical video encoder algorithm can specify GOP size (frames per GOP). Longer GOPs generally provide better compression. The less average motion that exists from one frame to the next generally correlates to longer P-frame spacing, since the predictions won't change unduly. Longer P-frame spacing also generally correlates to greater compression.

Other parameters that may be used by the encoder 164 to encode the source file 162 include for example: (i) a frame rate, (ii) segmentation duration, (iii) video resolutions, (iv) video bitrate, (v) audio bit rate (where necessary), (vi) audio sample rate, (vii) a number of audio channels, (viii) aspect ratio, (ix) video codec, (x) specific device profiles, (xi) audio volume, (xii) file type and extension, and (xiii) standard specific encoding profiles. Standard specific encoding profiles include e.g., H.264, which includes different standard encoding profiles for baseline, main, and high encoding. Additionally, the encoder 164 may utilize information used for cutting out other resolutions/aspect ratios from a higher resolution/different aspect ratio file. For example, the encoder 164 may center-punch a standard definition (SD) image or video from a high definition (HD) source. Similarly, an HD image or video may be center punched from a 4K, 8K, 16K source.

The encoder 164 may encode output streams 166 with audio tracks (e.g., AC3 audio). Different encoding formats and bit rates may be selected based on the requirements of the stream, end user equipment, and the protocols and formats used by the network.

The encoded output streams 166 are also optionally encrypted by an encryptor 168 via an encryption algorithm (e.g., AES, DES, public key encryption, etc.). The encoded and encrypted output streams are stored in a storage device 170.

The stored output streams are utilized by a packager 172 to provide a manifest (or index/playlist) file 173 and video segments 174 to a requesting client device 106a, 106b. Specifically, the manifest file 173 is a data structure comprising a listing of addresses for each of the video segments 174 of a stream of data, and includes information about the video segments such as bitrates, closed captioning, audio, etc. Different ABR models may use different manifest files. For example, with HTTP Smooth Streaming (HSS), each of the components (closed captioning, audio, etc.) are in separate files with addresses for each in the manifest file 173. With HTTP Live Streaming (HLS), audio is embedded in the segments 174 and thus are not separately listed in the manifest file. The manifest file 173 includes metadata, and a listing of media segment entries, such as e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc.

The list of media segment entries in the manifest file 173 comprises a list of network addresses (which may be remote or local) where the corresponding segments 174 of media content may be accessed and/or downloaded. For instance, each of the media segment entries may be listed by a Uniform Resource Locator (URL). The entries may be in symbolic format, such that at least a portion of the entry must be further interpreted (i.e., is not human-readable). Common examples of this may include e.g., HyperText Markup Language (HTML) tags, proprietary tags, Java, JavaScript, etc.

In the exemplary embodiment, each media segment 174 is an encoded and encrypted subsection or segment of media content. The media segments, when decrypted, decoded, and played in the appropriate order, render the original media content. In one implementation, each media segment represents a portion of video associated with a specific resolution, codec, and time stamp. The media segments 174 are assembled according to a time stamp sequence.

Back-End Server Apparatus—

Figure 2:
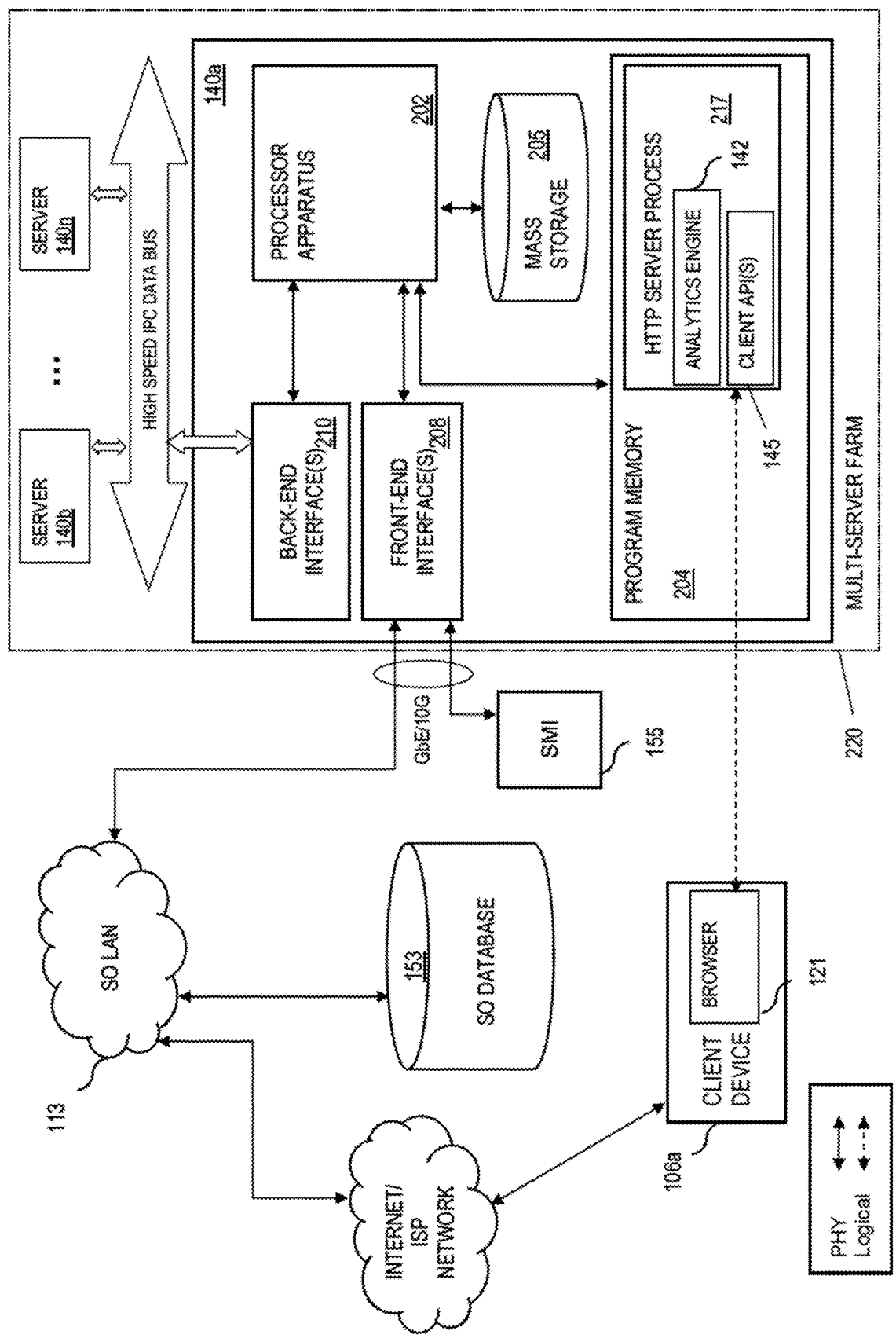
FIG. 2 is a functional block diagram of an exemplary embodiment of a server apparatus useful with the system architecture of FIG. 1.

FIG. 2 illustrates a block diagram of an exemplary embodiment of server apparatus, e.g., the server 140 of FIG. 1 useful for operation in accordance with the present disclosure.

In one exemplary embodiment as shown, the server 140 includes, inter alia, a processor apparatus or subsystem 202, a program memory module 204, an HTTPS server module 217 (here implemented as software or firmware operative to execute on the processor 202), a back-end network interface 210 for interprocess communication (IPC) with other servers within the array/farm, and a front-end interface 208 for internal system operator (SO) domain communications and control data communication with the relevant components of the system 100 including the LAN 158 and the SMI 155.

In one exemplary embodiment, the server(s) 140 are maintained by the system operator (see FIG. 1) and are each configured to utilize a non-public IP address within an IMS/Private Management Network "DMZ" of the system operator network. As a brief aside, so-called DMZs (demilitarized zones) within a network are physical or logical sub-networks that separate an internal LAN, WAN, PAN, or other such network from other untrusted networks, usually the Internet 111. External-facing servers, resources and services are disposed within the DMZ so they are accessible from the Internet, but the rest of the internal system operator infrastructure remains unreachable or partitioned. This provides an additional layer of security to the internal infrastructure, as it restricts the ability of surreptitious entities or processes to directly access internal system operator SO servers and data via the untrusted network, such as via an server "spoof" or MITM attack whereby an attacker might attempt to hijack one or more servers to obtain private data or attempt control or hijack of one or more sites.

Although the exemplary server 140 may be used as described within the present disclosure, those of ordinary skill in the related arts will readily appreciate, given the present disclosure, that the SO web server apparatus may be virtualized and/or distributed within other network or service domain entities (e.g., with/in the portal server 159 of the architecture of FIG. 1), and hence the foregoing apparatus 140 of FIG. 2 is purely illustrative. Moreover, it will be appreciated that the server 140 may be part of a so-called "server farm," wherein a plurality of servers operate at least partly in parallel to distribute or divide up processing tasks to, inter alia, enable faster processing of tasks as described subsequently herein. Such farm (or portions thereof) may be maintained by the SO within the SO domain 101, or alternatively provided by a third-party entity or service provider. More particularly, the exemplary apparatus 140 or farm can be physically located near or within "cloud" entities or other portions of the infrastructure of which the rest of the wireless network (as discussed supra) is a part, whether owned/operated by the SO.

In one embodiment, the processor apparatus 202 may include one or more of a digital signal processor, microprocessor, field-programmable gate array, or plurality of processing components mounted on one or more substrates. The processor apparatus 202 may also comprise an internal cache memory. The processing subsystem is in communication with a program memory module or subsystem 204, where the latter may include memory which may comprise, e.g., SRAM, flash and/or SDRAM components. The memory module 204 may implement one or more of direct memory access (DMA) type hardware, so as to facilitate data accesses as is well known in the art. The memory module of the exemplary embodiment contains one or more computer-executable instructions that are executable by the processor apparatus 202. A mass storage device (e.g., HDD or SSD, or even NAND flash or the like) is also provided as shown.

The processor apparatus 202 is configured to execute at least one computer program stored in memory 204 (e.g., the logic of the analytics engine 142 including the various subroutines or modules thereof, in the form of software or firmware that implements the various functions described herein with respect to, inter alia, (i) generation of analytics data; (ii) pre-processing of media assets; (iii) database search and correlation/comparison operations). Other embodiments may implement such functionality within dedicated hardware, logic, and/or specialized co-processors (not shown).

In one embodiment, the server 140 may be configured to directly or indirectly communicate with one or more portal servers 157 of the network (see FIG. 1). The portal server(s) 157 are used to, inter alia, provide customer (e.g., advertiser and/or publisher) facing UI functionality and data access as described elsewhere herein.

In the exemplary embodiment, one or more backend interfaces 210 are configured to transact one or more network address packets with other SO networked devices, particularly apparatus such as the SO-operated LAN 158 (and various devices and processes in data communication therewith) according to a network protocol. Common examples of network routing protocols include for example: Internet Protocol (IP), Internetwork Packet Exchange (IPX), and Open Systems Interconnection (OSI) based network technologies.

As shown in FIG. 2 the exemplary server 140 is configured to logically communicate with both the browser-enabled client devices 106a, 106b via the interposed service provider network 113 and Internet 111. Specifically, an HTTPS server function on the server apparatus 140 can send/receive datagrams addressed to the HTTPS-enabled clients 106a, 106b pursuant to data sessions created therebetween. As part of such data sessions (e.g., such as when a client uses its browser 121 to access a publisher website), the called script(s) of the plug-in module associated with the site will make "calls" to the client-accessible APIs 145 of the server 140 to provide or obtain information, and invoke various functions by the back-end system (including generation and presentation of overlay content on the client device display, as described in detail below).

Software Architecture/Elements—

Figure 3:
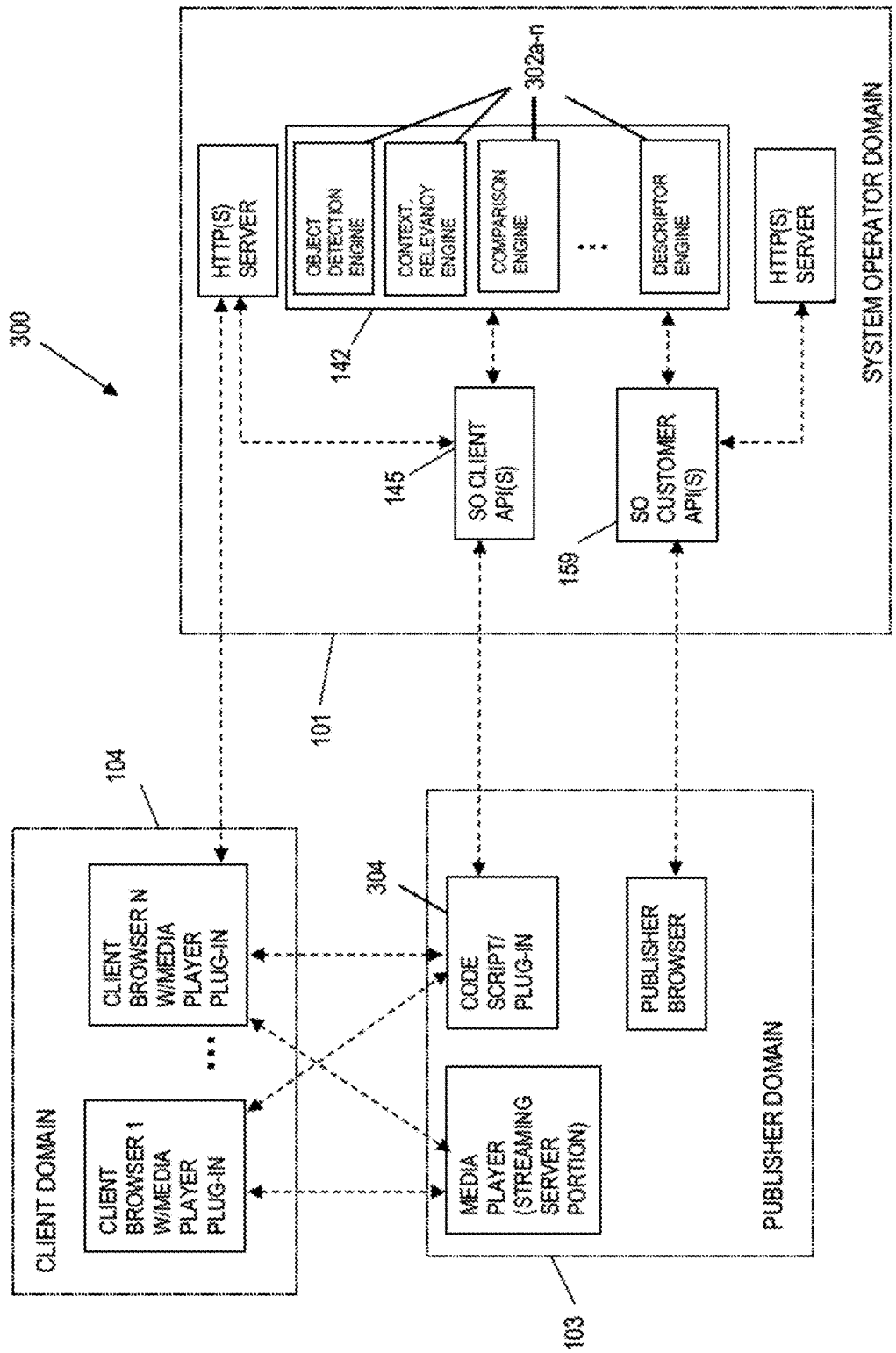
FIG. 3 is logical block diagram illustrating one embodiment of a system software architecture according to the present disclosure.
Figure 4:
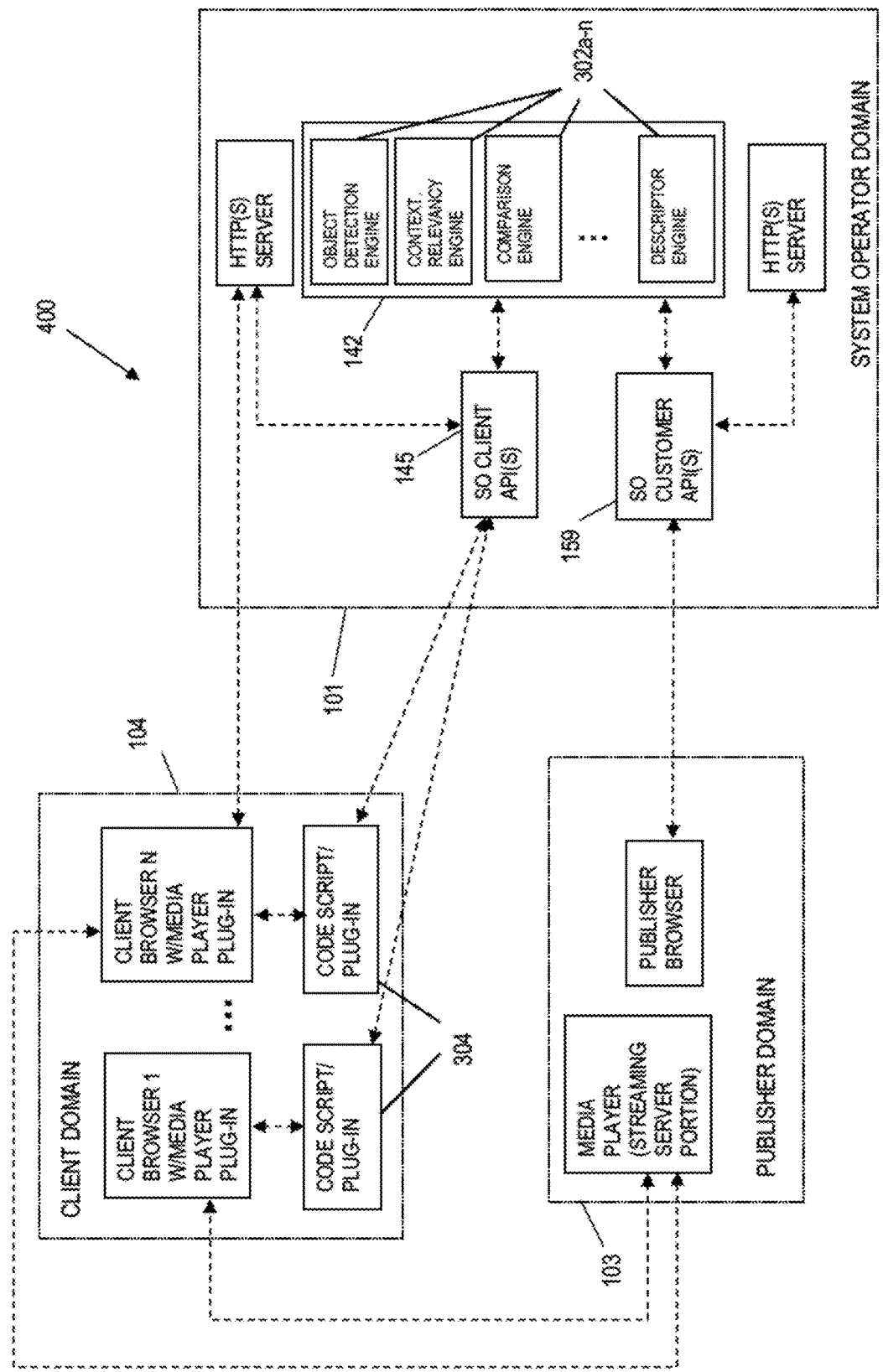
FIG. 4 is logical block diagram illustrating another embodiment of a system software architecture according to the present disclosure.

Exemplary embodiments of the various software and system logic components utilized within the architecture 100 (i.e., SO portion 101, publisher portion 103, and client portion 104) of FIG. 1 are now described in detail with respect to FIGS. 3-4.

At a high level, the system software architecture 300 comprises a plurality of distributed programs or components configured to execute on different HW platforms within the respective different domains. In a typical use case, the SO provides a publisher 103 with a code module or plug-in 304, which the publisher installs on their target web site (FIG. 3), or which can be installed on user domain devices such as within a user's web browser on their PC or smart TV. As described below in detail, this module includes a lightweight script which communicates with the media player and "client" (i.e., consumer domain) API(s) 145 of the back-end system in order to both communicate data regarding user interaction with interactive elements of an SO media asset (e.g., video), and return relevant data to the client regarding contextual secondary content, pursuant to HTTP(S) sessions established between the client browser application and the SO server(s) 140. The code module or plug-in 304 sits on a publisher web page or application, or Smart TV application (depending on platform). Depending on the particular configuration (e.g., for some Smart TV applications), an API may reside entirely with the application, and code is never downloaded by a client, browser (e.g., one running on the Smart TV itself and which the user manipulates). In other configurations, code may be translated and downloaded into the client (consumer) domain by e.g., a browser application running on the user's client device.

As shown, the software architecture also includes APIs 159 which are accessible by SO customers (e.g., advertiser or publisher) and which are configured to, when provided certain inputs via the UI of the portal (e.g., a browser application of the customer running remotely), return useful information to the customer via the UI, as described in greater detail below.

The SO domain components further include a plurality of code modules or engines 302 which, inter alia, support the APIs and provide media asset and other analytics as described in greater detail below. These engines 302 also include a number of particular routines configured for specific functions, also as described subsequently herein.

Video API(s)—

In the exemplary implementation, the video player API 145 of the system is configured to be agnostic to the underlying video player application (e.g., HTML5 Windows Media Player, Quicktime, etc.) being used to render the video asset. The exemplary implementation of the API is approximately 8500 lines of code (see Exhibit I for exemplary illustrative portions thereof). Advantageously, the exemplary API and (Java) script are "player agnostic" by design by virtue of being able to interoperate with any video player and any video player inside an I-Frame. Specifically, the exemplary implementation of the API 145 can interact and control the unit (i.e., video player) with full capabilities, including for example play, pause, seek, height, width, position, etc.

As a brief aside, all player applications generally have code that controls two basic functionalities of the video (media): "play" and "pause." All other controlling features of the video are in essence a derivative of these functionalities (e.g.: "seek" comprises playing the video at a particular time; "get-time" comprises determination of the time at which the user pauses the video, and so forth). Each particular player has its own native interactions. Some implementations of media players are customized versions of a "base" player, and which attempt to block one or more of the foregoing features to accomplish particular aims (such as preventing the user from skipping content, and/or other programs from accessing the native functions).

Hence, in one exemplary implementation of the present disclosure, the API code is configured to determine if the aforementioned "native" controls are exposed, or if the (e.g., custom) player is blocking them. The code is also configured in one embodiment to determine what type of custom player is being used, and then dynamically "code" around the customization in order to interact with the native controls (e.g., to circumvent the "blocking" of the native controls).

The foregoing Example—the primary type of players on the web and mobile are built with HTML5. HTML5 exposes video.play( ) and video.pause( ) methods as in the following exemplary video with play and pause buttons:

```
var vid = document.getElementById("myVideo");
function playVid( ) {
    vid.play( );
}
function pauseVid( ) {
    vid.pause( );
}
```

Some players such as e.g., YouTube and Vimeo may be configured to circumvent these native controls, or in other cases even try to block scripts from gaining access to them. However, in the exemplary implementation described herein, custom code is utilized to "work around" all attempts to block or circumvent native interactions. For instance, a customized player ("Player A") may utilize its own wrapper API to interact with the native video.play( ) method, and then block access to that wrapper by including e.g., <div> elements and JavaScript code. However, with knowledge that all players have native video.play( ) and video.pause( ) methods, the exemplary API described herein identifies one or more ways to interact with the native controls, either by (i) using the wrapper API, or (ii) bypassing the wrapper to gain access to the native controls. Specifically, in one embodiment, the wrapper API utilizes data relating to the rendering platform/environment (e.g., a desktop computer of the user), knowledge of display mechanism(s) (e.g., Chrome browser application), and knowledge of the media player type being used (e.g., HTML5-based), such data obtained as described elsewhere herein. The exemplary system logic utilizes these data to calculate how to proceed in setting up the appropriate "listening event" to the API, and/or native player controls. Moreover, data regarding user interactions can be utilized; e.g., via interception of the messaging to the media player, and (a) alteration of such messaging in order to effect the desired behavior/functionality; and/or (b) generate new messaging to the player which effects these behaviors/functions. In terms of bypassing native controls, similar data as that described above can be obtained (i.e., player type, browser type, host rendering platform, etc.), and evaluated in light of additional data relating to one or more acceptable player types for that display mechanism (for example, is Adobe Flash allowed on the target user's Chrome browser? Is HTML5 supported/allowed?).

It is further noted that exemplary implementation of the code also is configured to 'listen' to actions that take place regarding the player. For example, since the media player is not rendered as part of the script/API execution, monitoring of actions that take place on that player can be used to passively assess the state of the player at any given time. For instance, if a user presses "pause" on the player, that action can be identified via monitoring media player events, and assessing player states. Specifically, a "Pause Video" command entered by a user via the host platform UI is an action that then turns into a video.pause( ) event, and this event can be monitored using the system code. Also assessing player state is video currently paused?).

Moreover, the API/script can be deployed through other systems such as so-called "double click for publishers" (DFPs) such as e.g., the Google Dart DFPs. As a brief aside, in a typical DFP, a webmaster inserts a JavaScript code or tag code into a webpage; each time this page is visited, the JavaScript code creates an I-Frame, and the DFP algorithm running on e.g., a back-end server determines advertising campaign content to insert into the I-Frame (e.g., according to a prior art "targeted" or other approach). Some DFP approaches can differentiate between types of advertising content, e.g., "Priority" (based on time/duration) versus "CPM" (based on price).

1. Code Script and User Interaction—

The JavaScript code of the present embodiment can be placed on a website (FIG. 3), or on a mobile device or smart TV (FIG. 4), and communications take place between the script code and the relevant media player application. The script also communicates with the back-end server(s) and other APIs of the system to obtain the content to be inserted at that particular avail. Specifically, in the exemplary context of a DFP of the type described above, an I-Frame is placed by the publisher around the script, which has the effect of blocking access to the page. In contrast, the exemplary implementation of the present disclosure utilizes code to interact with media players on a given page through the DFP by communicating with a parent page of the target page of interest; the parent page then communicates to the player(s) on the target page. Hence, in this implementation, the lightweight code 'script' is never actually placed on the target page itself, but rather is placed on an I-Frame inside the target page. Interactivity with a native page player is thus provided via one or more I-Frames associated with the DFP.

In the exemplary embodiment, the script is structured such that it is "lightweight" and does not interfere with the rendering player program. An exemplary script rendered in JavaScript programming language is shown below:

```
<script language="javascript"> var WC_pub = "a0a4b2db-32e0-
9d59-cab3-e84c1a4dc1f6"; var WC_param = "0"; </script> <script
src="https://example.com/current/wowconnect.min.js"></script>
```

In one embodiment, the system and API are configured such that when a user hovers/pauses with respect to a given frame or set of frames (e.g., I-frame within a GOP), an item or element is highlighted, or another graphic/audio mechanism is utilized (e.g., dots placed next to it, change in color, brightness, audible cue, etc.) so that user can select with the relevant input device (e.g., mouse, capacitive touch screen touch, or voice command). It will also be appreciated that audible descriptors may be utilized, such as for the vision impaired; e.g., a short tone followed by an audible short description such as "red lipstick on Taylor Swift").

Pressing pause for example on the media player application causes the media player to communicate with the script resident on e.g., the website, and the script communicates with remote server API(s) 145 for execution of the functions including highlighting of one or more interactive elements associated with attributes rendered in the underlying media rendering.

Moreover, to the degree that a user pauses a given video that has been selected for rendering ("played"), such pausing can be used both as a) an indication of prospective level of interest; and b) to invoke more complex routines relating to the context of the pause operation; e.g., if an interactive object or element is present within the frame at which the pause is invoked. In one embodiment, the system algorithm(s) determines whether any such elements are rendered within the paused frame (see discussion of shape recognition/analysis provided elsewhere herein), and if so, then the "pause" action is deemed potentially relevant. If not, then the pause is presumed to be either (i) erroneous (e.g., was intended to pause on a frame displaying an element of interest to the user, but missed for whatever reason and landed on a temporally nearby frame without such element), or (ii) not an affirmative expression of interest in any element (e.g., perhaps in a portion of the rendered video data which is not an object or cataloged by the system 101). This capability is significant from the standpoint that if a user pauses on a non-element frame (for whatever reason), they do not generally want to be presented with secondary content relating to some "phantom" element for which they did not affirmatively express interest (since it wasn't in the frame to begin with).

In other embodiments of the system, user (e.g., video viewer) "interest" in a given good or service rendered in an asset can be divined at a lower level of abstraction; e.g., when the user mouses-over or "selects" the particular rendered element corresponding to the good or service of interest. For example, a user mousing-over a human wearing a white men's polo shirt within a rendered video frame (as determined by the cursor coordinates relative to the outer boundary or other feature of the shirt), or a user touching the same region via a capacitive touch screen input device, may be used to more concretely ascertain interest in that good or service. Hence, under one paradigm described herein, a user pausing a video player rendering of a video on a frame having a man wearing a white polo shirt, can be utilized as a putative expression of interest in that item (although their "interest" might be for wholly different reasons, including another item in the same frame, because they need to answer the telephone, etc.). Alternatively (or as a confirmation of the foregoing), under another paradigm, the user's actual interaction with an element of a paused or selected frame (e.g., a display/highlight frame as described elsewhere herein), such as by mousing-over or touching a portion of a display corresponding to a given good or service, can be used as a more definite indicia of interest in the good/service.

In the case of multiple elements within the same paused frame, the algorithm can apply a selection/prioritization algorithm, which can include: (i) affirmative user selection (i.e., the user paused on a frame with multiple elements, but then subsequently moused-over or clicked/touched on one of the multiple elements in particular); (ii) all elements in the frame being of same prospective interest; or (iii) prompting of the user for additional input as to which item is of primary interest. Moreover, "hover" time (i.e., mouse cursor dwell time), cursor/touch proximity to boundaries of identified elements, and other similar values can be calculated by the system algorithms and used as metrics of which element of the several in the frame is most "interesting," whether in the context of a single interactive element or multiple elements.

The foregoing interaction by the user—i.e., with video running, the user clicks pause or hovers over the item of interest when they see something of interest, which invokes the script to call an API on the back-end server—is an affirmative expression of interest, in contrast to a forced or targeted advertisement under the prior art. Such so-called "targeted" advertisements are pushed to the user based on e.g., prior interactions of that user with various sites, demographic data, or other logic; this is in stark contrast to a user actually expressing affirmative interest in the particular subject matter within the asset being rendered (e.g., golf clubs within a video being played), and only in response thereto, content relating to the identified subject matter being provided (aka "pulled"). Notwithstanding, the present disclosure further contemplates variants wherein elements of each approach (i.e., "push" and "pull"), such that the population of subject matter (e.g., goods or services) that are at least ostensibly interesting to the given user are prioritized over other choices.

For instance, when a user of a PC or tablet uses the input device thereof to select "pause" of the rendering video player program (i.e., by placing the mouse over the on-screen rendered "pause" icon/button, or touching that area on a capacitive touch screen input device respectively), the script recognizes these inputs as a "pause operation" intended for the media player program, and invokes its own routine for display/highlighting of the previously processed video/audio content (e.g., calls data from the server to highlight the elements). Notably, the exemplary embodiment implements such functionality via very lightweight code; the aforementioned interaction with the device does not involve communication with the player application itself (e.g., the script does not access an API or require the player application to provide data to the script or server indicative that a "Pause" function has been activated, thereby reducing or eliminating any overhead or slowdown of the video execution by the player application). Moreover, overhead is also minimized by not rendering or using a timed application that needs to run simultaneously with the media asset (e.g., video). Additionally, no changes or alterations to the media asset itself are made, so the asset does not require re-creation or re-coding in order for the script to function. Rather, the script merely determines prospective or putative inputs to the application via the input device (e.g., mouse or capacitive touch screen "grid" coordinates), and associates them with an underlying operation irrespective of the player application.

When the aforementioned pause or other designated action is detected by the script, the script is then executed to call the aforementioned video API 145 of the "back end" server. This API then accesses previously processed data associated with the video being rendered, including that relevant to the current frame or frames (e.g., on a per-frame or per-GOP basis).

As a brief aside, it is noted that there may be different events associated with a user pressing "pause" on their media player application, leading to a lag time between the frame viewed by the user. In one exemplary implementation of the system, the delay is effectively ignored (i.e., the actual completion of the pausing operation is used as a basis for determining a "pause" event). From this data, the time or exact frame at which the pause operation was completed can be determined based on either: (i) a visual determination, or (ii) mathematics (e.g., based on maximum video frame rate, such as 30 fps, in the context of the particular video codec with which the content was encoded). As such, various implementations of the system may determine the codec used, and apply different mathematical analysis based thereon.

However, it will also be appreciated that lag or delay (or other temporal effects) may be accounted for as well. For instance, the "pause" operation in some native media players in effect pushes the video forward (i.e., to a next successive frame or further), while others push the video back a frame or more. For example, a YouTube media player, the pause is approximately 6 frames behind the rendering, so this temporal shift is taken into account when a pause event is detected (i.e., by counting backwards 6 frames from the frame where the pause actually takes effect and the rendering is stopped).

It is also recognized that some media player/display/environment combinations (as well as players themselves) may have "bugs" associated therewith; for example, a YouTube player and Chrome browser with HTML5 and use inside an <iframe> will produce certain artifacts, and hence system calculations can identify such artifacts (e.g., the player API is especially interacting with the native <HTML5> incorrectly), and adjust operation of the system (i.e., relative to frame determination and subsequent provision of secondary content) so to provide the user with a better experience (including elimination or mitigation of such artifacts) when using the system.

Based on the frame (or other structure such as GOP) displayed when paused, one or more characterized elements associated with that frame (if any) are displayed for the user based on the time-latent analysis (i.e., frames already analyzed by the back-end of the system). For instance, where a user has interest in a certain shade of lipstick worn by a pop star in a music video, the user hovers over (and then actuates) the pause function of the media player application rendering the video. As discussed supra, the "embedded" script (e.g., operating locally on the user's rendering device when they access the relevant site/URL) calls the back-end server API to access the relevant video by an identifier. Specifically, in order to render, every video asset requires a stream or file location(s) where the video content is disposed. Moreover, some media player applications have their own unique ID value (a third party unique identifier). This third party identifier is used in the exemplary embodiment to query the database of the system or content delivery network (CDN) to determine an internal (system) unique identifier of the video (having been processed in advance, and data generated by the processing; i.e., relating to the various elements present in each frame or subsets thereof) stored in a data storage facility. The frame reference is also known, such as by an absolute temporal reference or coordinate within the video itself (excluding any pre-rolls of the like), or by other mechanisms. For instance, in one variant, the system (back end) server is sent the "true" pause time (discussed in greater detail below), or base64 image data.

The data stored at the storage facility associated with that video may take on any number of different formats (and may comprise a plurality of discrete data structures or tables), such as those including the following JSON format row data:

```
{ "auto":
    {        "N": "46539504156645179636517855636708461717" },
    "Category": {   "S": "f4d295b4-c475-c62d-a6b3-19bc6ffa5f3" },
    "ClientID": {   "S": "na" },
    "Figure_Area_Coords": {   "S": "na" },
     "Figure_Area_Height": {   "N": "25" },
    Figure_Area_id": {   "N": "1" }, "
    Figure_Area_Radius": {   "S": "83" },
    "Figure_Area_Shape": {          "S": "rectangle"    },
    Figure_Area_Width": {   "N": "166" },
    "Figure_Area_X": {   "N": "242" },
    "Figure_Area_X_String": {   "S": "242" },
    Figure_Area_Y": {   "N": "28" },
    "Figure_Area_Y_String": {   "S": "28" },
    "Folder": {         "S": "df5c9e04-156f-4ea7-9f3f-178eef36708" ,
    "FrameNumber": {   "N": "4617" },
    "Icon_Location": {   "S": "na" },
    "Image": { "   S": "4617.png" },
    "Product_VideoUUID": {        S'': "f4d295b4-c475-c62d-a6b3-819bc6ffa5f3" }
    }
```

The stored data is then accessed, and the data (if any) associated with particular elements of the identified frames accessed and displayed for the user. In one implementation, the system server responds to an API call made by the embedded script(s) with data designated for display or rendering. For example, in one variant, a set of display coordinates are provided which enables rendering of the object/element of interest (e.g., a microwave oven within an image of a kitchen). In another variant, audio data for rendering by the media player is sent. In yet other variants, augmentation directions or data are provided by the server. Literally any type of data deemed responsive or related to the API call may be sent back by the server, depending on its configuration.

2. User Data Collection—

Moreover, the system may be configured to conduct data collection regarding actions taken with respect to the video player application being used by the user (e.g., on their local client device) via the above-described script and plug-in code module. As noted above, in one implementation, actions taken by a user with respect to the player application can be used as a basis for triggering subsequent actions (e.g., where certain actions are designated to correspond to user expressions of interest with respect to the media asset being played or queued for play by the media player). As further described herein, actions such as: (i) a user selecting the "pause" function of the media player application; (ii) selecting another "trick mode" function of the media player such as REW; (iii) hovering over the display regions associated with the controls for trick mode or other functions via the input device associated with the user's client device; and (iv) hovering over or selecting designated interactive elements within a displayed frame or set of frames within the rendered media asset using the input device, can each also be used (whether alone or in combination with one or more other actions or inputs) for purposes of invoking subsequent operations such as logging of an "impression" for the media asset or a portion thereof (e.g., for a designated interactive element such as a good or service of an advertiser), or gathering use/interaction statistics for the system operator, or customers thereof (e.g., publishers or advertisers).

Likewise, an "extended" set of data can be collected from the decoded media asset (e.g., video being rendered by user, or pre-processed by the system 101). Specifically, the system data collection API, object/element detection API, and text detection API can be utilized to collect and log data relevant to the rendering of the asset and which provides enhanced opportunities for analysis (i.e., what can be derived from the data and learned therefrom). For example, extended insights as to: (i) the nature and quality/quantity of particular objects; (ii) insights that can be derived from the data regarding the consuming audience for the media asset (and object(s)); and (iii) synthesis of "knowledge" learned from the data set that can be both stored and applied to subsequent analyses. To further highlight this feature, consider the following example, a given company (e.g., manufacturer of apparel) buys product placement within a video asset; a user watches at least a portion of the video, but the placement of the item is at the beginning or end of the video asset, and as such prior art data can only indicate where the user possibly stopped watching (thereby giving limited insight into behavior/reception of the placement if any). In contrast, when particular temporal and associative data regarding an object is utilized as in one embodiment of the present disclosure, specific metrics as to the foregoing can be derived (e.g., the advertiser's product shows up at 10 seconds into the asset, and the viewer affirmatively viewed the object (product)).

In terms of association, data can also be generated as to other proximate objects or attributes "surrounding" the product/object of interest (whether temporally, or spatially). For example, a user-uploaded video to a sports-related website can be analyzed by the system algorithms to identify commonalities, presence of objects, etc. (e.g., most of the users of the site wear Brand A shirts in the videos they uploaded, and hence it can be inferred that a synergy or other associative relationship between Brand A and the site may exist).

In another aspect, the system described herein may be configured to collect one or more types of demographic or psychographic data by virtue of user interactions with rendered assets, as well as other sources such as their IP address, broadband or LTE service provider profile or subscriber data, mobile device or other platform state (e.g., on/off, dormant), indigenous sensors on the platform such as GPS receivers, IEEE Std. 802.16 FTM positioning data (i.e., meter-level resolution using fine timing measurements via a mobile device and its associated AP(s)), or the like. Moreover, user selections of certain sites (e.g., that of a manufacturer or retailer of goods for which the user expressed interest) can be used track the users activity if permitted by the user. Such demographic/psychographic/activity data can be useful for a variety of purposes, including for assessment by a system operator customer or prospective advertiser of niche markets or other artifacts that are not currently being covered by that advertiser's selected assets.

3. Script—Code Blocking

It is also noted that exemplary implementation of the script described herein is advantageously immune to most if not all "ad blocking" technologies. As is known, extant, popup blockers are based on positioning of elements within a page, and 'banner ad' blocking, and operate based on pre-load of the browsing window. In that the script_(and back-end components) of exemplary embodiments of the technology described herein are not activated until 'requested' by the user via affirmative action (e.g., pause, hover, etc.), it in effect is by definition "post pre-load", and hence not detected by such blockers.

Moreover, it is appreciated that a user of the system herein (e.g., a prospective consumer viewing a video asset from an Internet website) would not want the secondary content/visual enhancements served by the back-end system blocked, in that such content/enhancements provide useful information to the user and enhance their experience, and the user in effect affirmatively requests the served content/ enhancements, in contrast to prior art paradigms. Accordingly, there is no need for blocking or similar technology relative to the served content/enhancements; if the user does not wish the secondary content to be served, they merely do not take the affirmative actions necessary to cause its activation.

Portal API(s)—

In one exemplary implementation, one or more "portal" APIs are maintained by the system for use by e.g., customers of the system operator (e.g., publishers or advertisers). Using such API(s), customers can search their designated video inventory, and moreover see what is 'inside' the video (i.e., as to objects, etc. that have been identified therein and made interactive). This information can be used in a variety of ways, including for advertising sales (whether by the system operator or other entity). In the exemplary embodiment, data is also provided to the user (e.g., publisher/advertiser) about their audience via this portal API (e.g., a profile of what their particular viewers like and do not like).

Separately, an advertiser portal may be employed, such that an advertiser (e.g., a garment manufacturer/seller) can 'search' the network of videos identified within the database for their products or services. This search may be conducted using: (i) textual query (e.g., find instances of Product X within the database), and/or (ii) via image upload, so as to conduct an algorithmic "shape" or other attribute match based on characterization of the uploaded image. For example, in one such variant, a user uploads an image of an article of clothing of interest (e.g., a hat of a particular configuration). Using the back-end system to process this image (akin to the pre-processing performed on web media assets described elsewhere herein), the various attributes of the object (hat) are characterized and stored as a "description" of an object associated with the particular uploading user. Notably, in some implementations, the system need not proceed through recognition of the object (i.e., to determine that it is in fact a hat of a certain style, manufacturer, etc.), but rather may merely use the characterization data to search the system database for matching characterizing data relating to one or more media assets previously processed. As a simple illustration, the geometric shape data (e.g., description of polygons or other shapes associated with uploaded image object) can be used as the search criterion within the database to identify other instances of the same (or sufficiently similar) geometric descriptions, regardless of whether or not they have been identified as to identity (i.e., hat, basketball, whatever). Based on the degree of match and/or number of search factors (e.g., refined by color, texture, context of appearance, etc.), the resulting inventory assets with matching objects can be readily identified and provided to a user (e.g., a customer of the service provider, such as via the previously described back-end portal).

Augmentation Layer—

In one exemplary implementation, the back-end system 101 is configured to enable placement of an augmentation layer which is rendered over or on top of the rendered media asset content on a user's computerized device. This layer is notably not native to either the media asset (e.g., digital video data stream or files), or the media player application program used to decode and render the digital media data, but rather is ancillary thereto. This approach provides several benefits, including obviating having to re-encode the (source) media data to include the data included in the non-native overlay or layer, or require installation of "customized" or enhanced media player applications within the rendering user device. This underscores one particular attribute of the present disclosure; i.e., that any "off the shelf" OEM computerized device (e.g., smartphone, tablet, smart TV, PC) and media player application loaded therein can be used consistent with the interactive features, thereby greatly enhancing the simplicity and ubiquity of these functions. Rather, website hosts or publishers include the relevant portions of the script/plug-in within the code of their served websites/web pages, and in conjunction with the APIs accessible to the scripts/plug-ins operated on the system 101 as described with respect to FIG. 1, complete user-device transparency is achieved.

The benefits of such approach cannot be overstated; by obviating any customization to the user devices (of which there are hundreds of millions throughout the U.S. alone), and relegating all changes and functionality to the hosting web server(s) and system APIs, individualized user interactions and served secondary content can be implemented in a highly efficient manner, including a high degree of cross-correlation and the avoidance of duplication through the correlation mechanisms of the back-end system as described herein.

As one example of the foregoing overlay approach, consider a previously ingested video asset; i.e., one that has been pre-processed using the system 101 and associated analytical engines (e.g., shape/polygon recognition, comparison, color/texture analysis, human identity determination, etc.). The various attributes of the asset are categorized and cataloged within the database 153, including say identification of a white men's polo shirt being worn by a person in certain I-frames of the asset. The polygonal coordinates or data points making up the identified shape within the cataloged frames is also known to the system, such as being saved within the database in a corresponding entry, thereby enabling the system to determine placement/location of the object with the rendered frame(s) based on use of a common grid or coordinate system for the display (see e.g., the methods and apparatus described in co-owned and co-pending U.S. patent application Ser. No. 13/472,406 filed May 15, 2012 and entitled "SHAPE-BASED ADVERTISING FOR ELECTRONIC VISUAL MEDIA," previously incorporated by reference herein). For example, the media itself may have a native height and width, and height/width ratio, or aspect ratio, while the media player may be able to accept and output multiple height/width/aspect combinations, yet the display device requires a particular height/width/aspect combination. A conversion process or calculation can resolve these dimensional disparities. Each of these height/width combinations may be used with certain techniques disclosed herein.

Another dimensional property of the video is placement within the whole of the display device. In certain embodiments, the video may only take up a small portion of the total visual area of the display device, in which case the placement of the video within the display device may be defined. For example, a corner of the video player area may be defined by an x-y coordinate, and then a height/width provided (e.g., in pixels, inches, etc.) that adds to this starting point (e.g., x+100, y+200). In this way, certain techniques disclosed herein may determine where within the total display area the video and secondary content (e.g., advertising) may be shown.

Figure 10:
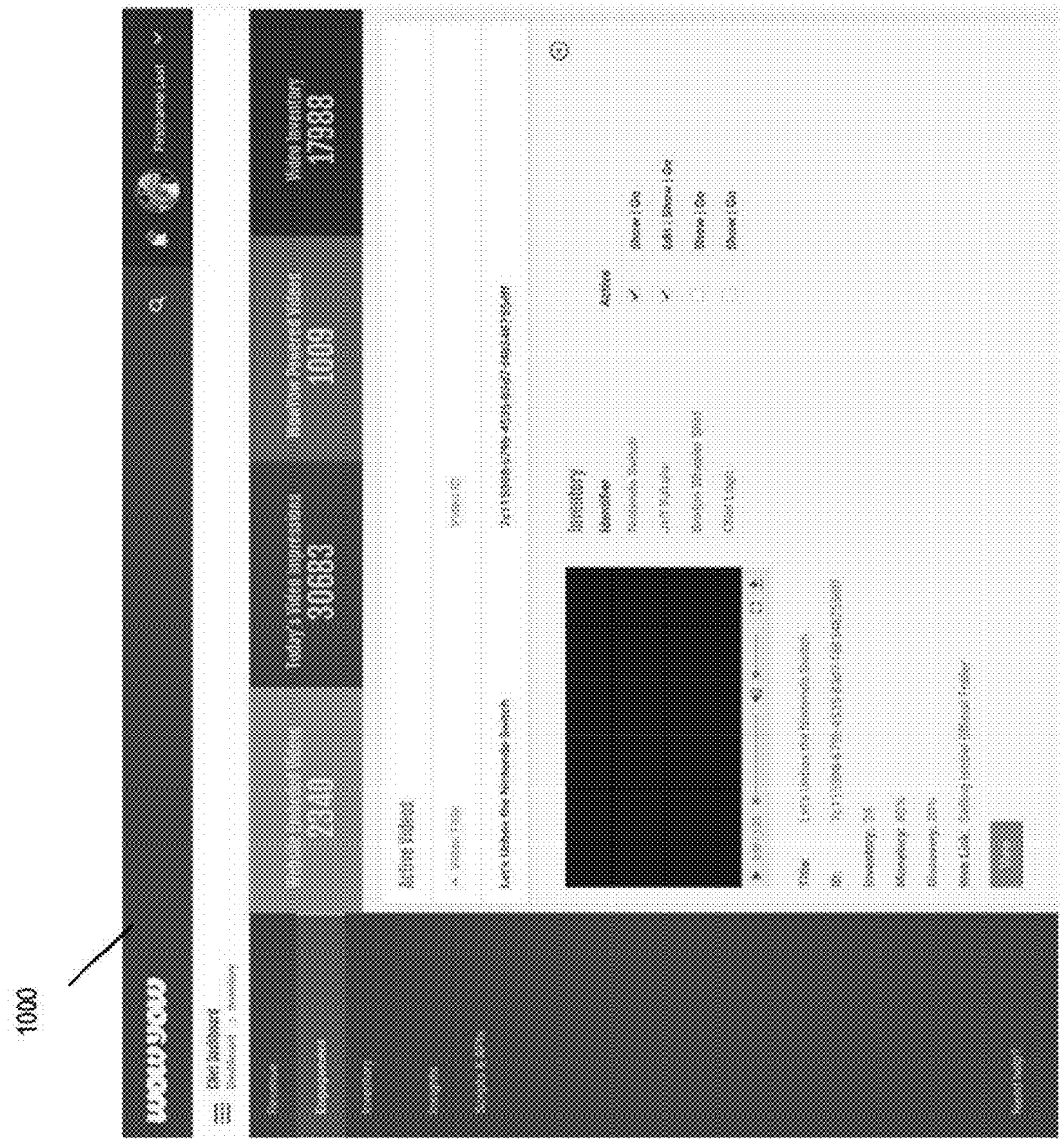
FIG. 10 is graphical representation illustrating an exemplary graphical user interface (GUI) presented to back-end system users (e.g., publishers or advertisers) according to the present disclosure.
Figure 11:
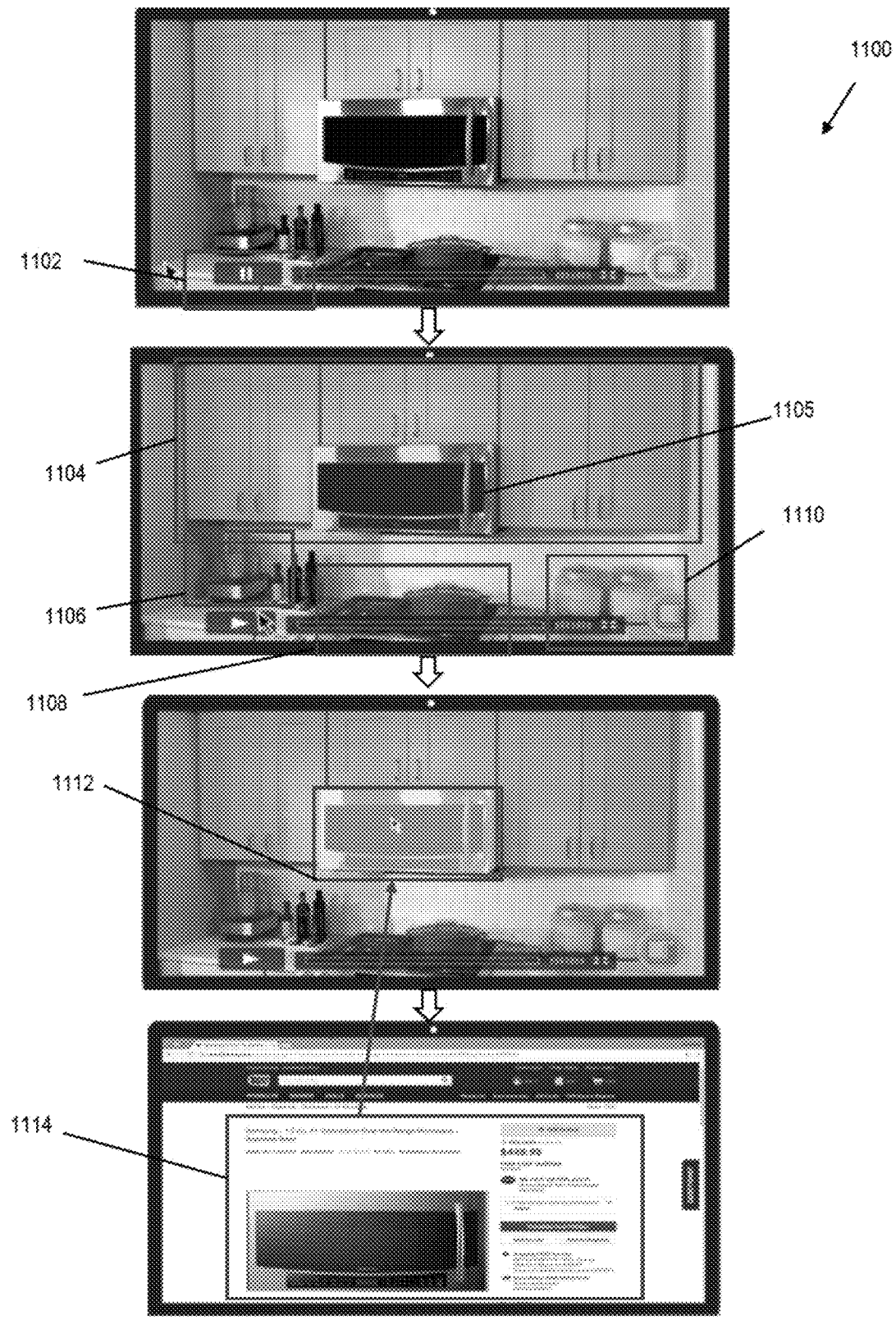
FIG. 11 is graphical representation illustrating an exemplary graphical user interface (GUI) presented to system "front-end" users (e.g., consumers) according to the present disclosure, wherein an in-video display and interaction paradigm is used.

Hence, a user interacting with the identified element (i.e., using their mouse to cause the cursor on their display to enter the region specified by the polygon data, and selecting it by clicking—see discussion of FIGS. 10-11 infra) tells the operative script, that the user has invoked a click within the element's region, thereby generating data indicative of an "interaction." Based thereon, the system API is called, and the data relating to the selected element (e.g., Q1234 corresponding to a white men's polo within the system database, or some other code indicative of that element in particular) is used by the API to access corresponding secondary content elements associated with the element ID, such as those provided or specified by an advertiser who makes/sells white polo shirts. In fact, the advertiser may sell multiple different colors of the same or comparable polo shirts, and hence in one example, data resident on the system database is returned by the API to cause provision to the user's device (via the interposed network connection) of data altering the color (as well as optionally other CGI elements such as texture, shadow, etc.) of the area within the selected polygon(s), according to a prescribed algorithm for sequence, timing, etc. Hence, a user clicking on the shirt worn by the human in the asset frame(s) can immediately be served and presented with secondary content; here, a quick series of color changes illustrating all of the colors available for that particular model of shirt. Notably, no pause, re-encoding, or processing overhead is imposed on the underlying media player application, since the rendering of the polygon(s) and colors, etc. therein is performed apart from the player or media data itself (i.e., by extant OS/hardware/software components of the rendering platform and its applications (e.g., browser)).

System Operation and Methodologies—

Exemplary embodiments of methods and algorithms utilized by the system of FIGS. 1-4 herein are now described in greater detail. It will be appreciated that the following methods and algorithms are merely illustrative of the broader principles of the disclosure; other permutations, algorithms, and logical flows will be recognized by those of ordinary skill when given the present disclosure, depending on the needs of the particular intended application(s).

System Asset Identification and Ingestion—

Exemplary embodiments of the logic used by the back-end system 101 for identifying, ingesting, and processing media assets and related data are now described in detail with reference to FIG. 5.

At a high level, the methodology of FIG. 5 may be implemented algorithmically by the system; i.e., the script resident on the page or application of interest gains access to the relevant information (as defined by the script code), and then sends the obtained data to the system back-end server(s), which then use that data to run and identify the media asset, and subsequently process it as described in greater detail elsewhere herein. For example, a YouTube video has a unique ID, which is extracted by the script upon execution and passed to the system, where the ID is used to locate and download the video, and process it. Notably, the process is platform-agnostic; i.e., which platform the user is on is not determinative, in that any video asset on the web is either a stream or a downloadable file (along with any other information which may be gathered from the video or the page it is on). Platform data, however, may be stored within the system database for other reasons as described in greater detail subsequently herein.

Figure 5:
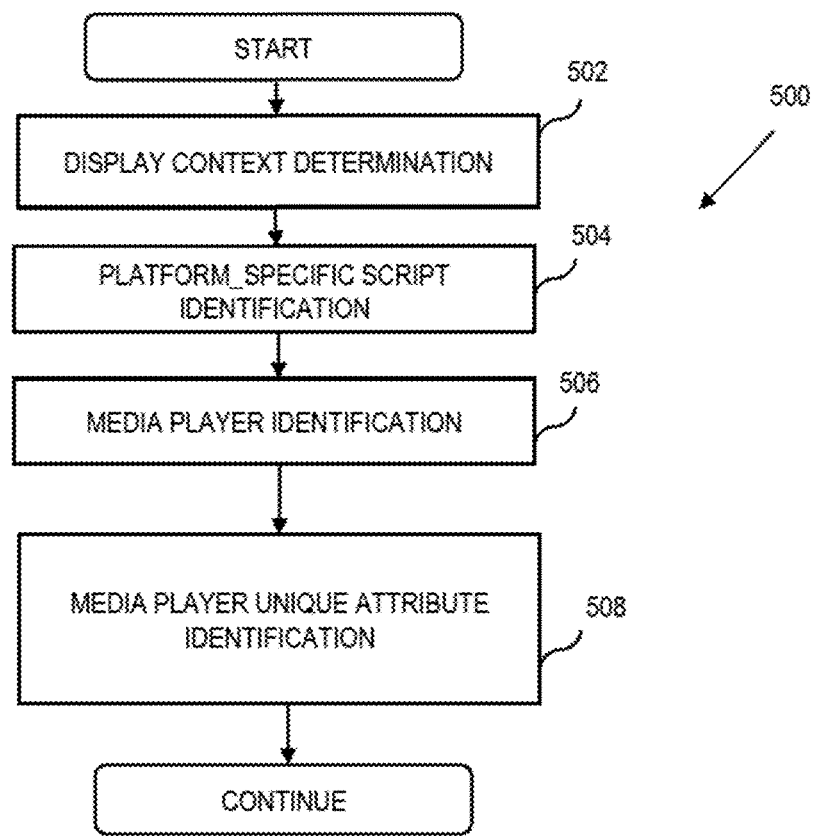
FIG. 5 is logical flow diagram illustrating one embodiment of a method of display context characterization according to the present disclosure.

First, at step 502 of the illustrated method 500 of FIG. 5, the display device context or platform is determined. Specifically, as described elsewhere herein, the code (including script) used by the system may be embodied in different types of platforms/applications, including on websites, and within user or consumer device environments (e.g., within a user's smart TV or mobile device). As such, different plug-in code modules are utilized for each different application, each adapted for that particular application; i.e., for the particular aspects of the rendering display device of the target platform. As discussed in detail elsewhere herein, various physical attributes of the display being used to render the (video) media asset of interest—for which interactive display elements and secondary content will be generated—are display-dependent, and hence the hardware/software attributes of the particular display device context are needed. All generally maintain the attributes of the video API 145 previously described herein, however. Specifically, it is often useful to know the attributes of the rendering device so that appropriate code (relative to the rendering codec, player, etc.) can be selected. For example, one type of environment/encoding (e.g., that found on an IoS-based device) may react differently to code than an Android OS-based device would. Attributes of the particular display device used by the platform may also be obtained to enable proper rendering of the various display elements thereon. Moreover, some devices show things differently or have limitations that need to be adjusted for; e.g., default or selected media player application, which may require different code/treatment than another player.

Next, per step 504, the appropriate software environment is determined for the display device context from step 502. For example, different target platforms (e.g., smart TV, website via user PC, smartphone) will utilize different operating systems (O/S) and have different script code requirements and/or utilize different software development kits (SDKs) (e.g., JavaScript vs. Node.js vs. Python), and hence an appropriate script model is selected for the target platform.

Next, per step 506, the media player type is identified. Any number of different media players may be involved, including e.g., YouTube, Vimeo, DailyMotion, Facebook, Twitter, HTML5, custom or third-party players, an indigenous smart TV player (e.g., app or software loaded onto the smart TV at time of manufacture and configured to operate within the smart TV's O/S environment), or Android O/S or IoS compatible players. In one exemplary implementation, the file format of the media asset (e.g., video) is advantageously not required, just the identity of rendering platform itself and its rendering "environment." For example, the following exemplary routine can be used to obtain environment data (function getUAEnvironment(env)):

```
{
        if (!env) env = { };
        env.width = wyTopWindow.innerWidth;
        env.height = wyTopWindow.innerHeight;
        env.flash = isFlashSupported( );
        env.ios = testUA(/iphone\ipad\ipod/i);
        env.iosDevice = getIOSDevice(env.ios);
        env.android = testUA(/Android/i);
        env.orientation = (env.ios || env.android)       ?
getOrientation(env.ios) : false;
        env.viewport = getViewport( );
        env.chrome                                       =
navigator.userAgent.indexOf('Chrome') > -1;
        env.explorer                                     =
navigator.userAgent.indexOf('MSIE')           >    -1    ||
navigator.userAgent.indexOf('Trident/') > -1;
        env.edge = navigator.userAgent.indexOf('Edge') > -
1;
        env.firefox                                      =
navigator.userAgent.indexOf('Firefox') > -1;
        env.safari = navigator.userAgent.indexOf ("Safari")
> -1;
        env.opera                                        =
navigator.user Agent.toLowerCase( ).indexOf("op") > -1;
        env.safari = (env.chrome && env.safari           ||
env.edge) ? false : env.safari;
        env.chrome = (env.chrome && env.opera            ||
```

```
            env.edge) ? false : env.chrome;
                env.audio                                   =
            !!wyTopDocument.createElement('audio').canPlayType;
                env.video                                   =
            !!wyTopDocument.createElement('video').canPlayType;
                return env;
            }
```

Moreover, other unique aspects of the video player may be obtained via step 508. For example, unique aspects of player may also include the "size and shape" of the player' for example, most videos are rendered according to a particular aspect ratio (e.g., 16:9. 4:3, etc.), yet the media player posted on the webpage of interest does not adhere to that ratio, and hence adaptation between the player and media may be required.

Figure 6:
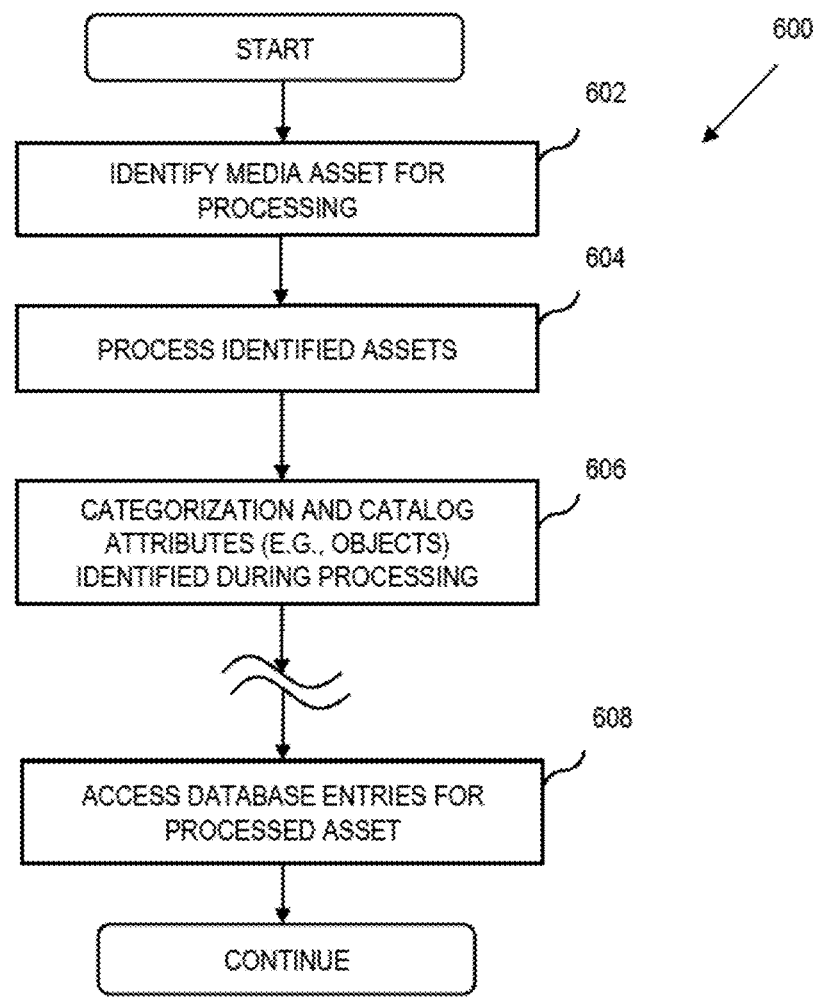
FIG. 6 is logical flow diagram illustrating one embodiment of a method of media asset identification according to the present disclosure.

Referring now to FIG. 6, one embodiment of an exemplary process flow 600 for media asset identification, processing and cataloging within the system 101 of FIG. 1 is shown and described.

Per step 602, media assets to be processed/pre-processed by the system are identified. In one exemplary embodiment, the assets are identified by virtue of either an interaction with the asset on a "tagged" (i.e., code enhanced) website, or another mechanism of identify assets (such as e.g., a participating host or publisher site providing the system 101 with data representative of an inventory of assets accessible on their site(s), which can then be used to cause subsequent processing of the identified assets).

In one exemplary embodiment, the aforementioned "tagged" website includes a plug-in module which includes code to detect events that occur on the page and on the media player application relative to a given asset on the site (e.g., clicking on a "play" icon of the video displayed on the host website page rendered on the user's display). The asset is then queued for subsequent processing by virtue of its URL (e.g., either downloaded automatically via HTTP session, or the video stream can be read by the system server(s).

Notably, the exemplary embodiments of the system described herein do not utilize a web "crawl" or similar process like prior art approaches such as Google. In one embodiment of the system, assets (e.g., videos) are only deemed "meaningful" when an interaction with the asset, such as by a human or a computer process, is determined, thereby indicating at least some threshold level of interest in the asset. In one exemplary implementation, media player application actions (e.g., pausing, playing, hovering, etc.) are combined with pre-processing logic) so as to rank or queue media assets for back-end system processing. For example, media assets which have had an affirmative player interaction by a user can be given "head of the line" privileges for processing ahead of those absent such interaction.

Next, per step 604, the identified assets are processed by the system 101. Depending on the temporal context (i.e., whether the processing is to be conducted contemporaneous with rendering by a media player application (or a "live" media stream as discussed elsewhere herein), or in advance thereof—aka "pre-processing"), the asset is either processed immediately or queued for later processing by the system (e.g., by the server farm 220 shown in FIGS. 1-2).

In one embodiment, "plays" or other interactions detected during a given period (e.g., a period from midnight of a given day through 10:00 pm that same day) are logged by the system via the respective scripts, and the corresponding video assets are processed by back end during the "off-period" (e.g., 10:00 pm through midnight). Accordingly, in such a model, the system users (e.g., customers sponsoring element-based advertising within certain of the pre-processed assets) will not see "hits" on the asset via their back-end UI until the corresponding asset is processed, even though "play" for that asset was selected earlier that day or the day before.

In another implementation, a video manual tagging platform is utilized as part of the system. Two primary variants of this functionality are provided, depending on the desired application; (i) one configured for use on user pages (webpages), such as via mobile user devices; and (ii) one configured for use on any web page, operative as a browser application plug-in module. In one exemplary implementation, so-called "bookmarks" are utilized, such that the media asset (e.g., the video file) itself doesn't have to be downloaded or processed; rather, the system simply tags the video where it resides as a visual state, rather than as a file or streaming state 'as it plays.' Each of the foregoing variants (i) and (ii) advantageously leverage the previously described media player-agnostic system API, and enable user-directed "tagging" of any media asset on the web (or intranet), thereby, inter alia, obviating having to warehouse or possess the media asset.

It is noted that in the some instances, assets such as videos will "auto-play" on a given site/page. For instance, if a user selects a URL associated with a news article, an associated advertisement video may be configured to auto-play once the page is loaded. Hence, in one embodiment, the system of the present disclosure is configured to count or measure a play period for purposes of determining whether a given asset was engaged or utilized by the user (e.g., the user did not stop for 5 seconds, so that failure to terminate or pause the auto-play of the asset is considered a "play" (or impression) for accounting purposes).

In other cases, certain assets may have "pre-roll," "mid-roll," or "post-roll" audio/video associated therewith; i.e., where a user selection of the (primary) asset causes an advertisement video to play before/during/after the primary video is rendered, respectively. In one embodiment of the system, such pre-/mid-/post-roll assets are simply ignored from the perspective of the script (and any back-end pre-processing). Specifically, it can be determined that a given pre-/mid-/post-roll video is not a primary asset, since its associated ID is not that of the primary video (i.e., two distinct IDs are present for the respective video elements). Hence, in one implementation, where multiple IDs are present as determined by the script, only one of them (that of the primary asset) will be forwarded to the back-end server for further analysis. In one implementation, primary assets are identified based on domain (e.g., a primary asset is resident on a different domain than advertising assets). Alternatively, if the primary asset and secondary content are on the same domain, indicator data may be used to make the identification (i.e., data present that indicates rendering of a "pre-roll" advertisement).

Alternatively, in another embodiment, the system is configured to correlate the usage or presence of an ancillary asset (e.g., a given pre-/mid-/post-roll video) on one primary asset with comparable usage on one or more other assets, and utilize this data to determine one or more subsequent courses of action for the ancillary asset. For example, if a pre-roll video is associated with a sufficiently high number N of primary assets, then the pre-roll video itself may be elevated in stature by the system to a "primary asset" of sorts, and pre-processed by the system (and entered into the database under its own unique identifier, as described elsewhere herein. In the case of auto-play between consecutive assets (e.g., where a second video automatically plays after the first), the exemplary embodiment of the system is configured to stop or suspend the auto-play sequence at the conclusion of a given asset, and monitor for a video ID transition. Once the ID transition is detected, the second (transitioned-to) ID is optionally evaluated by the back-end (e.g., via forwarding by the script) to determine whether it is associated with another "primary" asset within the system; if not, the script is disabled, and the auto-play suspension released.

Alternatively, in another variant, the script is utilized to determine whether the user is still watching (i.e., user didn't turn off play of the media application, or navigate away from the host web page), and hence the new video ID is then used by the backend as the basis for serving displayable elements to the user in association with that (second) video.

During processing, one or more aspects of the media asset are analyzed by the various algorithms and code modules operative on the server(s) of the farm. For example, as described elsewhere herein, one or more of the following operations may be conducted on one or more portions of a video media asset: (i) polygonal/shape analysis (e.g., identification of objects rendered with the processed structural components of the video, such as I-frames, based on shape); (ii) color analysis (e.g., analysis of portions of the processed structural component, including those identified via the polygonal/shape analysis, for color); (iii) texture analysis (e.g., analysis of portions of the processed structural component, including those identified via the polygonal/shape analysis, for texture, including repetitive patterns); (iv) crop and facial analysis (e.g., for gender identification, identity determination); (v) textual analysis (i.e., evaluation of textual renderings within the frame(s) or other structural components of interest); (vi) metadata analysis (e.g., extraction and analysis of ancillary data associated with the media asset); (vii) audio track analysis (e.g., use of speech recognition or other technology to identify words with audio portions of the video asset); (xiii) similarity analysis (e.g., utilization of one or more portions of the video and/or audio data of the asset for comparison to other assets, stored templates, and/or stored imagery/audio data); (ix) object/shape motion analysis (e.g., to track movement and/or aspect changes of an identified shape or element on an intra-frame basis); and (x) contextual analysis (e.g., use of one or more of the foregoing to attempt to identify one or more general or specific contexts associated with the video asset.

Per step 606, once an identified asset has been processed, it is categorized or cataloged as to the various attributes thereof based on the data generated during processing. For example, in one embodiment, an overall or global identifier is assigned to the asset based on its uniqueness (e.g., a completely new or unique video will be assigned a new generated global ID, whereas an extant or already identified asset will be given an "as found" unique ID; i.e., generation of a unique internal system ID value for each video so that it can be referenced. For example, YouTube ID: 32432 might be given WowYow ID: 093ai23.

In the case of two assets (or individual objects) having a high degree of similarity, the exemplary implementation of the system uses a comparison routine to assess the level of similarity, according to one or more prescribed criteria specified by e.g., system operator input. For example, in one such approach, two media assets/objects are considered 'close enough' to be considered the same asset if the algorithmic analysis determines that they meet or exceed a prescribed similarity score or threshold value, such as based on execution of a series of logical "if" statements. Criteria used by the algorithm(s) as part of these statements may include: (i) is there a brand identified or associated?; (ii) is the item considered part of a taxonomy?; (iii) what color is the item? (example: men's black sweatpants); (iv) has the gender been determined?

It is noted that an extant or already cataloged asset may be similar or substantially identical to another asset, but with minor differences, annotations, etc.; generally speaking, all video assets (even of the same subject matter) have inherently differences because of the way video files are encoded, tagged, etc. As such, each different instance is in one implementation identified by the system via a unique ID, albeit with similar or related attributes. For example, users can play 'portions' of a video which may be identical to those of other assets; such assets can be potentially identified and cataloged based on e.g., calculation of—cropped start time→cropped end time——=frame X→frame Y of the original (cataloged) video asset within the database.

Moreover, as different attributes of the asset are identified (i.e., per processing in accordance with items (i)-(ix) above), these may each also act as an independent basis of categorization for that asset. For example, if processing of a given video indicates that Dwayne Johnson is present within the video, as is a set of golf clubs, then these two items can be used as a basis of storing data particular to those attributes within the database as part of one or more data sets associated with the global ID of the asset itself. Hence, video asset ID 123456 may have item attribute IDs X4567 and P789 associated therewith (for Dwayne Johnson and the golf clubs, respectively) in a relational or other database structure such that one searching for any of the foregoing three IDs will be able to correlate the other two IDs.

As described in greater detail elsewhere herein, this underscores a significant benefit of the exemplary technology of the present disclosure; i.e., that a large number of (cataloged) assets within the system database can be accessed in multiple data "dimensions", including two or more simultaneously. For example, one query of the database may request all global IDs having attribute ID X4567 (for Dwayne Johnson in the example above). Another query of the database may request all global IDs having attribute ID X4567 (for Dwayne Johnson in the example above) as well as attribute ID P789 (golf clubs). These results can then be utilized by e.g., customers of the system operator (such as advertisers or publishers) to correlate their secondary content, such that the secondary content is contextually relevant (examples of such contextually relevant secondary content might be upcoming movies starring Dwayne Johnson, a new line of golf clubs, and advertisement for a golf tournament in which Dwayne Johnson is playing as a celebrity participant, etc.).

It will be appreciated that other attributes of the processed assets may be used as a basis for categorization as well, including for example the host or publisher site on which asset is found, the source or publisher of the asset (e.g., what entity created the asset), details such as runtime of the asset, encoding scheme, and/or yet other data (including that which does explicitly relate to processed attributes of the encoded media content itself).

Lastly, per step 608 of the method, the cataloged (and categorized) assets within the database are accessed, such as via the aforementioned queries, so as to identify relevant assets for a given customer of the system operator (or other user).

Figure 6A:
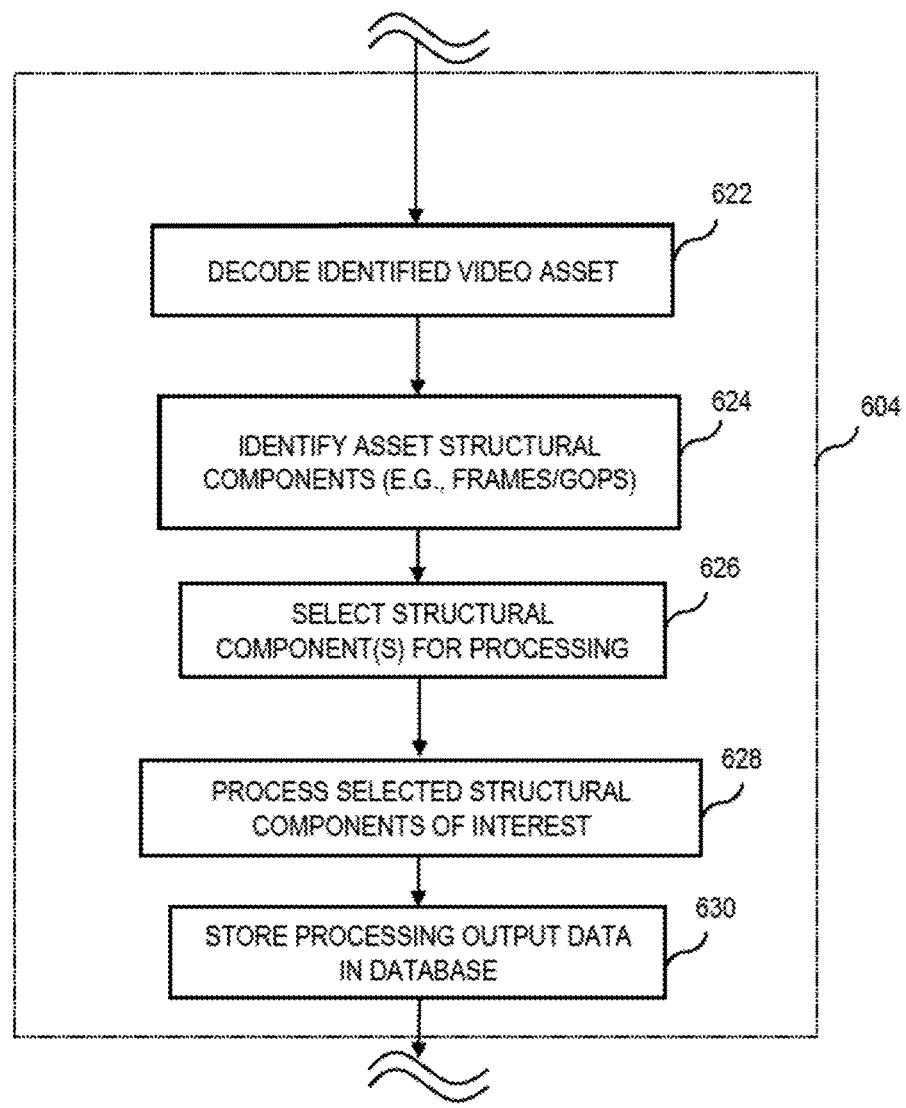
FIG. 6a is logical flow diagram illustrating one embodiment of a method of media asset structural processing within the method of FIG. 6.

In one implementation, the methodology of FIG. 6a is utilized for the video asset processing (i.e., for step 604 of the method 600 of FIG. 6). Specifically, as shown in FIG. 6a, the video asset processing methodology includes first decoding the video asset using the system 101. In one embodiment, the system is configured to first decode the associated media file (or "chunks" in the case of a video streamed pursuant to a manifest file, as described elsewhere herein) for one or more identified assets, per step 622.

Next, per step 624, the decoded files/chunks are algorithmically analyzed using the system 101 to identify one or more structural components (e.g., I-frames, GOP boundaries, etc.) within the analyzed file(s)/portion(s). For instance, a typical GOP may include 15 discrete frames; of those frames, some may be I-Frames, B-Frames, and P-Frames. Hence, algorithmic identification of the resident structures of interest (e.g., I-frames) is utilized so as identify structures containing useful information for the implementation of the user-interactive functionality described herein.

For instance, in one implementation, the content element (video) under analysis is broken down or disassembled into a number of GOPs, with each GOP having a prescribed (i) number of frames (e.g., 15 frames per GOP); and (ii) GOP structure (e.g., closed GOP, open GOP). The disassembly also identifies the types of each frame (e.g., I frame, B frame, P frame). This data is automatically assembled into a metadata file that is associated with that asset, and which is utilized by another analysis process, such as for example to perform the object/attribute identification processing described below. For instance, I-frames (representing in effect a "complete" frame or picture) only may be selected as the basis of subsequent attribute processing (step 626 discussed below). More complex approaches may be used as well; e.g., picking only frames where significant change has occurred from previously processed frame(s), thereby reducing double-processing of very similar images.

Per step 626, one or more of the identified structural components from step 624 are selected for further processing. For example, at least one I-Frame may be selected by the algorithm for more processing. Alternatively, a sampling approach may be used; e.g., one I-Frame from each identified GOP, or a series of temporally contiguous I-Frames.

In another variant, predictive models may be used to determine e.g., where a given item may be within a data structure (e.g., frame) or set of frames under analysis. For example, it may be known that an object is present in frames 10-13 and 15-20, but it is logically inconsistent that the object is missing from frame 14 of the sequence (since there was ostensibly no scene change or other event which would remove or obscure the object in that frame). Hence, it is hypothesized by the algorithm that an erroneous decoding of frame 14 occurred.

As another example, if the object (absent) from frame 14 in the prior example was in fact absent because it was blocked by another object, predictive frame data (or the absence thereof) can be used to support this hypothesis; i.e., the object in frame 13 had no motion or prediction of motion associated therewith, so if/when it appears again in frame 15, it can be reliably presumed that it was still located in the same place in frame 14 (but merely obscured).

The foregoing predictive approaches can advantageously be used to obviate "start from scratch" processing of a "new" object as well. For instance, in the context of the foregoing hypothetical, the object is shown in frame 12 at location A, and at location A+M/N in frame 13. Based thereon, it can be predicted to be located A+M/N+Q/R in frame 14, and A+M/N+Q/R+S/T in frame 15, and so forth (where M/N, Q/R, S/T indicate e.g., incremental X-Y rendering coordinates or other frame of reference for the frames). Accordingly, when the object is not detected in frame 14, and an object is detected again in frame 15, two hypotheses are possible: (i) that the object in frame 15 is the same object; or (ii) that the object in frame 15 is a similar but new (previously unseen in frames 12-13) object. Use of the predictive data can obviate having to evaluate hypothesis (ii); i.e., it is known to be the same object based on the predictive data regarding its motion. As such, steps such as color evaluation, texture evaluation, polygon evaluation, etc. for the new/old object in frame 15 can be eliminated, thereby reducing processing overhead and lag.

Next, per step 628, the identified structure(s) of interest are processed using the processing algorithms of the system as described elsewhere herein; e.g., for polygon/shape identification, color detection, texture analysis, textual identification, etc. Comparison/identification algorithms may also be utilized to, e.g., to identify people of interest such as celebrities, determine the identity of objects, and similar functions which aid in context determination of the processed portion of the asset.

Data regarding these processing operations are stored within the database of the system per step 630, such as according to the categorization scheme described above (e.g., each attribute of interest is provided an identifier or ID value which allows for cross-referencing and search of the database at a later time).

Figure 7:
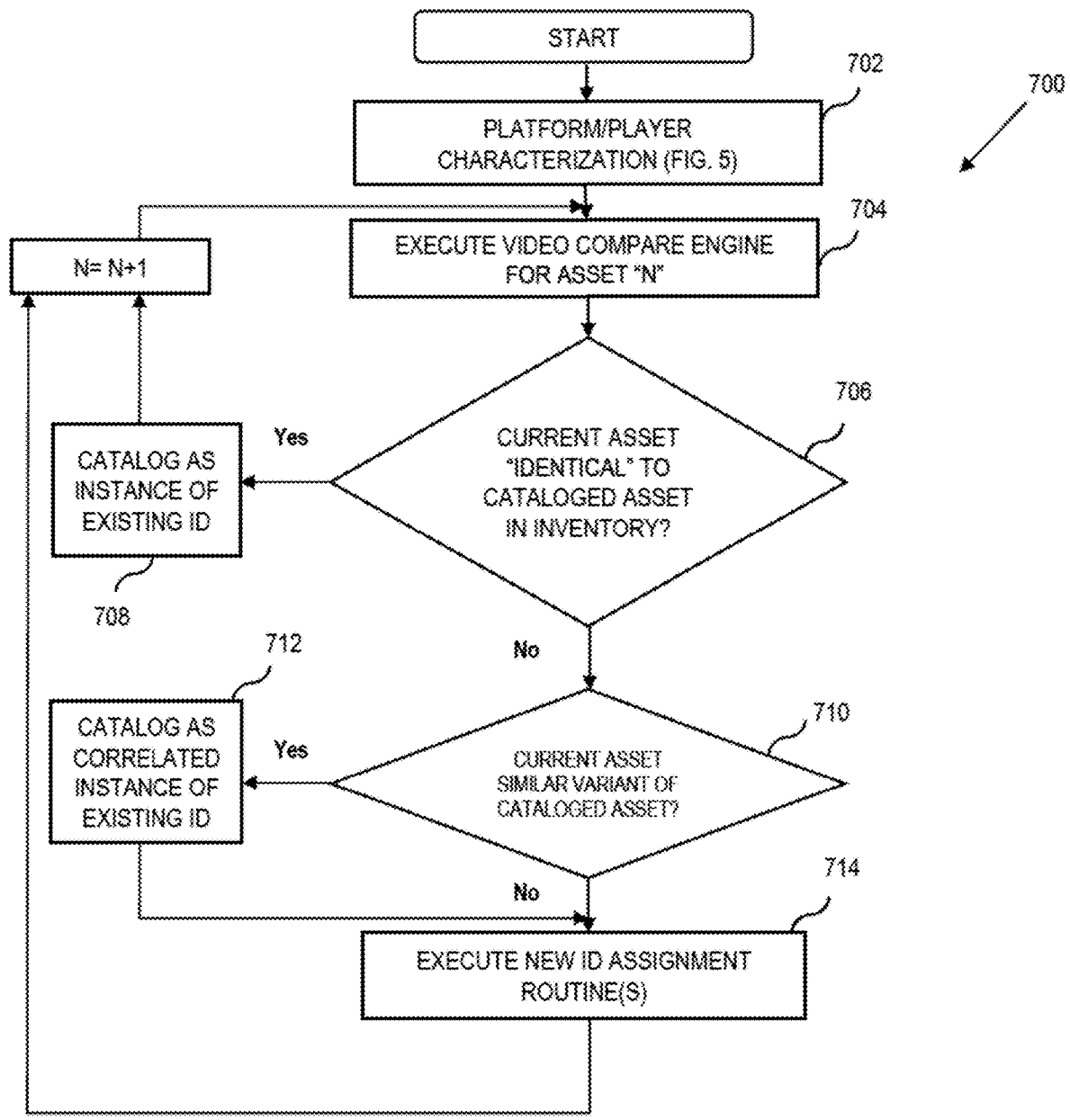
FIG. 7 is logical flow diagram illustrating one embodiment of a method of media asset characterization and identification according to the present disclosure.

Referring now to FIG. 7, one embodiment of a methodology of assigning unique (global) identifiers to media assets by the system of FIG. 1 are shown and described. Specifically, in this process 700, a player-agnostic asset identifier (AI) is generated based on analysis of the asset, including various attributes thereof, and its use environment. Generally speaking, in order to determine whether a given asset is allocated a unique identifier, it is analyzed by the system according to a number of different dimensions or criteria, including the rendering player and display environment, similarity to other previously processed assets, etc., as described in greater detail below.

As previously discussed with respect to FIG. 5, in the case of an exemplary video asset, the asset may be displayed on any number of different target platforms, including for example a website/web page (e.g., streamed and decoded/rendered via an application computer program (e.g., app installed on a smartphone or tablet), transmitted and played as a file on the rendering device, or streamed or played on a smart TV. Moreover, the script or SDK (software development kit) utilized may involve any number of different programming languages or environments, such as e.g., JavaScript, Node.js, or Python. Accordingly, per step 702, the platform/player Characterization algorithm 500 of FIG. 5 is first run to determine the environment within which the code module (e.g., plug-in) will operate.

Next, per step 704, the asset unique identification algorithm is run. In one implementation, the identification algorithm leverages both (i) cataloging of attributes/assets previously processed or ingested by the system, and (ii) an asset "compare" engine which compares the various aspects of the asset under evaluation to those of other (previously) cataloged assets, to determine whether a new (unique) global ID is generated for the asset (i.e., it is truly "new" to the system/database), or rather as a duplicate or close variant of an existing asset.

In one exemplary embodiment, the system is configured to catalog media assets (e.g., video) and objects or other associated elements identified by the algorithmic processing; such assets/objects may also be present in other media assets (e.g., a common portion of a first media asset within a second asset, a common object, common text, etc.). This approach advantageously enables, inter alia, search and identification of inventory within the system database on a per-object basis regardless of association of the host video asset with a given site or client; e.g., "find me all video assets with basketballs in them" can be services using the unique ID of a basketball generated by prior processing of the library of inventory by the system.

In one implementation, the system includes a video comparison engine (i.e., routines 302 operative to run on the server/farm 220) which compares one or more attributes of the media asset under evaluation to data associated with other media assets already ingested/processed by the system, and cataloged therein. For example, in one variant, the algorithms are configured to evaluate items such as: (i) common presence of one or more identified elements (e.g., identified celebrities or goods/services) at common temporal locations within the two assets being compared; (ii) common length/run duration (excluding e.g., mid-roll, or post-roll content); (iii) common metadata/textual data (e.g., common words, especially unique or descriptive words) within a title, or rendered within the media data itself upon decode; and/or (iii) common attributes relating to the encoding, player, etc, as described elsewhere herein.

As a brief aside, various temporal aspects of the media asset may exist. For example, a video itself may have an inherent length of time to it (i.e., play duration when rendered using the media player application at a prescribed (normal) speed). Further, each video frame will have a temporal coordinate within the total video length, which may be provided or derived from the frame order number and display frame rate. The video length and/or frame presentation time may be used for certain display or "trick mode" functions, like pause, play, stop, fast-forward, rewind and so on. Another time element relates to the absolute time when the video asset play or rendering starts. Also, an instance in time may be provided or derived, such as the actual time right now, or the actual video time (or frame number) of the current frame being displayed. Each of these time components or elements, and the dimensions discussed above, may be stored, recalled and otherwise used by certain embodiments disclosed herein.

Returning again to FIG. 7, per step 706, if a prescribed level of similarity is determined (see e.g., the previous discussion regarding asset similarity), database references for the existing asset (and newly processed asset, as appropriate) are updated to reflect any identified correlations per step 708 (i.e., the two assets are effectively identical, and merely different instances of the same base content). For instance, once two assets are determined to be "identical" or sufficiently similar, the extant database entry for the previously processed asset may be updated with the additional website URL or other reference of the newly identified asset.

Conversely, if the two assets are not deemed identical per step 706, the current asset may be evaluated for similarity according to a second prescribed threshold; e.g., as "correlated but not identical" per step 710. Specifically, if the two assets are similar yet not identical with respect to one or more prescribed attributes (e.g., same general subject matter and context, but having some distinctions), then the two assets may be linked as "correlated but not identical"—accordingly, any subsequent search of the database which identifies the one asset will be linked to the global ID of the other asset (step 712).

Optionally, where close approximations of a given video exist, the system can also utilize an "approximation engine" to determine with greater granularity the similarity of two assets. For example, two discrete videos (e.g., at different URLs) may be identical or virtually identical, (e.g., only have different naming, different encoding format but same run-time, approximately the same run-time, etc.), and hence the characterization (back-end processing) of one of the videos may be utilized with regard to the second video, without having to re-process the second video as was conducted for the first video. In one implementation, the approximation engine comprises a back-end process operative to run on the server(s) and compare two or more target assets to identify such similarities. While there is no substitute for the "gold standard" of pre-processing every asset individually (and hence being assured of its content, locations of displayable elements, etc.), there may be hundreds or even thousands of individual iterations of the same video found online on different sites/URLs, especially where the video relates to a highly popular topic or event. Hence, the aforementioned approximation engine enables the system operator to obtain a good or even high level of assurance of the similarity of two or more assets, without having to expend the very significant (and potentially unavailable) processing overhead associated with complete pre-processing of each.

As noted above, the approximation engine, when executed, can determine one or more attributes of each target asset, and utilize internal ranking or scoring algorithms for the putative similarity. In one implementation, if the score generated by the engine exceeds a prescribed threshold, it is automatically considered "similar", and the attributes/data for the already processed (base) asset are ascribed to the evaluated (target) asset within the system database, and a common identifier assigned. However, at lower scoring levels, the target may be: (i) rejected as unique/dissimilar; or (ii) routed to a queue for human or further algorithmic evaluation. In one implementation, the algorithms referenced above are assisted by a human "check" or assist, especially in cases where some ambiguity exists in terms of context or attribute identification. For instance, a majority of processed video elements may be correctly identified by artificial intelligence (and hence require no human confirmation or assistance), while a smaller portion cannot be categorized to a sufficient level of certainty as specified by the algorithm. Hence, a given implementation of the algorithm may require that identification/categorization to a 95% confidence level (as measured by the success/failure of individual algorithms or comparisons/testing between a hypothesis and the actual element) may cause certain processing decisions to be routed to a human reviewer (e.g., via a listing maintained by the software) for the reviewer to resolve.

Moreover, the foregoing approximation engine analysis may be conducted on a piece-wise or incomplete basis; e.g., one asset may be effectively identical for a certain portion thereof (e.g., the first or last X:YY minutes:seconds, the first 1000 frames, etc.), and hence the system can apply a "partial" association of the target asset with the processed (base) asset for those portions where identicality/sufficient similarity has been identified. In one such implementation, the target asset is indexed as being identical to the base asset, yet the validity of its data only extends for the prescribed period, number of frames, or other metric utilized. Any requests for data for frames or portions outside that prescribed portion will simply return a "no data found" or similar error code/message.

Referring again to FIG. 7, if the current asset is not sufficiently similar to others to meet the (reduced) threshold of step 710, the new ID assignment routine is executed to create a new entry for the newly processed asset within the database or a Json storage folder (i.e., a unique global ID assigned to the new asset) per step 714. For example, a given media asset may be identified by a site-specific ID, e.g., YouTube ID XYZ, and may be present on multiple different websites and/or customer websites. Hence, in one variant, media asset (e.g., video) information is stored as both a network asset and a client(specific) asset. Note also that once a video has been processed by the system, it can be 'turned on' for all clients or subsets thereof, as determined by the system operator.

It is further noted that the actual media data of the asset may also be stored in the database or another designated storage location; i.e., the asset copied and saved within local or cloud storage accessible to the system. For instance, in one use case, re-processing of the asset may be desired; e.g., improvements may have been implemented to the analytical algorithms of the system, and/or new elements of interest identified via other methods.

System Analytical Engines and Object Processing—

As referenced above (and described in greater detail below), the exemplary embodiments of the back-end system 101 of FIG. 1 utilize code modules with algorithms (engines 302 as in FIGS. 3 and 4) which perform a number of functions within the system, including: (i) text and object detection with video media assets; (ii) comparison of media assets and objects; and (iii) contextual/relevancy analysis, as well as supporting operation of the media and customer APIs 145, 159.

As used in the present context, the term "object" refers to objects or elements present within a media asset or webpage. These objects may be associated with the underlying protocol or language used to render the asset, webpage or structure, or may be wholly independent therefrom. For example, a webpage rendered using HTML or CSS (Cascading Style Sheets) will have certain prescribed structural elements described using the HTML/CSS language or syntax; these elements (e.g., a rectangle within which a particular .jpg or other data structure is loaded) may be considered as "objects" defined within the larger web page. Windows, banners, text, etc. may all constitute "objects."

Similarly, media data structures (e.g., H.264-encoded video data) maintains data structures within its "language" or protocol such as I/B/P-Frames, GOPs, headers.

Yet further, the aforementioned frames of the video data may include representations of actual tangible objects (e.g., a human face, set of golf clubs, etc.), as well as computer generated objects such as superimposed text or banners, images constrained within prescribed borders, etc., which are artifacts of the video authoring software. See e.g., FIG. 4, wherein a frame 402 of a video asset is shown, including video data playing within a prescribed display window, and a non-static textual banner overlay 404 that the user can read while viewing.

Hence, in the exemplary embodiment, the back-end system 101 described herein can analyze objects at a video frame level (e.g., within an I-Frame or other designated structure of the asset) to identify and interpret the contents of the video frame, without having any a priori knowledge of the contents of the video frame or asset. Specifically, a combination of 'server-less' state functions and APIs are used to provide augmented or computer "vision" for analysis of the selected data structure (e.g., I-Frame of an H.264-encoded video) of the target media asset.

As is known, server-less architectures refer to architectures or applications that significantly depend on third-party services (also known as "Backend as a Service" or "BaaS"), or on customized code operative to run in ephemeral containers ("Function as a Service" or "FaaS"). Server-less architectures or applications may substantially or even fully depend on network-based third-party applications or services (i.e., "cloud" based services) to manage server-side logic and state. Exemplary server-less use cases include client applications that use the ecosystem of cloud-accessible databases, authentication services, or other services to provide desired functions supporting the application.

One type of server-less application utilizes server-side logic which is compatible with/written by the (client) application developer; however, unlike traditional server architectures, such logic may be run in stateless compute containers that are event-triggered, ephemeral (e.g., may only last for one invocation), and may be fully managed by a third party. Advantageously, such implementations provide low operational overhead, lower cost, and greater use of function-based utilities, so that different functions within the system can be partitioned out into utilities (routines) that can be used at different times for different purposes. For example, a facial image cropping routine can be used across the entire system (which may be comprised of numerous server processes at different site), as opposed to within a limited hardware/software environment (e.g., a single server tasked with doing all facial cropping).

1. Text Object Analysis

Figure 8:
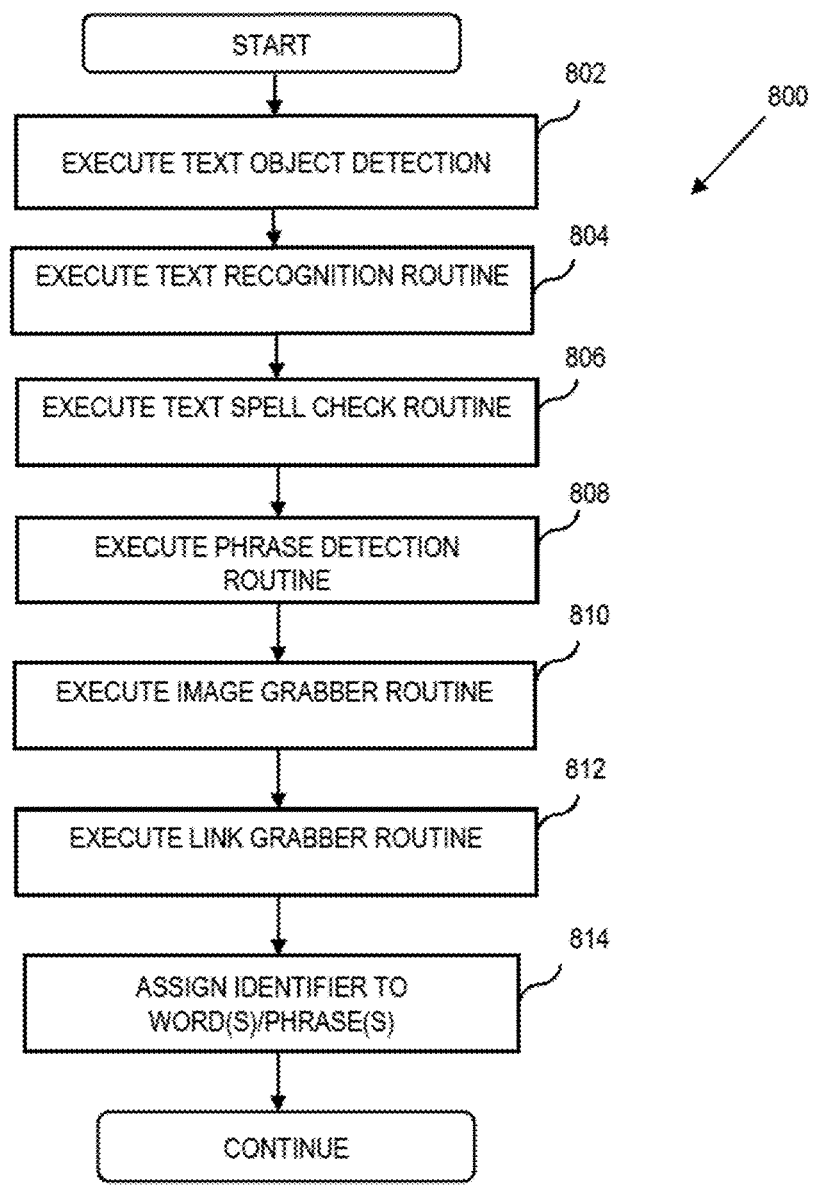
FIG. 8 is logical flow diagram illustrating one embodiment of a method of media asset textual or language element processing according to the present disclosure.

Referring now to FIG. 8, one embodiment of the method 800 of textual object processing according to the disclosure is described. In one exemplary implementation, an intra-space object recognition engine is first utilized by the back-end server(s) 140 to analyze content on a given web page and convert any media assets located thereon (e.g., videos hosted on a new provider website) into inventory for storage in the system database. in one exemplary implementation, this text element processing is distinct from the asset object detection engine, such that the two can be executed independently based on one or more initiation criteria. Specifically, per step 802 of the method 800, the extracted data structure (e.g., I-Frame of interest) may first be processed to identify "objects" therein, including objects having textual or language-based/iconic content, using one routine or the other first, or concurrently, or in isolation.

Next, per step 804, a text recognition routine is used to recognize characters within the identified textual object of step 802. In the exemplary implementation, the text recognition function of the system is implemented using a server-less state used as a function, rather than a server processing unit as in more traditional architectures.

A spell checking routine is next utilized (step 806) to process any identified text against a back-end system (or third party) text database, such as to ensure that the text is correctly spelled within the identified (or presumed) language when extracted.

Further, per step 808, a phrase detector routine is used to evaluate the text (including various portions thereof, such as individual words or aggregations thereof) against a list or database of 'meaningful' words and phrases within the identified or presumed language.

Additionally, an image grabber routine is utilized (step 810) to correlate one or more images to identified words or phrases. For example, in one implementation, the correlation is performed by correlation algorithms which attempt to associate (i) the context of the identified word(s) or phrases to (ii) an image having a similar context. Different levels of association/match can be selectively utilized, based on one or more parameters specified by the system operator. As an illustration, consider the instance where a word/phrase is highly descriptive in and of itself (e.g., "Super Bowl," which relates to U.S. (NFL) football with a very high degree of certainty). As such, football-related imagery (regardless of what teams were actually involved in a given game) would likely have a good degree of correlation. Conversely, the term "sports" is generic, and may relate to any number of different sporting events, activities, or even as a non-sporting-related verb "e.g., John sports a fine white polo shirt." As such, a sports or non-sports related image may be appropriate. The image grabber routine is this configured in an exemplary implementation by the operator to obtain images based on a score or data relating to the "uniqueness" of the extracted word(s) or phrases, such as may be stored in the system database. This scoring may be performed by a human, and/or algorithmically (such as using correlation analysis on the top X number of "hits" returned by a search engine for the word/phrase.

A link grabber routine is executed per step 812 to search internal and/or external resources (e.g., internal intranet, or the web) for related links corresponding to the identified phrase.

Lastly, a global identifier is assigned to identified words/phrases per step 814, thereby turning the word/phrase into a 'keyword' that can be used network-wide for, e.g., selection of contextually related secondary content such as advertising.

Figure 8A:
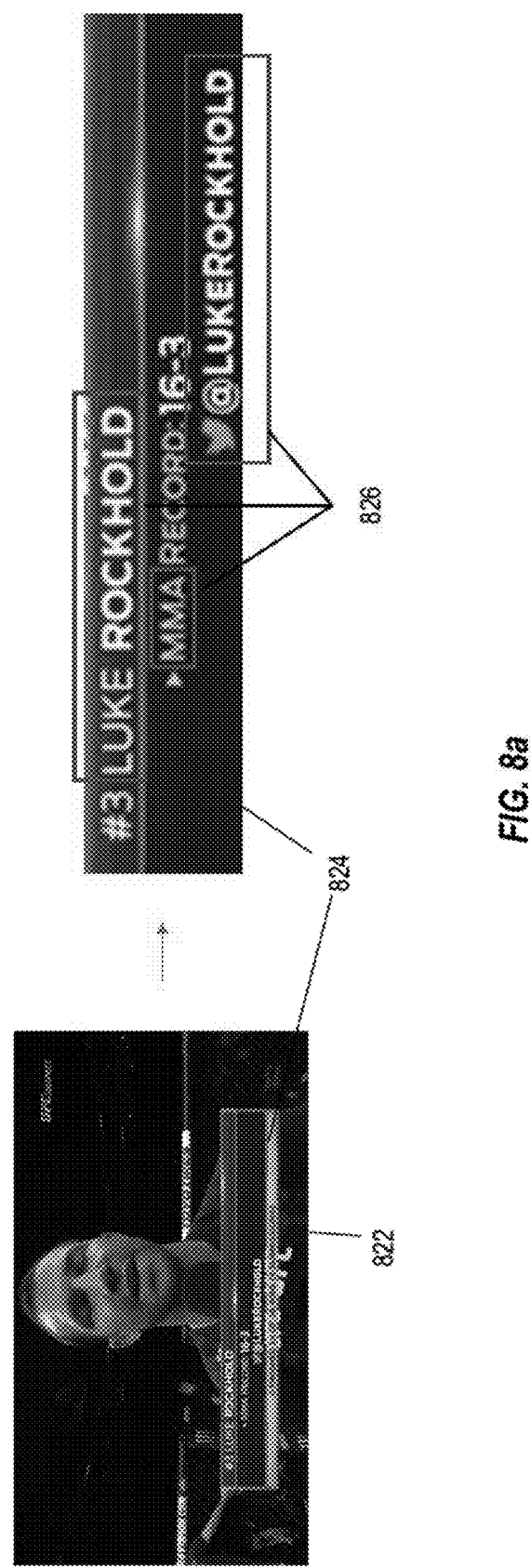
FIG. 8a is graphical representation illustrating exemplary textual object parsing and processing according to the method of FIG. 8.

As an example of the foregoing method 800 (in the context of FIG. 8a), consider the following data elements 826 extracted from the processed I-Frame (one frame of display area 822) by the system:

1. @LUKEROCKHOLD (identifiable as a Twitter account→https://twitter.com/lukerockhold)
2. MMA (identifiable as acronym for Mixed Martial Arts, and hence can be linked to ancillary searches (e.g., link with latest news of MMA fights, events, personalities, etc.); and
3. LUKE+ROCKHOLD (identification of putative names in prescribed order—"Luke" and "Rockhold", which can be correlated to both Item 2. above (=MMA Fighter) as well as news or other content relating specifically thereto.

2. Spatial (Visual) Object Analysis

The exemplary implementation of the back-end system 101 also includes visual object descriptor generation as part of the visual object detection engine 302a. Specifically, the engine algorithms are configured to first perform a base object detection process, and assign one or more general descriptors or categorizations to the object under analysis. For instance, such descriptors/categorizations may be as to whether the detected object is text, a person, a structure (e.g., building), a landmark, and so forth.

Notably, in one implementation of the system 101, individual shapes are cataloged by the engine in the database such that they can be individually correlated to other shapes in other assets. Specifically, asset ID 12345 may for example have three (3) individual shape elements of interest (e.g., a car, a set of golf clubs, and a white polo shirt) rendered therein during various portions. The database 153 of the system is configured to store data associated with the ID of the asset indicating: (i) a separate ID for each of the elements; (ii) one or more temporal references as to where within the asset that each of the three elements occurs; (iii) correlated assets having the same Element ID associated therewith; (iv) color IDs that are applicable, if any (e.g., white for the polo shirt); (v) texture IDs that are applicable, if any; and (vi) correlated Publisher IDs (i.e., unique identifiers for sites or hosts such as Yahoo! who publish the correlated assets shown), as illustrated in Table 1 below:

TABLE 1

| ASSET - 12345 | | | | | | |
|---|---|---|---|---|---|---|
| Element Descrip. | Element ID | Temporal References | Correlated Assets | Color IDs | Texture IDs | Publisher IDs |
| Shirt | 43215 | 1 - 00:00:30<br>2 - 00:01:47 | 23578<br>19745<br>88634<br>00667 | 457 | — | 334<br>657<br>889 |
| Car | 55562 | 1 - 00:00:35<br>2 - 00:02:12 | 77235<br>55638 | 227<br>116 | 125 | 790 |
| Golf clubs | 00349 | 1 - 00:03:55 | 00997 | 555<br>410 | 223 | 558 |

When the general descriptor is that of a person, the algorithm of the illustrated implementation then generates coordinates for the face of the person (i.e., a region where the head is presumed to be, based on shape analysis). The facial region is then cropped to a specified degree around the face using a polygon generation algorithm so as to, inter alia, reduce processing overhead on the system, and remove any features or artifacts proximate to the subject's face within the image which may confound subsequent gender, race/ethnicity, or other analyses (e.g., clothes, jewelry, other objects in the background/foreground, etc.).

The gender of the face within the cropped image area is next determined. In one implementation, gender determination is performed using one or more system gender determination engines of the type described in greater detail subsequently herein.

Once the gender is determined (or concurrently therewith), color/tone of the facial region may also be evaluated, e.g., based on range of hexadecimal color pallet. Such color data may be used for example for intra-frame contrast analysis; e.g., to differentiate within the frame what is putative human skin versus say a garment they are wearing (such as a hat or shirt) so as to further refine the shape analysis for the latter.

Moreover, color of hair may be a useful metric, especially for images of male subjects (since men statistically less frequently change the color of their hair than a population of women). Fuzzy logic analysis may be used in one implementation for such processing; since there are many different variants of the same general shades (i.e., black, brown, red, blonde, white) can all have significant variations of shade and still fall under the relevant general category), and hence variable values such as "light/dark" may be used, or "very dark/dark/light/very light" for instance, based on algorithmically detected color composition of pixel data associated with a putative region of the head where hair would be.

Once the gender and any race/ethnicity categorization is made, the algorithm next uses this data to search a "face pool" database. Specifically, previously stored (or contemporaneously obtained, such as via web search) data relating to known individuals is used as a mechanism for confirming or refuting an established hypothesis, or performing a "brute force" match. If a hypothesis has been generated by prior or concurrent processing steps (i.e., as to gender, ethnicity/race, and possible individual identity), the hypotheses can be confirmed/refuted through directly accessing data records for the hypothesized individual (or a subset of individuals meeting the hypothesized criteria). In one variant, the face pool database contains image data (e.g., cropped facial images) which can be scaled and algorithmically compared to the cropped image under analysis from the media asset, such as on a polygon/shape, pixel-by-pixel, local region/point-to-point, ratio-metric, or other bases to score the similarity of the images. Data associated with the stored image data may include fields relating to day/night capture of the image, aspect/rotation (e.g., vertical, ¼ view), and the like, so as to aid in selection of a database image that most resembles the conditions under which the media asset image was taken (if the latter can be divined from the prior processing of the media asset).

In one exemplary configuration, the pool consist of a large number of pre-existing faces in the database that have been previously processed and identified, including from other video assets. This data may also include metadata or relational data relating to e.g., (i) confidence level of the identification; (ii) aspect or other spatial data (i.e., full frontal, one-quarter left, profile); and (iii) data useful to the comparison algorithm (e.g., biometric data, lighting/contrast values, etc. Hence, the facial recognition matching algorithms for a new video being processed may first attempt to assess a facial aspect within the frame(s) of interest, and based thereon (whether directly or based on access of associated metadata), and make a putative determination as to identity using a mathematical transformation to a prescribed coordinate system associated with a positive ID in the database (e.g., a rotation around the Z axis to change a ¼ view to a full frontal view for purposes of comparison in two dimensions).

If no hypothesis has been formed (other than say a gender identification), a brute-force comparison or search of the database may be conducted. For instance, in one variant, shape metrics regarding the media asset image under analysis are extracted, which may include for example ratios of a (relative) distance between the subject's eyes and distance from chin to tip of their nose, breadth to height ration of their head, etc., so as to identify images with in the database which ostensibly have the same ratios/features. Note that the database (pool) images may be pre-processed as well as to their ratio/metric data, and may also include human-provided data as to the identity of the individual in the image to a high level of certainty.

Moreover, the textual recognition and/or internal/external search algorithms described previously herein (FIG. 8) may be used by the contextual relevancy engine as a basis for generating a hypothesis as to identity, or at least narrowing the subsequent progress of the logic through its decision tree. For example a textual object analysis of the type previously described may return words or phrases which indicate that context of the media asset (or at least the data structures or portions thereof under analysis) relates to a male-dominated activity (e.g., men's wrestling), and hence such data can be used to generate a hypothesis or decision on the decision tree as to the gender of the individual. More specific data may also be obtained from such sources (e.g., a text object analysis indicates a particular putative identity of the individual (e.g., a name banner under the facial image indicating "Dwayne Johnson"), thereby enabling the algorithm to converge immediately on an identity hypothesis and confirm/refute this hypothesis through comparison of the processed media asset image to entries within the facial database/pool for Dwayne Johnson.

It is noted that, while hypothesis confirmation/refutation is described in one embodiment, generated hypothesis need not be confirmed/refuted by the system in all cases, such as where there is a high confidence value of the identity, such as via the foregoing textual object analysis. For example, if the textual object analysis clearly indicates (i.e., little or no ambiguity as to textual resolution and identification) that the name "Dwayne Johnson" was present in the textual object, then the algorithm can be considered to have a very high confidence level that the image above it is in fact one of Dwayne Johnson, and the decision tree process of the algorithm can be terminated at that point.

However, as with many other metrics or bases of evaluation, textual data may or may not have a high correlation to the imagery shown contemporaneously. For example, Dwayne Johnson may, in the aforementioned hypothetical video (FIG. 9), be shown attending the "Bob Hope Golf Classic" (the latter shown in a banner under the image of Dwayne Johnson), and hence an unverified hypothesis could result in erroneous identification of Dwayne Johnson as being Bob Hope. Hence, the exemplary embodiment of the back-end system algorithms described herein utilize at least one confirmation attribute as part of the decision tree logic in converging on a final identification of an individual so as to avoid situations such as that in the above example (e.g., by comparing the obtained media asset image to one of Bob Hope in the pool to determine if the facial parametric values are sufficiently consistent therewith).

In one implementation, the contextual relevancy engine (CRE) is configured to utilize one or more of the already-generated descriptors in the individual video object detection and processing process. For example, in one variant, when the CRE routine is called by the system, the CRE returns the previously identified descriptors associated with the processing of the current media asset. In some instances, this may also include ancillary source information, such as web page information pulled by the internal/external search engines (e.g., a web "scraping" routine).

It will be appreciated that even with a significant amount of back-end processing capability (e.g., multiple servers running in a "farm" 220 of the type shown in FIG. 2), ingestion and processing media assets can be highly processing-intensive, and hence take an appreciable amount of time. With literally hundreds of millions of media assets present on the web, processing every one of the assets (or even a small fraction of them) to a high degree of "surety" or confidence as to the identified objects, audio, context, etc. may take a commercially unreasonable amount of time, especially in light of the fact that thousands of new assets are created and made available on the web every hour of every day.

Accordingly, the exemplary implementation of the back-end system 101 of the present disclosure utilizes one or more prescribed hierarchies of analysis so as to balance the need to accurately identify and catalog the various attributes of the media asset under analysis, and the need to reduce processing overhead for each asset to a level which meets the aforementioned commercial practicality requirements (i.e., enables a timely analysis of a sufficient number of media assets so as to maintain the stored inventory data sufficiently relevant and "fresh," and provide a sufficient breadth of assets that will adequately support advertiser or publisher needs).

Specifically, in one such hierarchy, (i) text detection is conducted first, followed by (ii) person detection (i.e., is a human present in the analyzed portions of the media asset), followed by (iii) general descriptors detection (i.e., assignment of one or more descriptors relating to various objects or attributes within the asset).

Notwithstanding, it is appreciated that different hierarchy structures/elements may be more or less relevant to different assets, and hence the present disclosure contemplates selection of a "best" hierarchy based on data obtained during initial ingestion or processing of a given media asset. As one example, it may be found (e.g., anecdotally) that a different hierarchy than that described above may be more processing-efficient with respect to media assets relating to sporting events (due, e.g., to the presence of many individuals shown/present in video coverage of such events, as on most professional sports teams). Hence, where the ingested asset is identified as having a sports theme (e.g., via associated metadata scraped from the site on which it is published, or the nature of the site on which it is published (e.g., NFL.com), a hierarchy which performs other operations first (e.g., general descriptor detection/assignment), followed by text detection second, may be substituted by the system, thereby making the processing of the media asset more efficient.

One particularly advantageous aspect of the exemplary configuration of the system is that its inventory size (i.e., number of unique assets which are accessible and which are cataloged in the database) allows much broader inductive analysis or "pattern recognition" as compared to an analysis conducted merely across a same/common website. The pre-processing and analytics performed by the various engines of the system help the system operator effectively categorize and characterize each unique asset, including determination of context and ambiguity resolution (e.g., does the asset primarily relate to a first context or a separate, second context, such as a Porsche Cayman car as part of a sports car enthusiast video vs. a nature-based study of carnivorous reptiles in South America). Unlike the prior art, which primarily leverages similarity to other images (and hence suffers the associated pitfalls thereof, including having a completely different context yet highly similar imagery), the exemplary embodiments described herein alternatively can rapidly locate and assess correlated inventory within the database; i.e., which has been pre-processed and hence its context(s) reliably determined. To this end, so-called "aggregative" approaches may also be used consistent with the present disclosure (i.e., wherein no substantive "scaling cost" associated with the addition of each asset of inventory is experienced by the system).

In another variant, the audio portion of the video may be analyzed, including for context determination. For instance, in a typical MPEG4 or H.264 rendered video, audio data will be associated with the video frames in a temporally synchronized fashion. In one variant, this audio data is processed via a speech recognition algorithms such that one or more contexts associated with the video can be discerned, including via a third party search engine such as Google. For instance, in one implementation, the audio portion of a video is processed via SR to identify words therein, with one or more of the words input to a context-sensitive search engine such as Google which converges on the top 2-3 best (most relevant) "hits" (see discussion of FIG. 8 herein).

It is noted that certain codecs such as H.264 do not maintain synchronization on a per-frame basis; i.e., the temporal relationship of the audio "track" to the video data produces audio that is synchronized when the video and audio data are rendered (e.g., a person's voice matches or is synchronized with their lip movements), but not necessarily prior to rendering, since certain video frames may be "out of order" as compared to the linear temporal audio stream. Hence, in one variant, the algorithms are configured to process the video and audio as if being rendered so as to divine the intended temporal correlation, as opposed to merely attempting to correlate video data/images at time t=x seconds within the video stream to words at or near to time t=x in the audio stream, which may result in significant errors.

Figure 9A:
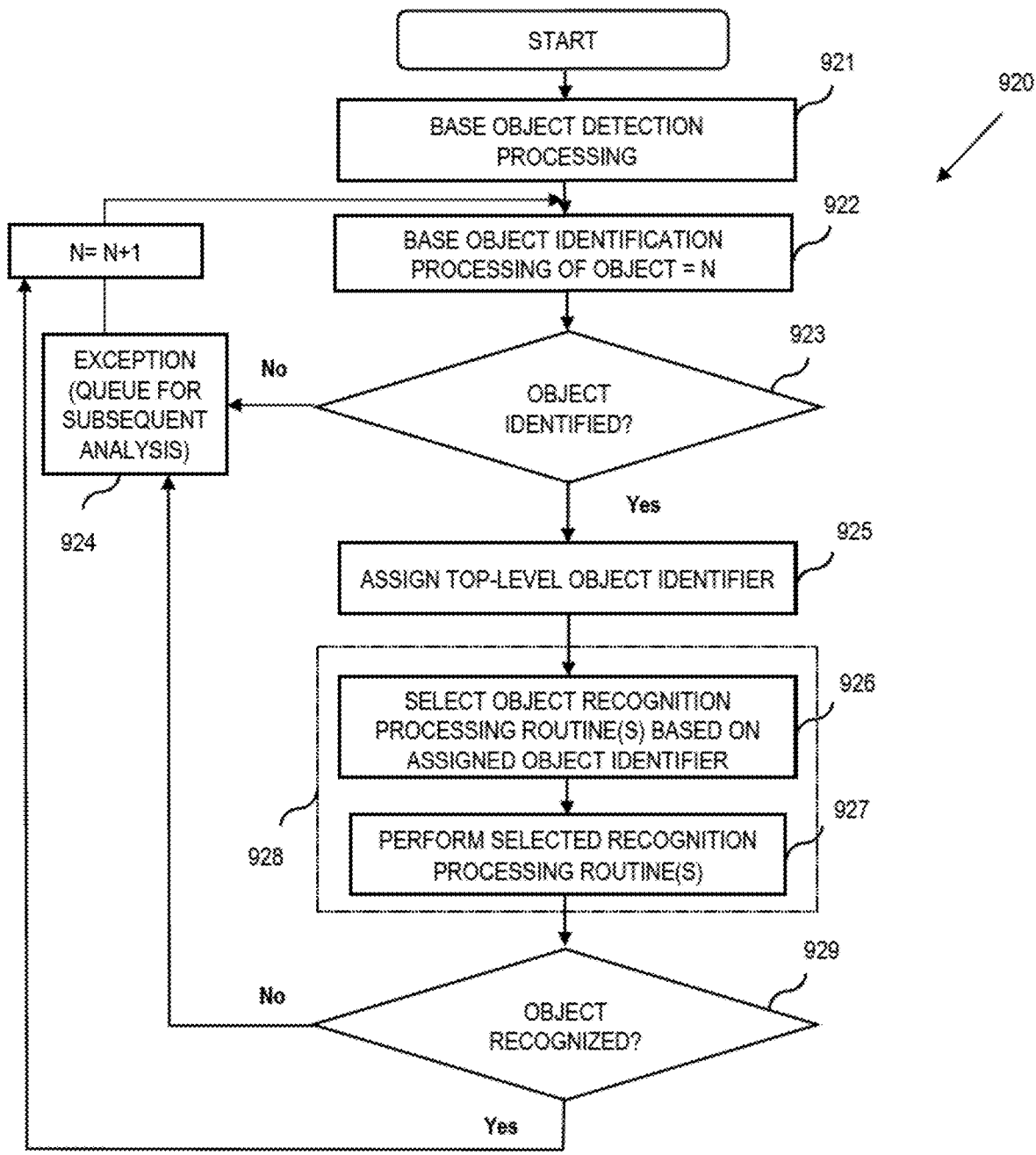
FIG. 9a is logical flow diagram illustrating one embodiment of a generalized method of media asset visual element processing according to the present disclosure.
Figures 1, 9A:
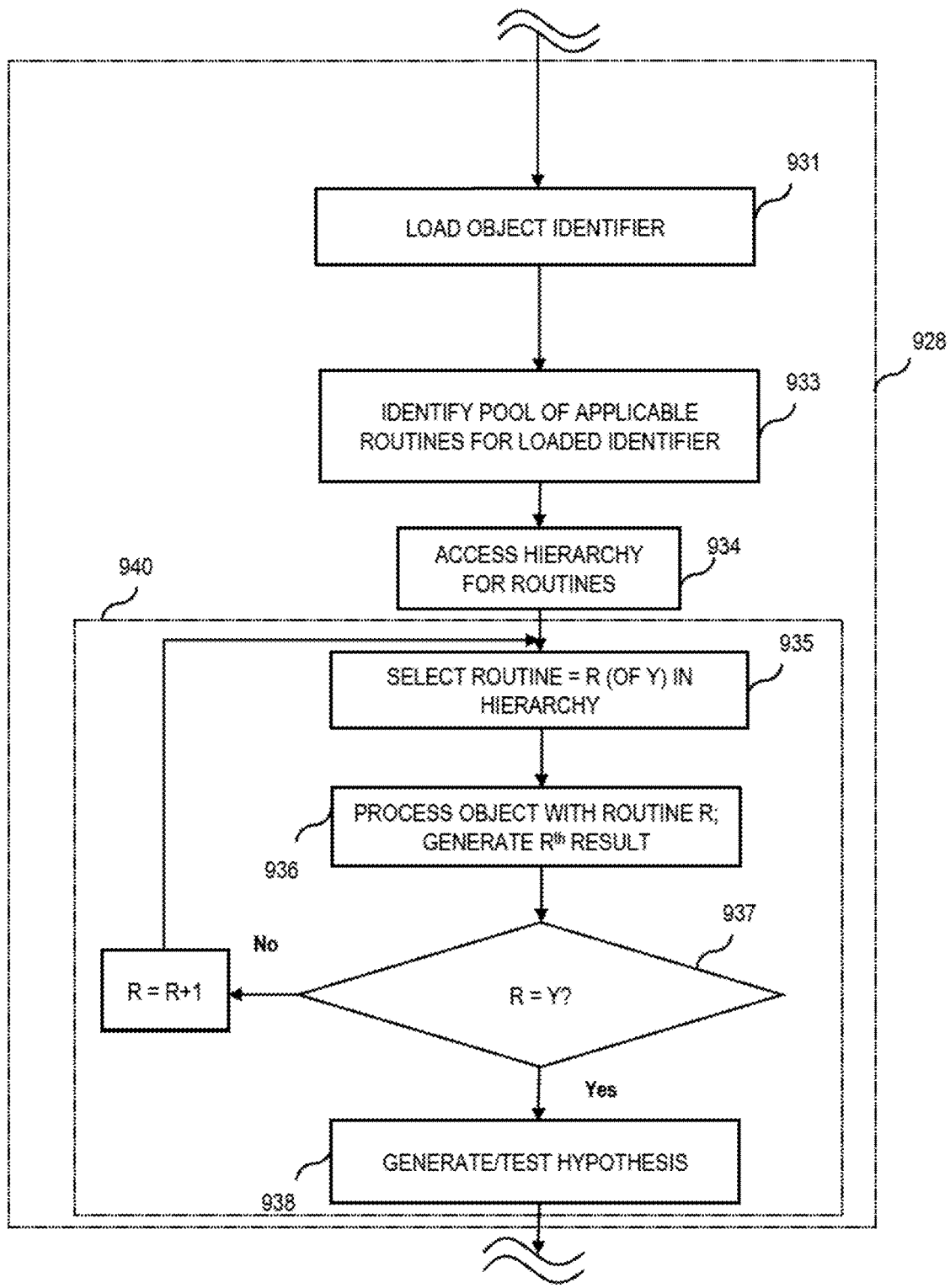
Figures 2, 9A:
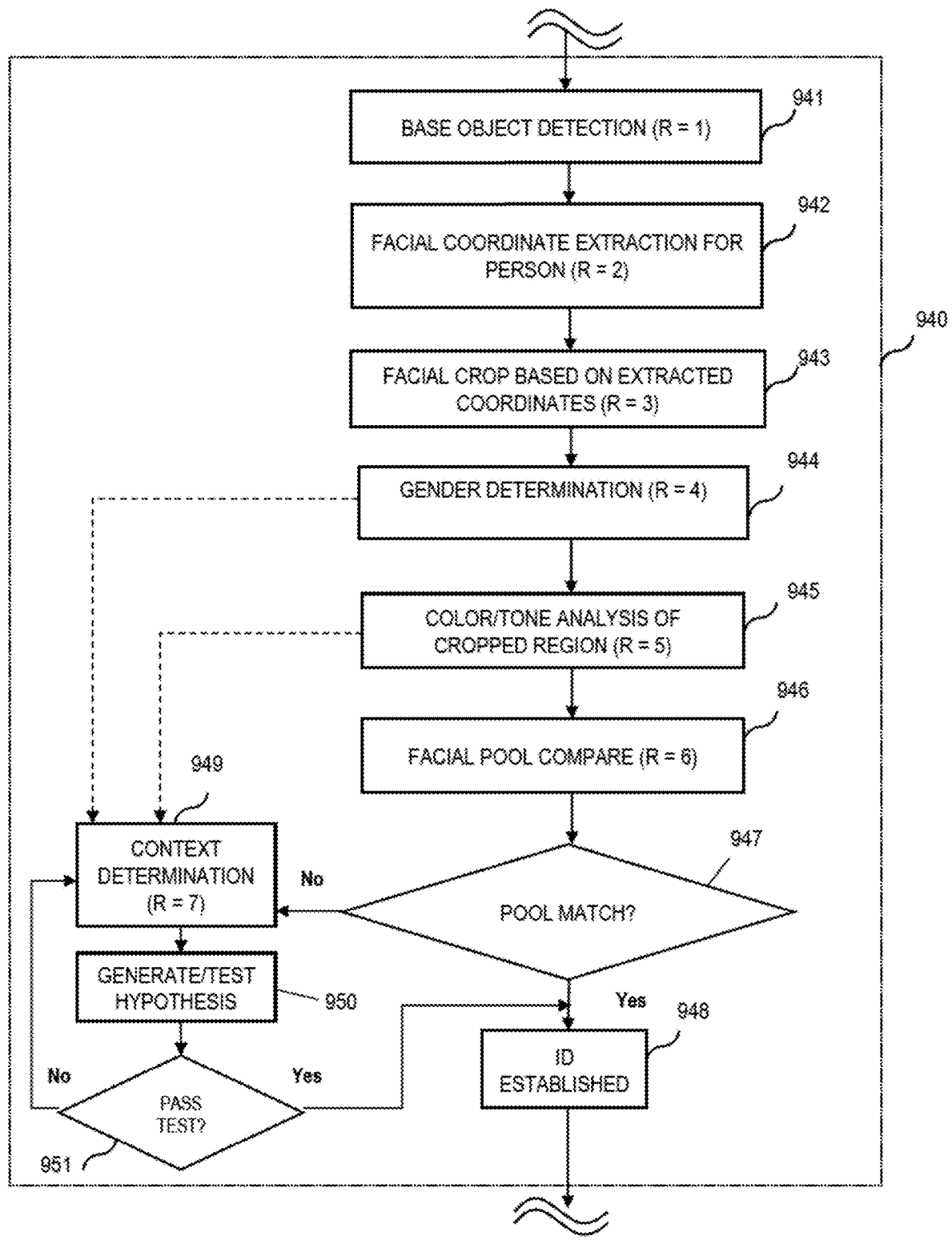

FIGS. 9 through 9a-2 illustrate one exemplary embodiment of a logical flow for the object identification algorithm/decision tree of the present disclosure. As shown in FIG. 9, the example media asset comprises a video of a celebrity (Dwayne Johnson) attending a golfing event at a location ostensibly in Las Vegas. The frame under analysis 900 includes a number of objects rendered within the frame as video data, including the celebrity, trees, buildings, etc.

In the exemplary implementation of the object detection and processing algorithms of the system 101, the frame of interest 900 is first analyzes for base object detection (see step 921 of the method 920 of FIG. 9a). This analysis comprises algorithmic analysis of the polygons and other geometric features of the I-frame video data, so as to determine the presence of one or more (N) objects within the frame (e.g., object 902 corresponding to a building in FIG. 9). Criteria for determining the presence of an object may be "single dimensional" (e.g., one factor or value), or "multi-dimensional" (e.g., based on two or more factors or values, including within a prescribed hierarchical logic tree). For example, in one implementation: (i) 'pre trained data images,' (ii) pre-trained polygon datasets, (iii) a primary color of the shape, (iv) media asset topical context, (v) size/dimension ratios (e.g., how large a portion of the frame the shape takes up relative to overall size; a golf ball for example is highly unlikely to take up a significant portion of a video frame for instance, whereas the full moon may take up nearly an entire frame, especially where surface detail is required), (vi) inter-frame motion analysis (e.g., if the object moves relative to other known objects inter-frame, it can be presumed to be free-standing or at least partly detached from the other object(s)); and/or other information inside the media asset are utilized to determine is the identity of an object. For instance, a basketball depicted in a video asset I-Frame may be identified solely by shape. However, such single factor identification in this case may yield a high error rate (since there are many round objects which could be in a video (e.g., bowling balls, the full moon, a cylinder shown end-wise, etc.). Hence, where additional surety is desired, additional factors may be used to either (i) validate a hypothesis generated by a prior algorithm step (e.g., shape analysis=putative basketball; confirm hypothesis using one or more of color, media asset context, etc.), or (ii) in generation of a hypothesis (e.g., shape output+color output+ video context yields "basketball" hypothesis). As described elsewhere herein, media asset context can be determined through any number of approaches, including speech recognition of audio, extraction and analysis of textual images/ data within the asset of interest, metadata associated with the asset, etc.

The foregoing approach can also be applied in stages or levels; e.g., use of different factors or values at multiple different points of the object analytics tree to generate/ confirm hypotheses.

Next, per step 922, the detected object under evaluation is processed to attempt to identify its identity (i.e., what top-level category it falls into, such as a person, a place, a building, or textual/language or iconic elements). In the present example, one object 902 is identified as a putative building, and another 901 as a putative person. If no putative identification can be made for the object under analysis, per step 923, the algorithm proceeds to step 924, where an exception is thrown, and the object loaded into a queue for subsequent processing to attempt identification (and/or human review of the I-frame for ambiguity resolution). Such subsequent processing may include for instance incrementing to a successive or prior I-Frame of the video asset (e.g., +/−Y frames), such that the identification/recognition of the object may be better (e.g., to better focus, removal of an impeding object or event, etc.).

Once the top-level category is identified, an appropriate identifier value indicative of this categorization (step 925) is assigned to the object under evaluation (Object N), and per step 928, object recognition is performed by the algorithm. In the illustrated implementation, object recognition includes first selecting one or more processing routines applicable to the object based on its categorization (assigned identifier; e.g., person, building, etc.) per step 926. As described elsewhere herein, algorithms used for person recognition functionality operate according to a prescribed flow and hierarchy, and utilize different routines than those for say a building (object 902 in the example), and hence the system is configured to advantageously utilize the characterization of the prior steps in order to select the most optimal routines for further processing of that particular category of object.

Next, per step 927, the selected algorithms are applied according to the aforementioned hierarchy in order to attempt to recognize the particular object within the larger category. It will be appreciated that as used in the present context, the terms "detection," "identification" and "recognition" refer to (i) detecting the presence of a processable object within the decoded video I-Frame data, (ii) identifying the category of such object, and (iii) recognizing the particular instance of the object (e.g., a particular person, certain building in Las Vegas, make/model of car, etc.), respectively.

Lastly, per step 929, if recognition was successful (e.g., the particular instance was identified to a suitable level of confidence based on one or more test hypotheses, as described below), then the object number (n) for that frame is incremented, and the next object (if any) identified. Conversely, if the recognition was not successful, then an exception is thrown and the object queued for further processing/review per step 924.

One exemplary implementation of step 928 of the method of FIG. 9*a* is shown and described with respect to FIG. 9*a*-1. Specifically, in this implementation, the object identifier for the Nth object is first loaded by the routine per step 931. For example, this identifier may indicate that the identified object is putatively a person.

Next, per step 933, a pool (which may be as few as 1) of routines applicable for that identifier are identified, such as via a table/database lookup performed by the system 101. For instance, it may be known that a certain group of routines are useful in processing the objects of that type (category), such as e.g., (i) (skin) color; (ii) facial recognition; (iii) cropping; etc. for an identified "person" object.

Next, per step 934, any designated hierarchy (or hierarchies) applicable to that object category and selected routines may be accessed (e.g., per the aforementioned database entry) and applied to the routines, so as to specify the order of performance. As will be appreciated, the order or hierarchy of performance may be dictated by, inter alia, "condition precedent" requirements (e.g., where a certain routine requires an input that is generated as the output of another routine), and/or processing efficiency considerations (e.g., faster logical convergence on a hypothesis and/or testing of the hypothesis when routines are executed in one sequence as opposed to other possible sequences).

Per steps 935 and 936, the appropriate hierarchy is implemented by selecting the first routine (R=1) and executing it on the Nth object data to generate an Rth result or output (which may be fed to a subsequent routine as an input as described above).

Per step 937, the routines in the hierarchy are successively executed on the object data (and any prior routine outputs) until all routines in the hierarchy have been exhausted (R=Y), at which point a hypothesis is generated for the recognition (contrast: identification) of the object (step 938).

Referring now to FIG. 9*a*-2, one embodiment of the object processing routine hierarchy (step 940 of FIG. 9*a*-1) is shown and described. First, per step 941, base object detection is performed to determine object category (e.g., person, building, etc.). In this embodiment, the object is presumed to be a person.

Per step 942, a facial coordinate extraction routine is implemented to localize the region of the frame where the person's face is located.

Per step 943, a facial crop operation is performed based on the coordinate extraction routine output, so as to select data (e.g., pixel data values) within the cropped region corresponding to the facial region of the object (person).

Per step 944, a gender determination routine is performed. In one exemplary embodiment, the gender analysis routine is utilized by the system to identify gender, as well as (optionally) other attributes of interest and discernable from image data, such as emotion state (e.g., smile, frown, etc.) and the presence or absence of facewear or headwear or other facial features such as glasses, hats, facial hair, etc. In one implementation, a Fisherfaces-based method or algorithm is used in gender determination, which yields a class-specific linear projection, and is based on subject-independent cross-validation (i.e., images of the person under test are never used for learning the model), although it will be appreciated that other approaches and models may be used. Exemplary open-source source code for a Fisherfaces API (OpenCV) is shown in Exhibit II hereto.

Per step 945, a color/tone analysis of the facial crop region is performed (e.g., for human color tone or non-human color tine detection).

Per step 946, the facial image within the crop region is compared via the compare engine to a pool (database) of facial images for possible matching (e.g., for characterization of the various attributes of the facial structure, etc. of the image under evaluation, and comparison to previously stored data for known people).

Per step 947, if a match in the pool is found as a result of the comparison (step 946), the ID is affirmatively established for the person in the I-Frame under analysis (step 948). Conversely, if no "match" is found, context determination is then performed per step 949. For example, the output of one or more other routines in the hierarchy is used as input(s) to the contextual relevancy engine (or other contextual evaluation routine) to attempt to divine the identity of the person in the cropped image, as described elsewhere herein.

When the context analysis yields a hypothesis (step 950), the hypothesis is tested (e.g., through confirmation via human reviewer, or an algorithmic scoring approach based on multiple attributes). If the hypothesis passes the testing to a prescribed level (e.g., sufficiently high score), the ID of the person is again established within the database per step 948. If not, additional context determination is performed (or the image queued for direct human identification).

Returning again to FIG. 9, the foregoing processes are illustrated by way of example.

1. Base object detection—two objects 901 (with related object 901*a*), 902
2. Detected object identification—object 901=person, object 902=structure/building
3. Process object 901 (person)—execute hierarchy of routines for person category (i.e., (i) identify coordinates of person face; (ii) crop face based on coordinates; (iii) gender routine; (iv) color/tone analysis; (v) face pool comparison routine) to produce result (hypothesis) for object 901=Dwayne Johnson.

Next, the process iterates to object 901*a*:

4. Object 901*a*=part of person 901; identify coordinates of upper body
5. Process object 901*a* (part of person)—execute hierarchy of routines for part of person category (i.e., (i) identify coordinates of person upper body; (ii) crop upper body based on coordinates; (iii) color/tone analysis; (iv) contextual relevancy routine:
   a. Run contextual relevancy hierarchy for 901/901*a* (i.e., (i) gender routine (hypothesis=Dwayne Johnson=male); (ii) color (white); (iii) object (shape) pool comparison routine) to produce hypothesis on 901*a*=white men's polo shirt.

It will also be appreciated that "sub-objects" within (spatially rendered as overlapping or contained within) a parent or host object may also be analyzed using the foregoing processing techniques. For instance, processing of selected I-Frames of a video asset undergoing pre-processing by the system 101 may detect a human within the frame(s), as in the example above. One subroutine of the object detection algorithms of the engine(s) 302 of the system includes detection of features associated with a human face as "sub-objects"; e.g., the lips of the person can be identified and characterized based on shape and placement analysis of the cropped facial image extracted from the frame; the lips are associated with that face and particular coordinates therein. Once the lips of the person are so isolated, a color analysis can be performed on the pixels within the designated "lip" region, so as to return data on the color (e.g., red). Within the color analytic subroutine, "red" may be designated as a non-human color (i.e., artificial versus biological), and hence the image is now denoted as: (i) relating to a human; (ii) having lips as an object; and (iii) having the non-human color red coincident with the object, and descriptors/identifiers accordingly assigned. As such, the decision logic of the system may then generate a hypotheses as to the gender of the person in the image (i.e., female).

Note also that multi-variate object analysis of a given video frame or frames may also be utilized to resolve ambiguities. As a brief aside, depending on the rendering application, encoding codec, lighting at image capture, settings chroma, luma, contrast), aspect of object relative to imaging device, etc., any given object, may take on widely varying appearances, including to specific viewers (see, e.g., the well-known "Blue Gold Dress"). As such, while shape-based analysis is often successful at correctly identifying an object rendered in a video asset (especially where the shape-based algorithm is applied in multiple different frames, such that different aspects of the object may be resolved and reconciled to aid in identification), further analysis of other attributes such as color and texture can provide useful information, such as for ambiguity resolution (e.g., is it a) a white cotton polo shirt in poor lighting conditions, b) a white polo shirt with a texture which renders it "not pure white" in appearance, or c) a buff-colored cotton polo shirt in normal lighting?).

Moreover, it will be recognized that, aside from further hypothesis generation/testing, the descriptors or identifiers utilized by the aforementioned processes in identifying "objects" may themselves be utilized for further categorization and comparison to other existing (pre-processed) assets, or objects thereof, within the system database 153. For example, in the foregoing scenario, the combination of descriptors for (i)-(iii) above (i.e., a putative woman wearing red lipstick) may be used as a search criterion for other assets within the database, including as part of the comparison engine processing, so as to determine whether a wholly new system ID should be assigned to the object, or the asset being ingested/processed, or whether it rather relates to an extant asset (and hence is counted as a related or second "instance" of the same object or asset).

Hence, if a database search for asset entries having associated descriptors for (i)-(iii) above returns no "hits," it can be presumed under one exemplary decision logic "tree" that the object or asset is in fact unique within the database, and hence should be assigned a new unique global ID value. Alternatively, the return of one or more hits on the search may be used to invoke subsequent comparison routines of the comparison engine 302*c* (in that, for the case of asset comparison, mere matching of the attributes of a woman having red lipstick may provide a poor correlation in terms of overall similarity or identity of the asset to another), and/or association of the two (or more) objects or assets as having common attributes.

Notably, the foregoing processing by the system 101 may also be used for matching or correlation of known products or services, such as those of advertiser customers of the system operator. For example, in one such approach, a "matching engine" 302*x* of the system 101 is configured such that the identifiers/combinations of a given object within a media asset may be used as a search criterion for related products that are resident within the system database 153 (and which have their own assigned identifiers). This can be accomplished in a number of ways. For instance, in one such approach, a visually detected object (e.g., the red lips of the woman in the foregoing example) can be correlated to an identifier assigned to a product given the same identifier (e.g., lipstick made and sold by ABC Corp.), both having the common identifier. As such, ABC Corp. may wish to advertise within the media asset (e.g., Internet video) from which the object (woman's red lips) was extracted, as described elsewhere herein in greater detail. Note that items being correlated under this processing paradigm were not correlated based on matching shape (i.e., a tube of lipstick does not assume the same shape as the human lips having that product applied thereto), thereby demonstrating one aspect of the utility of this approach.

Alternatively (or in concert), the shape of the detected object may be associated with shapes directly associated with the product or service itself. In the foregoing example, two distinct objects may be logically associated with the product within the database 153; i.e., lips with red lipstick applied (first unique ID), and a tube of lipstick (second unique ID) may each be associated with the ABC Corp. product. As such, media assets having either (i) women wearing red lipstick, or (ii) images of tubes of lipstick; may each be desirable candidates for the prospective advertiser (ABC Corp.).

Accordingly, in one embodiment of the system, the advertiser is presented (e.g., via the back-end system portal/server 157 and APIs 159 described elsewhere herein—see FIG. 10) with opportunities to advertise across both assets (including similar assets within the same class; i.e., those with women wearing red lipstick, and those with tubes of lipstick featured).

As such, in one such configuration, the advertiser may purchase an "item" found inside a media asset across multiple assets and multiple publishers; e.g., as a package; associated cost-per-impression/interaction (as however defined by the system configuration—e.g., clicks on the interactive element by a viewer when watching the video, as detected by the script) and location/placement-related data may also be provided (e.g., location of advertisement and media asset within a hosting web page, times/dates of publication, cognizant publisher/host, etc.).

Advertising Aptitude Engine—

In one implementation, the system further includes a video advertising aptitude engine which, when executed, is configured to characterize an entire web page and its HTML as to placement of video assets relative to various components of the page. Specifically, the engine can determine for a given asset located on a given host web page, relative positioning (e.g., top, bottom, etc.), as well as proximity to other assets or components of the web page, via analysis of the page's source HTML. This information is highly useful to a prospective customer (and/or the system operator in constructing an inventory proposal for the customer), since it is not merely the content of the video asset itself that may affect the efficacy of the asset.

For instance, a given customer may not wish to utilize a video asset on a web site/page with a poor or negative reputation, thereby leading to possible negative perception of the customer's goods or services merely via association with that site. Similarly, the customer may want to avoid using assets placed proximate to other assets or content which are incongruous with (or in poor taste relative to) the target asset. For example, a customer who wishes to make use of a video asset having cruise ships prominently featured therein so as to advertise their Caribbean travel services may wish to avoid a proximate asset or video relating to the damage by Hurricane Maria to Puerto Rico, or a recent outbreak of Norwalk Virus on a cruise ship. Notably, this analysis performed by the engine may be used: (i) on the target asset itself (i.e., the customer does not want their advertising or secondary informational content presented when a viewer of the aforementioned Norwalk Virus video mouses-over the image of the afflicted cruise ship; and/or (ii) spatially, temporally, or logically proximate assets, such as those within a common viewing pane structure on a web page (e.g., right-hand margin showing multiple videos in vertical sequence), as part of a common auto-play sequence (e.g., within a string of two or more videos which autoplay after selection of the first), or of common primary context or subject matter (e.g., next to, or in temporal sequence with, video assets having advertising or secondary content for a retailer or manufacturer offering competing or similar good or services).

In the exemplary implementation, the video advertising aptitude engine accomplishes the foregoing functionality via a number of different algorithms which are executed by the back-end server 140 during pre-processing, and/or post-processing. Specifically, the algorithm obtains one or more of: (i) textual or metadata associated with a given asset (see e.g., the method of FIG. 8); (ii) results of audio/SR. analysis as to context, as described elsewhere herein; and (iii) data relating to analysis of the host web site or web page for the asset, and utilizes such to divine the desirability of an asset and/or its placement. In one exemplary implementation, this process comprises a calculated rule set with a hierarchy. For example, a given media item may be characterized as to source and/or quality; e.g., a video is low (rendering/resolution) quality and shot from a smartphone, and hence an associated rule set such as "don't turn on any items/serve any advertiser" is applied, so as to avoid negative perception thorn an advertiser who may be upset by association of the advertising content with such a low quality media asset. Moreover, analysis of the content of the media asset may be conducted so as to divine the context and/or subject matter of the asset (e.g., an audio asset discussing socially unacceptable or controversial topics, a video asset depicting violence or surreptitious activities). Notably, the aforementioned object detection and analysis algorithms of the system may be effective at object detection; e.g., the engine may be able to find a prescribed object within the asset, but such detection does not in and of itself understand the context of that object and its placement. For instance, a video regarding a new military handgun for the U.S. Army may be acceptable, whereas that same (or similar) gun shown held to someone's head in a video asset may' be wholly unacceptable. As such, the exemplary system configuration uses the obtained textual, audio, and other "ancillary" data relating to the asset, to determine whether to activate an asset for use by an advertiser (which notably can be on a per-advertiser basis, based on e.g., data provided by that advertiser to the system operator). For example, a news corporation client of the system operator may deem it acceptable to show the aforementioned hypothetical video of a gun to someone's head in that it comprises a newsworthy event (e.g., someone of note taken hostage), whereas a gun manufacturer client may not, as it presents their product in a negative light. Hence, client-specific masks or whitelists/blacklists may be stored in the system database and applied to each media asset when inventory is sold or otherwise assigned to a given system operator client.

It will also be appreciated that the absolute (versus relative) placement of a given asset may also be analyzed using the aforementioned engine. Specifically, while the relative placement of a given asset which a customer may utilize is often valuable, the absolute placement (i.e., its location within a given host web page or site irrespective of what else is spatially/temporally/logically proximate thereto) of the prospective asset is also of great potential utility. As is known, users of the Internet or other information modalities are frequently impulsive and/or impatient; if too much effort is required to locate information of interest to a user, they will often merely "skip" further review and move on to another site or another page of the same site.

Hence, spatial placement of an asset is useful in determining (at least anecdotally or heuristically) whether or not a given user is likely to view the asset, and hence increase its potential efficacy for the customer of the system operator. Specifically, video assets placed near the top of a long page of videos are far more likely on average to be selected by a user, since many users will simply not expend the effort to scroll down through the entire (long) page. Similarly, assets which are positioned too far "into" a site hierarchy are less likely to be viewed, such as e.g., where a user must click through several levels of the site to access the page containing the asset. Accordingly, in one implementation of the system, data is maintained within the database as to each asset's absolute desirability or ranking. Note that the system operator generally will have no control over the placement of an inventory asset; rather, the system operator merely (i) identifies the existence and location of the asset(s); (ii) characterizes them via inter alia pre-processing; and (iii)

stores that data relating to the characterization in the database under the unique ID generated for the asset.

Combinational Element Logic—

The analytics engines of the exemplary embodiment may further conduct analysis of combinations of elements within a common asset. For example, known relationships between elements can be programmed into the "knowledge base" of the engines to enable context determination within a given asset. As an example, certain sporting events are limited, by contract between the parties involved, to utilize only garments of a particular brand or manufacturer (e.g., MMA has only authorized Reebok brand speedos for its contestants to wear during such events). As such, a relational rule exists within the programming logic; whenever a visual element in an asset is categorized as a "speedo" (or similar) such as based on shape/color/texture analysis, one possible context is within an MMA event.

Similarly, when other data (e.g., metadata, textual data, recognized speech, etc.) utilized by the context engine indicates that an MMA event is the context associated with a given asset, garment-related image elements identified by the shape/color/texture analysis performed by the system can, in the absence of countervailing data, be categorized as being Reebok brand. Accordingly, such rules can act as the basis for initial hypotheses (i.e., MMA Event+ Garment>Hypothesis: Reebok Brand), such hypotheses which can subsequently be validated or refuted based on additional information if any received from the other system engines. Known sponsorship relationships or associations can also be coded into the hypothesis rule logic; e.g., if Dwayne Johnson is known to sponsor Macy's department store goods/services, such relationship can establish an initial hypothesis as to the origin of the white polo shirt that Dwayne Johnson wears within a given video asset being processed.

Likewise, such relationships coded into the system logic can be used for purposes of validating or counting impressions. For instance, if it cannot reliably be ascertained through algorithmic processing (i.e., shape/color/texture, or context via e.g., metadata, textual data, SR analysis, etc.) that the white polo shirt Dwayne Johnson is wearing in a given video is actually sold or manufactured by Macy's, is can be "counted" as an impression for a Macy's good by the system accounting algorithms based on the strength of the known association.

Such indicia can also be scaled or applied statistically or according to other metrics. For example, if it is known that Dwayne Johnson religiously only wears Macy's goods, there is a strong presumption that the shirt he is wearing in the aforementioned video is in fact sourced from Macy's. Hence, of 100 hypothetical videos showing Dwayne Johnson wearing clothing, a high percentage (or even 100%) can be presumed by rule to be sourced by Macy's, and hence all views/interactions with such 100 videos would be countable as putative valid impressions. However, if there is only a weak association between Dwayne Johnson and Macy's goods (e.g., he sponsors them, but only infrequently actually wears their products, say 15% of the time), then a lower "impression rate" for those same 100 videos would be applicable. This approach can advantageously be applied statistically to the relevant hypothesis; i.e., each particular video of the 100 need not be confirmed as to having the garments therein being sourced from Macy's or not, but rather the population, when evaluated as a whole, reflects the desired level of occurrence of Macy's goods consistent with the aforementioned "loose" (15%) correlation. This relieves the system 101 of having to expend excessive overhead on a per-asset basis; rather than expend resources on each asset to unequivocally determine the identity of the goods, the statistical behavior is reflected accurately when the population size is sufficiently large. Hence, in one such variant, the analytics engine is configured to determine whether a sufficient population size is present in order to effectuate the overall statistical result (e.g., such that the standard deviation/variance is acceptable).

Portal—

In another aspect, the system is configured to provide a remotely accessible user or customer portal (via the portal server 157 and APIs 159 as shown in FIG. 1), whereby the user/customer (e.g., the advertiser or publisher using the services of the SO) can obtain a continuously updated (via the system server(s)) "Publisher report" which contains useful information such as a number of website impressions per given time period, then-current asset inventory being utilized by the customer/user, number of particular interactions with designated shape/color/texture elements within the assets, etc.

Moreover, the exemplary GUI of the customer portal allows the user (SO customer) to see actually secondary content placements within "live" inventory, and update links or other aspects of their placements so that viewers (end users) are forwarded to different network addresses as desired.

FIG. 10 illustrates one exemplary GUI generated by the system hereof as part of the foregoing customer portal functionality of the portal server 157 and API 159. As shown, a variety of useful information is generated and presented to the portal user (e.g., advertiser), including media asset title, associated descriptors, and related inventory assets. For example, in one implementation, inventory assets comprise data within the database that can be utilized for e.g., monetization (e.g., sold to advertisers and used for a basis of e.g., "click-through" counts or pricing).

As previously discussed, according to one implementation of the database 153 of the system 101, data therein relating to assets can also be partitioned or logically related by one or more pertinent attributes, such as e.g.: (i) host website/webpage type, (ii) publisher, (iii) network, and/or (iv) primary subject matter. As such, a prospective back-end customer (advertiser, publisher, etc.) can, using the portal, be presented with inventory/assets that meet the two or more prescribed criteria; e.g., show all videos on Yahoo! that also feature white polo shirts for at least X percentage of frames.

Advantageously, a given manufacturer/retailer (e.g., white polo shirt manufacturer) wants/is provided ability to purchase space in assets where white polo shirts are shown prominently, in parallel rather than one-by-one, including identification in advance of inventory that meets such criteria, and its particular characteristics relating to placement within the host page, content of logically or spatially proximate media, etc., as described elsewhere herein.

Visual Buying—

One salient advantage of the system and methodologies described herein in the aspect of enabling so-called "visual buying" by users (i.e., those perceiving the rendered asset). For instance, where a given tangible item or service (such as e.g., a men's white polo shirt) is present on a number of pre-processed videos—as determined by the pre-processing of those assets—an inventory of assets is created which can be leveraged by the system operator or other entities. If, for instance, the aforementioned white polo shirt is very popular (based on number of assets within which it is found), customers of the system operator who manufacture or distribute white polo shirts (e.g., a retail department store, or online good provider) can affirmatively select and obtain the inventory associated with that particular good/service (e.g., at a prescribed monetary rate such as 10 cents per "click"), based in no small part on knowing in advance how broadly the visual distribution of that impression exits (i.e., how many assets that good/service is present within). This a priori approach is to be contrasted with, for example, a posteriori approaches such as those of the prior art, wherein a customer establishes a click-through rate or the like, which may be tiered or scaled based on how many click or interactions which a given advertisement subsequently receives. This underscores a fundamental advantage of the aspects of the present disclosure over the prior art; i.e., that the breadth of distribution to potential customers of the goods/services provider (i.e., users watching videos or hearing audio advertisements) is known in advance. As such, it is contemplated that the prescribed rate can be tied to such advance knowledge, such as where a customer (of the system operator/service provider) can access more popular assets at a proportionately higher monetary rate, and have some assurance that their particular actual or corresponding (generic) good or service will be at least seen or otherwise perceived by more users.

Figure 12:
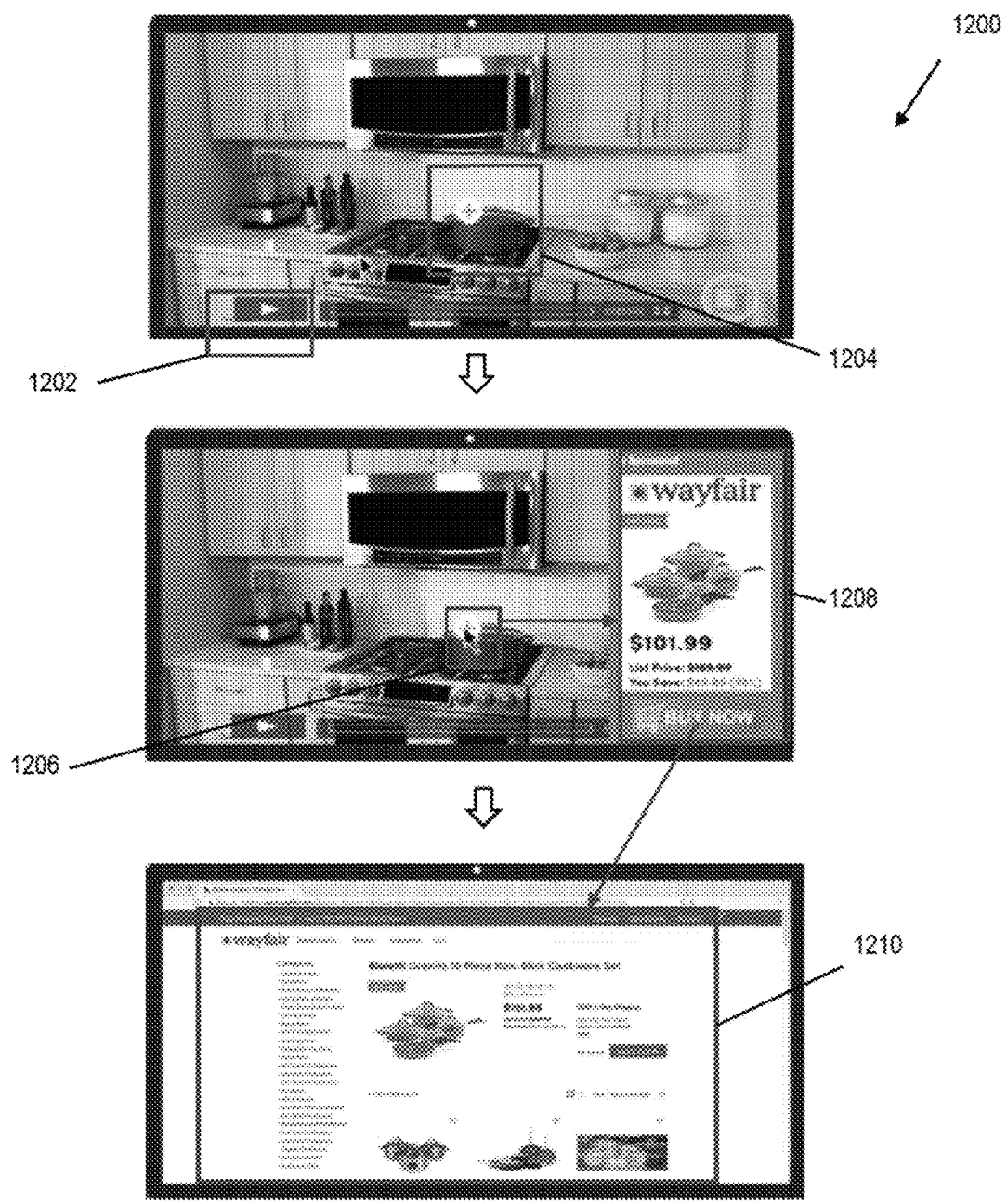
FIG. 12 is graphical representation illustrating an exemplary graphical user interface (GUI) presented to system "front-end" users (e.g., consumers) according to the present disclosure, wherein an in-scene display and interaction paradigm is used.
Figure 13:
FIG. 13 is graphical representation illustrating an exemplary graphical user interface (GUI) presented to system "front-end" users (e.g., consumers) according to the present disclosure, wherein an in-carousel display and interaction paradigm is used.

Referring now to FIGS. 11-13, exemplary implementations of the system (user-facing) UI and interactive elements are shown and described.

As shown in FIG. 11, the first implementation 1100 comprises a user-initiated video "explorer" functionality. Specifically, a video asset is displayed to a user, played via the applicable media player application and rendered on the user's display device. Per step 1102, the user initiates a "pause" function of the player application, which pauses on a prescribed frame. When the video script (previously described) associated with the asset detects selection of the "pause" operation, the video API 145 is accessed, to return data relating to the interactive elements of the paused frame (in this example, various portions of a kitchen including cabinetry with microwave over 1104, 1105, cookware 1108, and various countertop items 1106, 1110). These user-interactive (i.e., selectable) elements are then, in this embodiment, highlighted or contrasted for the user within the display region of each, respectively, so that the user is apprised that more interactive information is available on each.

Per step 1112, the user then selects the microwave oven (element 1105) such as by mousing-over the microwave oven element display area (or clicking thereon, based on level of interaction required by the system programming).

Based on the user's selection or interaction with the microwave oven element 1105, that element is then highlighted/contrasted on the display, and relevant secondary content 1114 regarding the oven (e.g., type/model, price, where to buy) is generated and presented for the user via a newly spawned display window.

In another exemplary application use case (FIG. 12), so-called "in-scene" management is utilized by the system 101 to, inter alia, serve contextually relevant product and content recommendations. In the implementation 1200 of FIG. 12, the user pausing the video (step 1202) activates the icon 1204 in the selected (paused) frame relating to the cookware. User selection of this icon (whether mousing-over or affirmatively clicking it) per step 1206 causes the production of an in-scene window 1208 with relevant secondary content (i.e., more information on the cookware, and an enabled hyperlink for purchase thereof). User interaction with the link ("buy now" button) causes production of a separate web page 1210 whereby the user can purchase the cookware from a vendor.

In another variant, the secondary content is exposed before a media player application function is invoked (e.g., the "play" button is selected), and disappear if the user decides to play the video asset. At any time the user can re-open the viewport to explore and/or shop onscreen interests.

In yet another exemplary application use case (FIG. 13), so-called "in-carousel" management is utilized by the system 101 to, inter alia, serve contextually relevant product and content recommendations as part of a carousel 1306 displayed below the primary content viewport (e.g., that associated with the media player application). As shown, this implementation 1300 includes first selecting the icon relating to an element of interest per step 1302. It is noted that in this implementation, the media player pause function 1304 has not been selected by the user as in the implementations of FIGS. 11 and 12 above, but rather the element of interest is selected on-the-fly during media rendering (play). Based on the user's selection or interaction with the icon at step 1302 corresponding to the cabinets, the cabinet-related secondary content window 1308 within the carousel 1306 is selected by the algorithm, and upon selection thereof by the user (e.g., via mouse-over or click), the relevant secondary content is presented in a larger window 1310. This approach 1300 is well suited for e.g., publishers who wish to provide content viewers (i.e., those accessing their website) with an explore-able video feature outside of the primary content rendering experience. Notably, the system 101 and API 145 coordinate to populate the carousel with interactive elements germane to the then-playing frames, and highlighting of each individual element (as in e.g., the implementation 1100 of FIG. 11 above) is obviated.

Audio-Only and Services—

It will also be appreciated that while described largely in terms of tangible items and visual displays, the various aspects described herein can readily be adapted to use with, inter alia: (i) audio assets; and (ii) to services. As an example of (i), consider a podcast or other audio (only) stream which a user interacts with. During such podcast, a cognizable and recognizable sound or aggregation of sounds may be heard, such as for instance someone "goosing" the throttle on a Ferrari, or a Harley Davidson motorcycle. Each of these sounds is at least to the trained ear, recognizable as to its source. Even if not recognizable, a perceiving user may replay such sounds (such as via a "REW" or other such trick mode associated with the digital audio stream), and such REW or other interaction that can reasonably be correlated to the sound(s) can be used as a basis for expression of interest or an "impression," in effect acting as a corollary to the aforementioned cognizable (visually perceptible) shape which the user mouses-over or touches. Such cognizable sounds may also correspond to trademarks or trade dress of a provider of goods or service (e.g., the Intel "bong"—the Intel® "bong" sound; i.e., D flat, D flat, G flat, D flat, A flat, or the NBC three-tone identifier); hence, a user interacting with such sounds—via REW trick mode command or other, such as a spoken command or mouse click on an associated user interface, can indicate a desire to learn more about the associated good or service.

Similarly, with regard to (ii) above, a service can be represented by a tangible (visually or audibly perceptible) element. Such element may be a sound or series of sounds such as the aforementioned Intel logo, or a tangible one, such as an icon or graphic mechanism which connotes the service. For instance, an H&R Block logo or icon, if recognizable as such by a user viewing a video, can act as a "video proxy" for the services that H&R Block provides (e.g., tax-related), since there may be no good way to succinctly and intuitively visually show someone actually providing tax-related services (do I mouse over the person giving tax advice? Or the piece of paper he/she is holding? Or the office they are in?). Hence, a user mousing-over, touching, or pausing a frame having the aforementioned icon would be counted as (at least putatively) expressing interest in the associated service. In one implementation, the graphic rendering boundaries of the icon are used, in the same way the outer boundaries of the aforementioned white polo shirt are used, to define an "interest" for the service represented by the icon.

Likewise, the visually perceptible aspect(s) of a given good or service are not limited to shape. Coloration and/or texture can be determined via the aforementioned back-end processing conducted by the system, and "intelligent" identification of the good or service can be performed via one or more of: (i) shape, (ii) texture, and (iii) color.

Reverse Lookups and Test Marketing—

In a further aspect of the disclosure, the above-described system can be utilized in "reverse;" i.e., the service provider/system operator may search or crawl a given potential (or actual) customer's online resources to identify good/service described or shown therein, and correlate any identified goods/services to one or more assets of the system operator's inventory. Specifically, in one embodiment, the system utilizes a crawl engine which is configured to evaluate a page, obtain textual information (e.g., in one variant, relating to the title and description and categories), and/or obtain a product image and then analyze it in terms of shape, color, texture, etc. as described supra (e.g., in a comparable fashion that the video is analyzed to find an object). In that an image often contains far less information to use for comparatives or other analysis (i.e., due to the image existing in isolation, versus perhaps hundreds or thousands of frames with potentially useful data in video assets that can be used to correlate/corroborate object identity, context, etc.), in one variant pre-trained data is utilized to characterize the image. For instance, examples or templates of shapes, colors, textures, positioning, etc. that are extracted algorithmically from previously processed video assets are used to complement/evaluate data obtained from the image itself.

Hence, the exemplary system configuration characterizes a customer's online "storefront" website for goods/services, and categorizes each good/service as being associated with (at least) that customer within the system database. For example, an online department store retailer might have thousands of pages listing or displaying hundreds of thousands of individual items available for purchase (or otherwise displayed, such as via promotional photos on the site showing people actually wearing or using goods/services, whether available for sale or not). The service provider/system operator may, using the system disclosed herein, rapidly (and algorithmically) canvass the retailer's website/portal to characterize its goods and services, and then use that data to correlate already processed inventory having similar goods/services. In the exemplary context of the white polo shirt, the retailer may offer several brands of white polos, and the system operator can identify all assets within its library at that point wherein a white polo has been identified (whether by shape, color, texture, and/or contextual information such as associated audio or metadata, or even human reviewer input), and present those to the retailer. This advantageously obviates the laborious and inefficient prior art approach of manual review of videos/assets for instances of each good or service, which becomes wholly untenable as the number of goods/services offered by the retailer increases.

Moreover, this technique highlights another possible utilization of the foregoing capability; i.e., "test marketing" of good/services based on "crawled" listed/shown goods or services that are as of yet unavailable to consumers. Consider for example the case where the aforementioned retailer wishes to evaluate the prospective interest in a new product, such as distinct style of women's shoes. Such shoes may not be available for purchase by consumers, but rather may be shown on the retailer's website, such as in promotional images or video clips of someone wearing them. Using the aforementioned shape-based (and/or descriptive data-based, such as textual or metadata) "crawl" of the retailer's site, the system operator can correlate the particular shoes to others of similar type occurring within one or more video assets in the inventory. Say, for example, the shoes are covered in glitter or rhinestones (or have some other identifiable distinct attribute(s) such as bows on the back); by search of the inventory database for a matching feature (e.g., coloration/texture pattern associated with rhinestones or glitter or bows associated with a shoe), the retailer can obtain ostensibly useful information on the desirability or popularity of glitter/rhinestone/bow-equipped shoes, and utilize such information in its decision on whether to actually market their own corresponding product. For example, if the associated inventory indicates many "hits" (i.e., interactions or expressions of interest) in video frames, or the shoes present in those frames directly, it can be hypothesized that there would be a corresponding high level of interest in their own product. However, such hypothesis may be erroneous, such as where people are clicking on or interacting with the rendering of the shoes in the identified inventory because of morbid curiosity (e.g., "check out these ridiculous, tacky shoes!") or pariah status, or where other style attributes are undesirable (e.g., glitter-covered Earth shoes may not be a big seller). Hence, other indicia of potential interest in actual purchase may be used in tandem, as can multi-variate correlation (e.g., both covering/texture and shape/style attributes can be correlated by the system to particular inventor elements, where such granularity of data exists).

Performance and Other Metrics—

In another implementation, more detailed or granular metrics can be calculated and used for determination of the relative "impact" of a given asset regarding an identified good or service. For example, in one such implementation, a frame count metric can be utilized, such as where the back-end processing system identifies, via shape and/or other attributes, the presence of the good or service in a plurality of frames, which may be expressed as a percentage of the total frames of the asset. Hence, an exemplary video asset with a white polo shirt featured therein might display the white polo shirt in thirty (30) consecutive frames and then never again (before or after), and such 30 frames may constitute 30/3000 or 0.01 (one percent) of total frames in the asset. Such low percentage may be characterized or assigned a low potential "yield" on interaction, since if the user is not attentively viewing those mere 30 frames of the 3000 total, they may miss the good/service altogether. Conversely, a high percentage of frames of the total associated with the given good or service (2000/3000 or 66.6%) or may yield significantly higher potential of interaction by a user, since there are many more opportunities and "looks" at the same good/service.

$$\text{Impact}_{ID} = N/M \quad \text{EQN. (1)}$$

Where:

N=Total number of frames where good/service is reflected;

M=Total number of frames of Asset ID

Other metrics can be utilized consistent with the system logic to determine relative impact or potential efficacy, whether alone or in combination with each other/the foregoing, including without limitation:

(i) an algorithmic analysis of the percentage of the screen or display area consumed by the good—a person wearing a white polo shirt who is relegated to a distant background spot will typically draw less attention than one disposed closely to the vantage point of the image gathering device. Moreover, at greater distance, details of a given good or service are less visually ascertainable; e.g., whether the white polo shirt has a logo or not, it's fit on the wearer, etc. Hence, another metric can be determined using the ratio of the area consumed by the white polo shirt (or alternatively the wearer, including the shirt) to the total display area of that frame.

$$\text{Display Exposure ratio of frame } i \text{ } (DER_i) = (\text{Area of Good}_i)/(\text{Total Frame } i \text{ display area}) \quad \text{EQN. (2)}$$

This quantity may obviously vary as a function of frame, and hence a histogram or distribution can be generated in one implementation, such that the percentage area consumed per frame is functionally related to number of frames (or percentage of total frames). For instance, such histogram or function may show: 1) 100 frames with the polo shown with percentage greater than 25%; 2) 150 frames with percentage >10% but less than or equal to 25%, and 3) 1750 frames with the polo shown but consuming less than or equal to 10% of the display area. Accordingly, a scoring mechanism can be developed based on such analysis, which can be readily performed by the back-end system herein during pre-processing via the server(s) using, inter alia, shape-/color-/texture-based analyses. Moreover, a single metric or quantity can be expressed for the video asset as a whole, such as an average over all relevant frames, which expresses the relative "area" of the total number of relevant frames consumed by the target good/service:

$$DER_{avg} = \Sigma(\text{Area of Good}_i/\text{Total Frame } i \text{ display area})_{i=1 \text{ to } i=N}/N \quad \text{EQN. (3)}$$

Where:

N=total number of frames in video asset having target good/service

The $DER_{avg}$ can then be related to the total number of frames M in the asset (with and without the good/service) for an overall metric on "exposure" within the asset:

$$DER_{tot} = DER_{avg} * (N/M) \quad \text{EQN. (4)}$$

Where:

$DER_{tot}$ has a maximum theoretical value of 1.0 (i.e., every frame in the asset consumed 100% by the good/service).

(ii) Competing elements metric—the number of other potentially "competing" elements within the same frames as the good/service—e.g., frames where the wearer of the white polo shirt is the only human wearing clothing—have a higher cognitive differentiation of the shirt to its background as compared to other frames where there are many humans wearing clothing (e.g., where the wearer of the white polo is within a crowd at a speech or at a football game). Such analysis can be on a per frame or per-group (e.g., GOP) basis; e.g., of the 2000 frames containing the white polo in the above example, 1500 of those 2000 (75%) frames may involve a solo human, and hence have a high differentiation factor over say another video having only 10% of the frames involving a white polo be unique to the wearer.

In the exemplary embodiment, the definition of a "competing" element can be determined on a per-good basis if desired, such as where e.g., an item of clothing generally might be too broad (for instance, another person wearing a hat or carrying a handbag or other dissimilar item of clothing), yet polo shirts only might be too narrow (another person wearing a button-down long-sleeved shirt might find that shirt more attractive than the white polo, when shopping for shirts). Hence, in one implementation, the system includes data files structured to analyze processed frames against a predetermined listing of competing items, and identify such occurrences. As a crude metric, the number of frames identified with both (i) the target good/service (e.g., the white polo) and (ii) one or more competing goods (ii) Associated goods/services metric—similar to (ii) above, other goods or services may, even if in the same category (i.e., ostensibly on the "competing" list), may in fact enhance or detract from the user's interest in the target good. As one example in the context of the aforementioned white polo shirt, other similar or same brand polo shirts shown on different respective wearers in the same frame(s) may actually enhance a user's interest in the good or service generally (e.g., "white is too bland . . . but I do like the blue one . . . "). Hence, in another implementation, the aforementioned data in the competing good/service list held in the back-end database can include a field for enhancement/detraction. This may be binary in nature (e.g., "1"=enhances target good; "0"=detracts from target good), or have finer granularity or information, such as a fuzzy logic variable (e.g., "very enhancing,", "somewhat enhancing," "mildly enhancing"), score or scale (e.g., 0-10), and the like. Based thereon, a score for those frames where "competing" goods/services are present can be derived, and the asset rated accordingly. This approach is particularly useful where a customer (e.g., retailer of men's wear) wants to access inventory more broadly associated with a line or genre of good/service, and not merely one particular configuration (e.g., a line of different color/fabric polos for men vs. merely a white one of a certain type).

(iii) Associated audio metric—Most video assets contain corresponding audio tracks, and hence the user viewing the asset will in most cases also perceive the audio track in synchronization with the rendering of the video frames on the display device. Audio content in such tracks may be highly correlated to the content of the video portion, moderately correlated, have limited correlation, or no correlation at all. For example, an instructional golf video may include an associated audio track wherein the celebrity instructor present in the video is also speaking to the user (viewer), describing his/her actions in detail as they are conducted—hence a high degree of contextual correlation between audio and video exists (distinguish: mere temporal correlation, such as where the voice "matches" the video, but the user is talking about cars while playing golf). Where the context of the video and audio are highly correlated, there is a greater probability that the target good/service will be subject to an expression of interest by the user/viewer than in cases where the target good/service is merely (e.g., incidentally) present and uncorrelated with the audio. In the foregoing golf video example, if the instructor is, while describing his actions, saying how well the Model 123 clubs manufactured by XYZ Corp. he is then using perform at the illustrated task, then such audio/video context association will, statistically speaking, generate many more expressions of interest (e.g., the user pausing the video, mousing-over or touching the display area associated with the clubs) than if the clubs are merely present in the video, and the celebrity instructor is describing his favorite car or how well the golf course is manicured that day.

Accordingly, one embodiment of the present disclosure utilizes audio track analysis via speech recognition to determine: (i) a general context of the audio track or sub-portions thereof (i.e., portions of the audio track which are temporally correlated to the frames (N) where the target good or service is present); and (ii) a specific context; i.e., is the target good/service being discussed, either generically (e.g., "a good set of golf clubs really helps with this skill I'm teaching"), or specifically (e.g., "these Model 123 clubs made by XYZ really help with this skill I'm teaching"). Specifically, in one implementation, the audio data associated with the asset is processed by the back-end server to identify one or more portions thereof temporally correlated to the N frames which are identified by the pre-processing to contain the shape/color/texture associated with the good/service of interest. For example, all such frames may occur between time references A:BB:CC and D:EE:FF of the video data, and hence the corresponding audio portions are first identified. The identified portions are then processed by the speech recognition algorithm to identify words therein, and a context engine algorithm executed by the server on the recognized words to identify context. Alternatively (or in tandem), the server may utilize other resources for context determination, including inserting one or more of the recognized words into an internal or external search engine such as Google (which has significant capability at diving a short-list of the most relevant results based on its proprietary algorithms and multivariate analysis).

Specific context can also be determined wherein the recognized words can be correlated to a target good or service. For example, in one variant, the back-end server processing utilizes a shorted or focused listing of potentially relevant good- or service-specific terms relating to a detected shape as a basis for specific context determination. For instance, if preprocessing of video asset ID 123456 shows that a shape relating to a golf club bag was detected in one or more frames, the putative identity of the shape is a golf club bag, and hence model number or manufacturer identifying data for toasters or lipstick or polo shirts is likely not germane. Hence, the logic in such cases is configured to access a pre-existing data set (or data set assembled on-the-fly, such as via external searches) relating only to golf club terms (e.g., titanium shaft, driver, putter, etc.), manufacturers (e.g., XYZ Corp.), known models (e.g., Model 123), thereby reducing the processing overhead on the context engine of the back-end server, and ideally constraining the results to those relevant to the identified shape. This approach can employ Boolean or other desired logic in the case of multiple shapes in the same frame(s); e.g., the accessed "reduced" data set can be a Boolean "OR" of terms for either golf clubs or the other recognized shapes (e.g., white polo shirt worn by golf instructor). In the case where the golf instructor is discussing the Model 123 clubs by XYZ specifically, the correlation engine will return one or more "hits" associated with the recognized words spoken by the instructor, within the reduced data set, and accordingly grade or score that portion of the audio track as having a high degree of correlation to the recognized shape for the golf clubs. Similarly, the correlation engine will analyze the recognized words for any relating to white polo shirts (of which one appears in the same frame(s)), and in the aforementioned example will find none, thereby indicating a low audio correlation for the white polo shirt (at least for those frames; the instructor may describe his great white polo shirt later in in subsequent portions of the audio track, such portions then being given a high audio correlation score for the white polo, and low score for the XYZ golf clubs).

As such, the service provider may then utilize the pre-processed (audio and video) asset to characterize the asset as to: (i) its visual or video presence of the golf clubs; (ii) its visual or video presence of the white polo; (iii) its degree of audio correlation to the visual or video presence of the golf clubs; and (iv) its degree of audio correlation to visual or video presence of the white polo. These metrics may be utilized in e.g., pricing and/or inventory selections for particular customers—e.g., sellers of golf clubs and/or polo shirts.

In another implementation, a "repeat" metric can be calculated by the system algorithms 302 and utilized (i) internally within the system as further data or indicia of user interest in a good or service represented within an asset, and/or (ii) provided to one or more back-end customers (e.g., publishers or advertisers) as part of e.g., a periodic report, including via the portal 157, such as via the GUI 1000 of FIG. 10. In one variant, the metric is calculated based on the number and periodicity of user interactions with a particular display/audio element within the media asset (e.g., the number of times they mouse-over or click on the element, and relative timing thereof). For instance, a user expressing interest in a given shape element in a video asset once, and never again, could be indicative of low or only passing interest, and hence would generate a low score in terms of repeat metric value. Conversely, a (common) user selecting the same shape either (i) multiple times consecutively within a short period of time (e.g., within the same viewing of the media asset), or (ii) selecting the same shape each time they view the media asset (separate viewing) could indicate a high product interest level or "memory half-life" for that user/product combination.

Privacy/Anonymity/Celebrity Aspects—

Another advantageous aspect of the methods and apparatus of the present disclosure relates to privacy rights. Specifically, the exemplary embodiment of the system described herein is configured such that it does not identify individuals, and hence not only protects but enhances privacy. It will be appreciated that a given asset may include a person (e.g., a well know movie star such Dwayne Johnson) wearing the aforementioned exemplary white polo shirt. As such, one could infer that Dwayne Johnson, by wearing that shirt, may sponsor the shirt line or manufacturer/retailer thereof. This is particularly problematic for "branded" garments such as those which inescapably show the brand logo and/or name such that anyone viewing the wearer immediately knows that they are wearing a garment made by that source (or at least licensed under that name). However, that is different than asserting that the celebrity actually sponsors the garment/retailer, and/or receives remuneration for wearing it (i.e., the celebrity may simply like the look of the branded garment). Accordingly, in a hypothetical system where a particular individual is identified based on e.g., their identity or celebrity (e.g., Dwayne Johnson), it could be inferred that since the service provider affirmatively determines and knows the identity of the individual in an asset (video with Dwayne Johnson wearing a white polo shirt) and can affirmatively identify the product (white polo) such as via shape-/color-/texture-based analysis and/or contextual analysis, the service provider is misleading the asset user's or its customers; i.e., implying that Dwayne Johnson sponsors white polos sold by the retailer (e.g., Macy's). Accordingly, one exemplary implementation of the system described herein does not use identification algorithms (e.g., facial recognition, contextual determination such as audio recognition and analysis), but rather merely identifies the target good or service via pre-processing, and then provides a prospective or actual customer with a listing of assets featuring the good/service, irrespective of who might be present or featured in the asset. Stated differently, the exemplary embodiment herein does not select assets of its inventory for provision to a customer on the basis of any association with a person or organization, yet rather only based on the presence of a target good or service.

Accordingly, yet other implementations of the system can be specifically configured to ensure privacy, such as via one-way cryptographic hash or the like of the asset unique ID and/or the source URL for the asset. In this fashion, the customer has no visibility into the actual assets themselves (other than knowing it's generally X seconds long, has Y DER (see DER analysis elsewhere herein), and is carried on a given host site or service provider; the hash cannot be "reverse engineered" to determine the source data from which it was derived.

It will be appreciated, however, that in other implementations, individual identity information may be used for both purposes of association and dis-association if desired; i.e., highlighting video assets where an identified person is present, and then selectively utilizing or not utilizing those assets respectively based on the presence of the identified person(s). For example, a retailer may wish to avoid inventory associated with (i.e., authored by, and/or carried on a comparable website) hate groups, extremists, or the like. As such, a retailer may wish to completely avoid a video asset having a controversial and generally reviled figure represented therein (albeit wearing a white polo shirt of the type manufactured/sold by the retailer), even though it may be carried on an otherwise reputable, mainstream hosting site. In another example, the retailer may already have an association/sponsorship arrangement with a celebrity, and as such, may affirmatively wish to seek out assets where that celebrity is utilizing the target good/service; e.g., where Dwayne Johnson has a hypothetical deal with Macy's to sponsor polo shirts, and Macy's seeks to identify assets having (i) Dwayne Johnson and white polos (although Dwayne Johnson may not necessarily be wearing the white polo in the asset); and/or (ii) assets with Dwayne Johnson wearing the white polo.

Accordingly, the system of the present disclosure may also be utilized for providing an automated mechanism for facilitating celebrity or organizational endorsements. For example, the system may include logic to ascribe a given amount of remuneration to a celebrity for each "click through"; i.e., each time that a user requests additional information on a target item bearing a prescribed relationship with the celebrity (e.g., white polo shirt worn by Dwayne Johnson). This approach leverages the recognition that an expression of interest by a user via an asset with a celebrity having the prescribed association with the good or service (e.g., wearing it, carrying it, drinking it, using it to do their taxes, etc.) may have been largely driven by the presence of the celebrity and their putative endorsement of the good/service.

Based on the foregoing, the present disclosure contemplates a customer-specific provision of services and inventory identification with respect to anonymity; i.e., for some customers, complete privacy and anonymity of source material is maintained, while for others more transparency into the characteristics (and personalities/organizations) in the relevant inventory is provided. For example, under one model, the system operator may verify the foregoing sponsorship arrangement before providing access to the relevant customer for the more transparent/invasive data set(s); failing such verified relationship, the opaque/anonymous approach described above is employed.

Impressions—

The service provider may also utilize the system to count "impressions" (i.e., actual or ostensive cognations by users of certain good/services, and charge customers of the service provider based on an associated metric. For example, in one simplistic approach, any asset wherein the target good or service appears in any salient capacity could be charged as an "impression." In more sophisticated approaches, other data relating to e.g., percentage of display area, DER, percentage of the asset where the good/service appears(N/M), the number of new introductions of the good/service within a video, is used as a basis (or bases) for charges to the customer. In one variant, prescribed known shapes and/or colors (or combinations) can be searched during pre-processing, using e.g., a template for the shape/color(s). For instance, a car company logo (e.g., multiple rings in a linear sequence) can be rapidly identified using a pre-existing template (e.g., one which contains polygon data relating to the relationships or ratios of the width to height, diameter of the rings relative to other dimensions, etc.). Hence, a customer (or the system operator) can insert such a template into the system database, and use this as a search criterion during pre-processing or post-processing. The car company can request, for instance, that the system operator locate all video assets where one of their vehicles is shown. Similarly, an actual vehicle manufactured by that car company will have particular dimensions, ratios, etc., which can be used to locate video assets having that vehicle featured therein. Individual rates for each appearance of the foregoing vehicle and/or logo can also be set accordingly.

Additional Display Contexts—

It will be appreciated that the various aspects of the present disclosure can be applied to other display contexts, including for television and gaming. Specifically, in one such variant, a user's smart TV can be configured to utilize one or more code scripts to detect user selection or "hovering" on various display elements, such as those being rendered as part of a video asset on the TV display. As is known, many forms of video content are encoded using similar digital codecs (e.g., H.264/MPEG-4, MPEG-2), and their transport/network protocols varied for delivery of the content. For instance, an "OTT" (overt the top) delivery paradigm delivers e.g., IP-protocol media via a user's Internet or broadband connection of an underlying service provider. Similarly, so-called "IP-TV" takes a more integrated approach within the service provider network. Normal cable or satellite TV content is delivered via e.g., a radio QAM modulated frequency channel. However, fundamentally, all codecs utilize a frame/GOP structure and have generally similar attributes, and hence lend themselves to the shape/color/texture analysis provided by the back-end processing of the system described herein.

Similarly, gaming technology (e.g., that served over a remote server to various different "local" players can readily be adapted to utilize pack-end processing as described herein. Consider for example a popular game which features various types of high-end sports cars. The various available elements (e.g., incarnations of different types of cars which could possibly be invoked during play of the game) are pre-processed by the system as previously described based on shape/color/texture, as well as any available dimension templates of the type described herein. Notably, under a CGI or VR paradigm (discussed below), the geometric shape(s) associated with a given object are already known, since the graphics processor (e.g., 3D rendering engine and algorithms already know the shape to be rendered and colored/textured, and hence back-end processing by the system need only access those algorithms which generate the shape, and not run a shape/color/texture-based analysis to attempt to determine the identity of the object. For example, the game may include a choice of five (5) user-selectable cars for each user as part of the game play. The rendering details of these five choices are known a priori by the game software, and stored as data structures within the game (which may then be called and rendered on-screen, including dynamic modifications thereto during play of the game for e.g., aspect, damage, relative movement of components such as doors being opened, etc.). In the event such templates or data are made inaccessible to the system operator directly, the game can simply be "run" as part of the pre-processing, and the aforementioned shape/color/texture-based recognition algorithms utilized to identify the five vehicles available within the game.

A user subsequently playing the game may see a car of particular interest to them (e.g., one of the five above); clicking on or "joy-sticking over" the CGI rendering of that car, or pausing the play of the game at that point, causes the resident script to call an appropriate API on the system operator back-end server as previously described, thereby invoking provision of information relating to the car of interest to the user dynamically. Alternatively, since pausing play of the game or hovering/clicking on the car may disrupt game flow, another variant of the system is configured to cause caching or storage of the relevant information for the user, or transmission of the relevant data via another modality (e.g., text message with link to the user's designated smartphone, email to their designated account, etc.) such that the user can view that information off-line after completion of the game.

In yet other implementations, the expression of interest can be actively or passively incorporated into virtual reality (VR) systems, such that information on goods/serviced experienced during VR sessions can be obtained, whether immediately or via an alternative delivery modality as described above. For example, an "active" cue within the VR environment may consist of a user blinking twice when looking at an item of interest; the VR system eye sensors can readily detect such blinks, and use the occurrence of e.g., two or more blinks in rapid succession (e.g., with X milliseconds of one another) as a "hot word" for invoking provision of additional information about the good/service on which the user's eyes are focused. As with the gaming example discussed above, the rendering of shapes, objects, etc. in the VR environment is computer-generated (e.g., CGI), and hence similar approaches can be utilized for "pre-processing" the VR software prior to user launch.

Additionally, in another variant, the user's speech can be accessed as a mechanism for invoking expressions of interest in rendered or displayed items. This approach can be utilized under any asset rendering context/paradigm; i.e., VR, gaming TV, computer/mobile, or audio. For instance, a spoken "hot word" can be employed which is recognized (e.g., via microphone and associated SR software) and which causes selection of a then-rendered frame for further processing. Hence, a user viewing a series of frames with a car of interest rendered therein can say "WowYow" or other selected word or phrase, which will be interpreted by the system as the hot word to select the then rendered frame via the script??, and a query to the cognizant API for that asset to obtain related secondary content for the element(s) displayed therein (e.g., the car).

It will be appreciated that the speech recognition (SR) and other processing utilized as part of the system, where so equipped, may be either local, cloud-based, or combinations thereof. Cloud-based processing carries the advantages of, inter alia, higher processing capability due to the use of e.g., multiple high-speed servers or farms, as well as possible human-based ambiguity resolution/confirmation (e.g., where a user's spoken word(s) cannot be reliably recognized by the SR software/algorithms alone), as well as obviating installation of SR software on the user's platform (thereby requiring additional storage and processing overhead when running).

Addition Functions and Use Cases

In addition to the foregoing functions, the exemplary system configuration may also include other functions by virtue of algorithms and routines installed on the back-end server(s) 140, as now described in greater detail.

Cross-Platform/User Sharing—

In another implementation of the system, interactive/identified elements within the media asset are configured such that they can be "shared" with other users via social media (e.g., via an established contact or "friend" listing within the social media application being used. For instance, in one variant, an icon is generated on the user display so as to overlay or be immediately proximate to an interactive element found within the media asset (see FIGS. 10-11). A user wishing to share the interactive element with a friend, etc. can utilize the icon to invoke an API on the back-end server which enables the user to select a contact (and social media platform, such as Facebook); once selected via the user's input device, the selected contact data is utilized by the server to format datagrams to the serving host for the social media contact, including data regarding the selected (interactive) elements.

In the instance where a user viewing a web page/asset "shares" that asset with another user (e.g., via a social media interface or other means), the system is configured in one embodiment to select a relevant I-frame to share. For example, in one configuration, a user viewing a video asset is presented with an on-screen icon or display element which is selectable; i.e., includes a link to a system operator or third party server which causes forwarding of data relating to the asset to be forwarded to e.g., another person in the first user's contact list. In one implementation, the forwarded data comprises data enabling rendering of the I-frame for the recipient user, including the script portions necessary to enable the receiving user to invoke an API call to the back-end server upon selecting or hovering over the element(s) of interest in the I-frame. Alternatively, the receiving user may merely be sent a link to make the API call directly. In another variant, so-called "social graph" API's are utilized for passing references to videos images and text. In one implementation, such a graph API is used to get data out of, and put data into, a social media platform such as Facebook, and comprises a low-level HTTP-based API that can be used to, inter alia, query data, post content, upload images or data.

The graph API includes: (i) nodes—basically "things" such as a user, image, a page, or other; (ii) edges—the connections between "things", such as a page's images, or an image's comments; and (iii) fields—information about the "things", such as a person's birthday, or the name of a page. In that APIs such as the exemplary graph API for Facebook are typically HTTP-based, they advantageously operate with any language having an HTTP library, such as cURL and urllib. We'll explain a bit more about what you can do with this in the section below. As such, the graph API or others may be used directly within a browser application. Most graph API requests require the use of access tokens, which can be generated for example by implementing login on the social media site.

It will be recognized that data stored within the system database—e.g., resulting to related materials (e.g., images and links) found during a complementary data search by the system and stored in relation to one or more objects, may be used to send to one or more social networks or sharing platforms.

Product/Service-Related Features—

As previously referenced, the system is in one exemplary embodiment configured to utilize a Global ID value (e.g., X55992=Dwayne Johnson) in classifying or categorizing processed videos, wherein the identifier relates to a prescribed context or attribute. Such identifier-based cataloging allows for easier search; for example, a user (e.g., customer of the service) who wants to advertise their products or services in all Dwayne Johnson videos can easily be presented with a listing of all known related videos meeting that criterion based on an identifier-based access by the service provider system.

It will be appreciated that each video may have several (or even numerous) identifiers associated with various facets or attributes of that video. For example, a video with multiple famous or recognizable persons may have unique identifiers associated with each of them. Similarly, that same video may be a music video of a certain genre (e.g., country music), and hence it may have a separate identifier within the database as to this aspect. Moreover, the same video may have one of the aforementioned persons wearing an item of apparel (e.g., sunglasses of a certain type) which can be given its own identifier within the database. These attributes can accordingly be searched by the service provider: (i) individually; or (ii) as an non-weighted "ensemble" (i.e., each attribute is given equal weight and must be present for a "hit" (i.e., video or audio element having all of the searched-for identifiers associated therewith) to be returned); or (iii) as a weighted or non-exclusive ensemble (i.e., where certain attributes must be present, while others are not essential but reduce the weighting of the given video or audio element relative to others).

In yet another implementation, a product/service "zoom" feature is operative on the system 101 which enables, inter alia, spatial or temporal zooming to a prescribed area or time period of interest within the media asset. For example, in the context of a video media asset, the pre-processing of the media asset at identification/ingestion provides the system with characterizing data regarding the identity and instances of cognizable elements within the video data (e.g., identification of a set of golf clubs occurring at say three different temporal references or I-Frames/GOPS within the video). Moreover, if the goods/services or other such elements are affirmatively identified (e.g., golf clubs are Model 123 manufactured by XYZ Corp.), the system maintains additional information on the element (such as via internal or external online or web search for information on the identified element, such as via the aforementioned Model No. and manufacturer data). Hence, a user invoking a "zoom" function (e.g., via an interactive icon or other display mechanism generated on the user's display while the relevant portions of the asset are being rendered) will: (i) detect the user-designated zoom area coordinates (e.g., specified via a user "click and drag" or similar input device manipulation); (ii) determine the presence of any selectable/interactive elements within the zoom area for that frame or set of frames/GOP (based on the prior pre-processing of the asset and storage of the data within the database entry or ID associated with the asset), and (iii) when a selectable element is determined to be within the zoom area on the rendered display, invoke a routine to provide additional data (e.g., secondary content such as advertising or information regarding the element), such as via a pop-up window within a designated portion of the display, or other such on-screen mechanism, and/or invoking an audio clip related to the element. Notably, such on-screen mechanism and/or audio providing the secondary content are not part of the media asset encoding, but rather an addition of an overlay within the display space (or audio track, respectively). Such zoom function can also be programmed to close or collapse after a prescribed event and/or period of time occurs; e.g., 5 seconds with no further user interaction or input; selection by the user of a "PLAY" or "FF" or "REW" command for the associated media player, etc.

In yet a further implementation, the system 101 may be configured to enable suggestion of contextually related goods or services to a user via their rendering client device. Specifically, as described elsewhere herein, the system processes structures (e.g., frames) of data in media assets to identify elements therein; e.g., shapes/colors/textures in a video I-Frame. Once the analytical portions of the system logic have identified and cataloged these identified elements (e.g., as a golf club bag) within the database, the ID assigned to that (e.g., P789 for golf clubs) can be used as a basis for search by the system operator (or customers thereof, such as advertisers or publishers) for locating comparably classified goods/services (i.e., having the same or categorically related ID value, such as for P700 for "golf or golf equipment, generally") within other cataloged assets of the system database. Likewise, the system operator in the exemplary implementation maintains data on advertiser or other sponsored products; e.g., Manufacturer XYZ's Model 123 golf clubs. Accordingly, the image matching engine of the system is configured to correlate the same (or categorically related) IDs between the media asset inventory and the data of known advertiser or sponsor products, the latter also having an ID value of P789 in the example since they are also golf clubs (as well as a category ID of P700 as being generally related to the field of golf/golf equipment).

As such, once matching products have been identified by the foregoing algorithm, the data relating to the product within the data (e.g., URL or other data, such as actual promotional or advertising media itself) can be served to the user, such as via a display window or related/suggested products "bar" 824 of the type shown in FIG. 8.

In another embodiment, a content publisher site (e.g., that for a news outlet or media organization such as CNN, or popular publisher site such as YouTube or Yahoo!) may have multiple content elements or assets displayed on a given page. For example, as is now common with many websites, so-called "related" (e.g., "you may also like . . . ") teasers may be displayed spatially proximate to a primary asset on the rendered display region, or alternatively multiple primary assets of equal stature may be displayed (such as in a vertical tile). It will be appreciated that certain implementations of the described system may be configured such that, before even selecting one of these assets for rendering by a media player or other rendering application, a "display" frame representative of that asset may be displayed within, e.g., the aforementioned tile arrangement, and one or more scripts associated therewith (whether one a one script per asset basis, or one script associated with multiple assets). The displayed frames for each asset may be e.g., a first frame of the asset, or one selected according to another prescribed scheme (e.g., one identified by a human or algorithmic process as being of most potential interest—a "highlight" frame as it were). This initial/highlight display frame may also be interactive with the script associated therewith, such that a user merely need hover over the "play" icon (i.e., typically a right-pointing arrow head within a circle or the like) with the mouse, or touch that portion of the capacitive touch screen grid as applicable, to invoke the script as previously described herein. Hence, any pre-processed display elements associated with that display/highlight frame can be immediately identified by the script calling the API of the back-end server to access the database.

In one variant, the database is structured such that the display/highlight frame is separately categorized as to any displayable elements therein, such that the back-end server can obviate more detailed processing of a time index or other reference of the display/highlight frame to extract it from the complete processed data set stored in the database as under prior embodiments herein. Hence, back-end processing overhead and delay time in rendering any displayable elements within the display/highlight frame are each advantageously reduced in such case.

Internal Secondary Content Provision—

In another embodiment, the system is configured such that users interacting with or expressing interest in elements of certain assets are selectively routed to an (internal) page or site of the customer, who may also be the hosting entity of the asset. For example, a new service who maintains a new-related website with multiple video assets that have been pre-processed by the back-end of the system may utilize the system to route expressions of interest in certain elements (e.g., goods or services) represented in the assets to other sites or URLs of that same customer (e.g., a partner site, informational webpage providing additional detail/ explanation of the element, etc.), in effect providing a visual or audio analog to embedded links in a textual story as in the prior art. Such an approach may be useful, inter alia, where (i) control of "branching" off an asset is desired (e.g., in a correctional institution or school, where the ability to link outside of a prescribed "walled garden" of information is controlled; or (ii) for informational purposes or knowledge enhancement, such as where the aforementioned news service desires to provide its users (viewers of the element-enabled assets) with a rapid means of enhancing their knowledge on a particular topic, such as where the user mouses-over an image of the Webb Space Telescope (JWST) in an asset, and is linked (automatically or under user confirmation) to a web page of the news service describing the JWST in detail.

Correlation to Programming—

In yet another embodiment, a given media asset can be correlated to a program lineup or schedule of a content provider, such as a cable or satellite provider (e.g., Comcast or DirecTV) or "OTT" network such as e.g., Netflix or Amazon. Specifically, upon pre-processing as described elsewhere herein, a given video asset can be characterized within the system database as to content/primary context as well as particular attributes (e.g., accessible shape/color/ texture elements), and this information can be related, whether by the system operator or a third party, to content provided by a content provider or program channel that is logically or contextually related. For example, the aforementioned video asset with an accessible shape element corresponding to the JWST can, via processing of the resulting database entry created by the system under the asset ID for that video, be correlated to incipient programming of a customer (e.g., the National Geographic Channel (NGC)) having a space-based or astrophysics theme. As such, the user interacting with or expressing interest in the JWST rendered in the video asset can then be linked directly to content listings, promotional material, etc. sponsored by NGC for that incipient programming. Accordingly, the user need not utilize a separate search engine, review channel listing, etc. to find the related programming, but rather merely need pause, click on, mouse-over, touch, etc. the image rendered in the video asset to automatically obtain such information.

Scavenger Hunt—

In a further embodiment, users of the system (i.e., users viewing the media, such as consumers) can be presented with any number of ways of interacting with content within one or more prescribed media elements, such as pursuant to a game (e.g., "scavenger hunt") or for other purposes. For instance, users may be tasked with locating a set of pre-scribed items or objects (and/or audible elements) within the media asset(s). Once located, such asset may be paused, or the item clicked-on or selected by the user, or other input provided (akin to the previously described actions corresponding to expression of interest in an element), thereby indicating that the user has found the element. Proper selection of elements (including for instance also in a prescribed sequence) is evaluated by the back-end algorithm to confirm that the participating user has met all of the criteria specified as part of the game/exercise/event. Moreover, multiple assets may be utilized, and data relating thereto generated based on user interactions with each stored under a database entry or structure corresponding to: (i) the particular user; (ii) the particular media assets involved; and/or (iii) the particular interactive elements interacted with. In this fashion, data relating to interactions distributed over different assets and/or periods of time can be maintained by the system.

"Live" Streaming Variants

Notably, the exemplary embodiments of the system 101 and associated algorithms and engines 302 utilize non-real time processing; e.g., where the video or audio content asset (whether delivered via a streaming paradigm or as a file or download) is processed at a time different than that for which a user wishes to utilize it. Specifically, in one variant, a "crawler" or other identification algorithm is used to identify, within a prescribed time period, assets to be ingested and processed by the system at a later time. So, for instance, assets identified within the first 23 hours of a given calendar day may be ingested and processed during the $24^{th}$ hour of that day, the processed assets then being available as "inventory" for placements by the service provider for its users/customers. Once identified as such, the service inserts the exemplary script as described elsewhere herein, thereby "activating" the asset for the attribute-based advertising or use.

It will be appreciated, however, that depending on the processing capability of the servers 140 (and farm 220 if used) and the complexity of the content asset, the processing may in fact be processed by the system back-end in real time or near-real time, such that any lag associated therewith is largely or completely imperceptible.

As will be appreciated by those of ordinary skill, no media—even analog—is truly "live" from the standpoint that there is always some degree of delay in capturing, transmitting, and rendering the media. For example, an analog radio transmission of a musical performance still encounters processing delays associated with modulation of the baseband signals onto a carrier, transmission of the carrier, reception of the transmission, down-conversion to baseband, and rendering of the received signals via an audio coil (e.g., speaker). Similarly, digital capture, encoding, transmission, decoding, and rendering all consume finite amounts of time.

However, depending on the interposed transmission media, encoding schemes, etc., and with ever-increasing data processing capability, the lag or delay associated with delivery of "live" media content is shrinking. Especially where parallel processing is utilized (e.g., server "farms" as previously referenced herein), on-the-fly processing of digital media in accordance with the various aspects disclosed herein is in fact within the realm of practicality.

Hence, live (not previously recorded) media sources such as streaming of a contemporaneous musical performance rendered in media data packets, or a television broadcast of a sporting event transmitted as encoded data packets, can be processed using the techniques described herein such that minimal if any user-perceptible delay is noted. For example a live video stream of a musician playing an instrument may be processed by the system 101 of FIG. 1 on-the-fly, and the rendered (decoded) content displayed with the aforementioned user-selectable display elements in effectively real time, such that a user viewing the (near) contemporaneous rendering of the "live" performance can select e.g., the musical instrument being played to obtain secondary content relating thereto. Such capabilities are largely dictated by (i) the size and degree of processing parallelism of the server farm (see FIG. 2); (ii) data bandwidth of interposed communication links; and (iii) processing capabilities of the rendering platform (e.g., client device such as a smart TV or smartphone).

It is noted that while the embodiments described previously herein (i.e., relating to non-live streamed media) have the ability to read or determine a particular image frame at the moment of "true" pause by virtue of the mathematics applied (including knowledge of the codec used to encode the media and the player attributes), such pre-determination and mathematical corrections become less effective when applied to live (i.e., real or near-real time content that is streamed), and hence alternate methods may be utilized, including reading the media content stream or active visual image in real/near-real time, and algorithmically mapping user interactions to the read data in native real time.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

EXHIBIT I
Exemplary Computer Code for Video Player API
©2017-2018 WowYow Inc. All rights reserved

```
function
extendPlayerAPI(player,playerElement){player.played=false;player.getplayed=function(
){returnplayer.played;
};
player.getVideoID=function( ){varregExp=/^.*((youtu.be\/)|(v\/)|(\/u\/w\/)|(embed\/)\(wat
ch\?))\??v?=?([^#\&\?]*).*/;
varmatch=player.getVideoUrl( ).match(regExp);
return(match&&match[7].length==11)?match[7]:false;
};
player.play=function( ){player.playVideo( );
};
player.pause=function( ){player.pauseVideo( );
};
player.stop=function( ){player.stopVideo( );
};
player.gettime=function( ){returnplayer.getCurrentTime( );
};
player.paused=function( ){if(player.getPlayerState( )==2){returntrue;
}else{returnfalse;
}};
player.getstate=function( ){returnplayer.getPlayerState( );
};
player.viewlogged=false;player.viewed=function( ){vartf=false;
if(player.getCurrentTime( )>=5){tf=true;}return tf;
};
player.getHeight=function( ){return playerElement.offsetHeight;
};
```

EXHIBIT I
Exemplary Computer Code for Video Player API
©2017-2018 WowYow Inc. All rights reserved

```
player.getWidth=function( ){returnplayerElement.offsetWidth;
}
;varaddEventListener=player.addEventListener;
if(!addEventListener._—YTWrappedAPI){varaddEventListenerWrapped=function(eventN
ame,listener){if(/^hover$/i.test(eventName)){if(typeoflistener==='function'\\listener&&li
stener.call){addDOMEventListener(playerElement,'mouseover',function( ){listener({targe
t:player});
});}
return;
}returnaddEventListener.apply(player,arguments);
};addEventListenerWrapped._—YTWrappedAPI=1;player.addEventListener=addEventLis
tenerWrapped;
}}function
addDOMEventListener(playerElement,eventName,listener){if(playerElement.attachEvent
){playerElement.attachEvent('on'+eventName,listener);
}elseif(/^(?:object\embed)$/i.test(playerElement.tagName)){varoriginalListener=playerE
lement['on'+eventName];
playerElement['on'+eventName]=function(event){try{if(originalListener){originalListene
r.call(this,event);
}}finally{listener(event);
}}
}}else{playerElement.addEventListener(eventName,listener);
         }}
```

EXHIBIT II
Exemplary Computer Code for Gender Determination API

```
/*
 * Copyright (c) 2011. Philipp Wagner <bytefish[at]gmx(dot)de>.
 * Released to public domain under terms of the BSD Simplified license.
 *
 * Redistribution and use in source and binary forms, with or without
 * modification, are permitted provided that the following conditions
are met:
 *   *       Redistributions of source code must retain the above copyright
 *           notice, this list of conditions and the following disclaimer.
 *   *       Redistributions in binary form must reproduce the above copyright
 *           notice, this list of conditions and the following disclaimer in
the
 *           documentation and/or other materials provided with the
distribution.
 *   *       Neither the name of the organization nor the names of its
contributors
 *           may be used to endorse or promote products derived from this
software
 *           without specific prior written permission.
 *
 *   See <http://www.opensource.org/licenses/bsd-license>
 */
#include "opencv2/core/core.hpp"
#include "opencv2/contrib/contrib.hpp"
#include "opencv2/highgui/highgui.hpp"
#include <iostream>
#include <fstream>
#include <sstream>
using namespace cv;
using namespace std;
static Mat norm_0_255(InputArray _src) {
    Mat src = _src.getMat( );
    // Create and return normalized image:
    Mat dst;
    switch(src.channels( )) {
    case 1:
            cv::normalize(_src, dst, 0, 255, NORM_MINMAX, CV_8UC1);
            break;
    case 3:
            cv::normalize(_src, dst, 0, 255, NORM_MINMAX, CV_8UC3);
            break;
    default:
            src.copyTo(dst);
            break;
    }
```

EXHIBIT II
Exemplary Computer Code for Gender Determination API

```
        return dst;
}
static void read_csv(const string& filename, vector<Mat>& images,
vector<int>& labels, char separator = ';') {
        std::ifstream file(filename.c_str( ), ifstream::in);
        if (!file) {
                string error_message = "No valid input file was given, please
check the given filename.";
                CV_Error(CV_StsBadArg, error_message);
        }
        string line, path, classlabel;
        while (getline(file, line)) {
                stringstream liness(line);
                getline(liness, path, separator);
                getline(liness, classlabel);
                if(!path.empty( ) && !classlabel.empty( )) {
                        images.push_back(imread(path, 0));
                        labels.push_back(atoi(classlabel.c_str( )));
                }
        }
}
int main(int argc, const char *argv[ ]) {
        // Check for valid command line arguments, print usage
        // if no arguments were given.
        if (argc < 2) {
                cout << "usage: " << argv[0] << " <csv.ext> <output_folder> " <<
endl;
                exit(1);
        }
        string output_folder = ".";
        if (argc == 3) {
                output_folder = string(argv[2]);
        }
        // Get the path to your CSV.
        string fn_csv = string(argv[1]);
        // These vectors hold the images and corresponding labels.
        vector<Mat> images;
        vector<int> labels;
        // Read in the data. This can fail if no valid
        // input filename is given.
        try {
                read_csv(fn_csv, images, labels);
        } catch (cv::Exception& e) {
                cerr << "Error opening file \"" << fn_csv << "\". Reason: " <<
e.msg << endl;
                // nothing more we can do
                exit(1);
        }
        // Quit if there are not enough images for this demo.
        if(images.size( ) <= 1) {
                string error_message = "This demo needs at least 2 images to
work. Please add more images to your data set!";
                CV_Error(CV_StsError, error_message);
        }
        // Get the height from the first image. We'll need this
        // later in code to reshape the images to their original
        // size:
        int height = images[0].rows;
        // The following lines simply get the last images from
        // your dataset and remove it from the vector. This is
        // done, so that the training data (which we learn the
        // cv::FaceRecognizer on) and the test data we test
        // the model with, do not overlap.
        Mat testSample = images[images.size( ) - 1];
        int testLabel = labels[labels.size( ) - 1];
        images.pop_back( );
        labels.pop_back( );
        // The following lines create an Fisherfaces model for
        // face recognition and train it with the images and
        // labels read from the given CSV file.
        // If you just want to keep 10 Fisherfaces, then call
        // the factory method like this:
        //
        //                      cv::createFisherFaceRecognizer(10);
        //
        // However it is not useful to discard Fisherfaces! Please
```

EXHIBIT II
Exemplary Computer Code for Gender Determination API

```
    // always try to use _all_ available Fisherfaces for
    // classification.
    //
    // If you want to create a FaceRecognizer with a
    // confidence threshold (e.g. 123.0) and use _all_
    // Fisherfaces, then call it with:
    //
    //                  cv::createFisherFaceRecognizer(0, 123.0);
    //
    Ptr<FaceRecognizer> model = createFisherFaceRecognizer( );
    model->train(images, labels);
    // The following line predicts the label of a given
    // test image:
    int predictedLabel = model->predict(testSample);
    //
    // To get the confidence of a prediction call the model with:
    //
    //                  int predictedLabel = -1;
    //                  double confidence = 0.0;
    //                  model->predict(testSample, predictedLabel, confidence);
    //
    string result_message = format("Predicted class = %d / Actual class
= %d.", predictedLabel, testLabel);
    cout << result_message << endl;
    // Here is how to get the eigenvalues of this Eigenfaces model:
    Mat eigenvalues = model->getMat("eigenvalues");
    // And we can do the same to display the Eigenvectors (read
Eigenfaces):
    Mat W = model->getMat("eigenvectors");
    // Get the sample mean from the training data
    Mat mean = model->getMat("mean");
    // Display or save:
    if(argc == 2) {
            imshow("mean", norm_0_255(mean.reshape(1, images[0].rows)));
    } else {
            imwrite(format("%s/mean.png", output_folder.c_str( )),
norm_0_255(mean.reshape(1, images[0].rows)));
    }
    // Display or save the first, at most 16 Fisherfaces:
    for (int i = 0; i < min(16, W.cols); i++) {
            string msg = format("Eigenvalue #%d = %.5f", i,
eigenvalues.at<double>(i));
            cout << msg << endl;
            // get eigenvector #i
            Mat ev = W.col(i).clone( );
            // Reshape to original size & normalize to [0...255] for imshow.
            Mat grayscale = norm_0_255(ev.reshape(1, height));
            // Show the image & apply a Bone colormap for better sensing.
            Mat cgrayscale;
            applyColorMap(grayscale, cgrayscale, COLORMAP_BONE);
            // Display or save:
            if(argc == 2) {
                    imshow(format("fisherface_%d", i), cgrayscale);
            } else {
                    imwrite(format("%s/fisherface_%d.png",
output_folder.c_str( ), i), norm_0_255(cgrayscale));
            }
    }
    // Display or save the image reconstruction at some predefined
steps:
    for(int num_component = 0; num_component < min(16, W.cols);
num_component++) {
            // Slice the Fisherface from the model:
            Mat ev = W.col(num_component);
            Mat projection = subspaceProject(ev, mean,
images[0].reshape(1,1));
            Mat reconstruction = subspaceReconstruct(ev, mean, projection);
            // Normalize the result:
            reconstruction = norm_0_255(reconstruction.reshape(1,
images[0].rows));
            // Display or save:
            if(argc == 2) {
                    imshow(format("fisherface_reconstruction_%d",
num_component), reconstruction);
            } else {
                    imwrite(format("%s/fisherface_reconstruction_%d.png",
```

EXHIBIT II
Exemplary Computer Code for Gender Determination API

```
output_folder.c_ str( ), num_component), reconstruction);
            }
    }
    // Display if we are not writing to an output folder:
    if(argc == 2) {
            waitKey(0);
    }
    return 0;
}
```

What is claimed is:

1. A non-transitory computer-readable storage medium having one or more computer programs stored thereon, the one or more computer programs operative to be executed by a processor apparatus of a computerized user device, the computerized user device configured for data communication with a digital content delivery network, the one or more computer programs comprising a plurality of instructions which are configured to, when executed on the processor apparatus, cause the computerized user device to:

receive, at the computerized user device via the digital content delivery network, at least one primary digital content asset;

identify whether the at least one primary digital content asset has been previously processed;

based at least in part on an identification that the at least one primary digital content asset has been previously processed, cause access of previously generated characterizing data associated with the at least one primary digital content asset; and based at least in part on an identification that the at least one primary digital content asset has not been previously processed:

at least partially decode the at least one primary digital content asset;

identify at least one user-cognizable digital element within the at least partially decoded at least one primary digital content asset;

perform object analysis on the identified at least one user-cognizable digital element, the object analysis comprising at least identification of one or more shapes associated with the at least one user-cognizable digital element, the at least identification of the one or more shapes at least in part comprising an algorithmic identification of (i) a first shape corresponding to at least a portion of a human being, and (ii) a second shape corresponding to a sub-object at least partially overlapping with the first shape;

generate characterizing data based at least in part on the object analysis, the characterizing data comprising at least data indicative of an object classification associated with at least one of the one or more shapes; and cause storage of at least a portion of the generated characterizing data associated with identifying data for the at least one primary digital content asset.

2. The non-transitory computer-readable storage medium of claim 1, wherein the plurality of instructions are further configured to, when executed on the processor apparatus, cause the computerized user device to:

generate data indicative of an association between (i) the at least portion of the characterizing data, and (ii) at least one secondary digital content element related to the at least one user-cognizable digital element; and cause storage of the data indicative of the association of the at least portion of the characterizing data and the related at least one secondary digital content element in association with the storage of the at least portion of the characterizing data.

3. The non-transitory computer-readable storage medium of claim 2, wherein the plurality of instructions are further configured to, when executed on the processor apparatus, cause the computerized user device to:

utilize the data indicative of the object classification to search secondary content metadata associated with each of a plurality of secondary digital content elements; and based at least on the search of the secondary content metadata, identify the related at least one secondary digital content element from the plurality of secondary content digital elements.

4. The non-transitory computer-readable storage medium of claim 1, wherein the plurality of instructions are further configured to, when executed on the processor apparatus, cause the computerized user device to:

cause utilization of the data indicative of the object classification to search secondary content metadata associated with each of a plurality of secondary digital content elements; and cause generation and storage of data indicative of an association between (i) the at least portion of the characterizing data, and (ii) at least one secondary digital content element selected from the plurality of secondary content elements which is related to the at least one user-cognizable digital element.

5. The non-transitory computer-readable storage medium of claim 1, wherein the identification of whether the at least one primary digital content asset has been previously processed comprises utilization of a media asset comparison algorithm to (i) determine a degree of similarity of the at least one primary digital content asset to one or more previously processed digital media assets, and (ii) determine whether the degree of similarity meets a predetermined at least one criterion of similarity; and wherein the plurality of instructions are further configured to, when executed on the processor apparatus, cause the computerized user device to, based at least in part on a determination that the at least one digital media asset meets the predetermined at least one criterion of similarity, cause storage of data associating the at least one digital media asset to at least one of the one or more previously processed digital media assets at a cloud-based digital content database.

6. The non-transitory computer-readable storage medium of claim 1, wherein:
the at least portion of the human being comprises a head;
the object analysis further comprises performing algorithmic facial recognition on data associated with the head; and
the data indicative of the object classification comprises at least data indicative of an identity of a person associated with the head.

7. The non-transitory computer-readable storage medium of claim 1, wherein:
the object analysis further comprises performing one or more of color analysis or texture analysis on the sub-object; and
the data indicative of the object classification comprises at least data indicative of an object type associated with the sub-object, the data indicative of the object type associated with the sub-object configured to enable identification of at least one secondary content element related to the sub-object.

8. The non-transitory computer-readable storage medium of claim 1, wherein:
the plurality of instructions are further configured to, when executed on the processor apparatus, cause the computerized user device to identify a group of frames of image data within the at least one primary digital content asset in which the at least one user-cognizable digital element is present; and
the object analysis further comprises generation of mapping data for the first shape corresponding to the at least portion of the human being, the mapping data (i) comprising data indicative of a location of the first shape in each of selected ones of the group of frames of image data, and (ii) configured to enable estimation of a location of the second shape corresponding to the sub-object in each of the selected ones of the group of frames of image data.

9. The non-transitory computer-readable storage medium of claim 1, wherein the plurality of instructions are further configured to, when executed on the processor apparatus, cause the computerized user device to:
generate mapping data based at least in part on the object analysis, the mapping data comprising at least data indicative of coordinates of at least a portion of the at least one user-cognizable digital element within selected ones of a plurality of frames of the at least one primary digital content asset; and
cause storage, at the digital content database, of at least a portion of the generated mapping data associated with the identifying data for the at least one primary digital content asset, the at least portion of the mapping data configured to enable generation of a digital augmentation layer for display with the at least one primary digital content asset on one or more of a display device associated with the computerized user device or a display device associated with another computerized user device receiving the at least one primary digital content asset, the digital augmentation layer comprising at least one user-selectable indicator associated with the at least one user-cognizable digital element, the at least one user-selectable indicator configured to enable access to at least one secondary digital content element related to the at least one user-cognizable digital element.

10. The non-transitory computer-readable storage medium of claim 1, wherein the plurality of instructions are further configured to, when executed on the processor apparatus, cause the computerized user device to establish, via the digital content delivery network, a data communication session with a digital content database, the cause of access of the previously generated characterizing data associated with the at least one primary digital content asset comprising cause of access of the previously generated characterizing data at the digital content database, the cause of storage of the at least portion of the generated characterizing data comprising cause of storage of the at least portion of the generated characterizing data at the digital content database.

11. A method for automatically mapping one or more objects in a primary digital content asset via one or more computer programs operative to run on a computerized user device, the computerized user device in data communication with a digital content delivery network, the method comprising:
receiving, at the computerized user device via the digital content delivery network, at least one primary digital content asset, the at least one digital content asset comprising a plurality of frames of image data;
processing, using the one or more computer programs, the at least one primary digital content asset, the processing comprising:
at least partially decoding the at least one primary digital content asset;
identifying at least one user-cognizable digital element within the at least partially decoded at least one primary digital content asset;
performing algorithmic object analysis on the identified at least one user-cognizable digital element in at least one of the plurality of frames of image data, the algorithmic object analysis comprising identifying each of (i) a first shape corresponding to at least a portion of a human being, and (ii) a second shape corresponding to a sub-object overlapping the at least portion of the human being at least in part; and
based at least in part on the algorithmic object analysis, generating mapping data for the at least one of the plurality of frames of image data and one or more others of the plurality of frames of image data, the mapping data comprising data indicative of coordinates of the first shape corresponding the at least portion of the human being in the at least one of the plurality of frames of image data and the one or more others of the plurality of frames of image data, the mapping data configured to (i) enable estimation of a location of the second shape corresponding to the sub-object in at least each of the one or more others of the plurality of frames of image data, and (ii) enable generation of an augmentation layer; and
enabling storage of at least a portion of the generated mapping data associated with identification data for the at least one primary digital content asset.

12. The method of claim 11, further comprising generating data indicative of an association between (i) the at least portion of the mapping data associated with identifying data for the at least one primary digital content asset, and (ii) a secondary digital content element related to at least one of the at least portion of the human being or the sub-object; and
enabling storage, at a network-based digital content database, of the data indicative of the association.

13. The method of claim 12, further comprising:
rendering the at least one primary digital content asset on one or more of a display device associated with the computerized user device or a display device associated with at least one other computerized user device;

based at least in part on the mapping data, generating the augmentation layer, the augmentation layer comprising at least one user-selectable indicator corresponding to the identified at least one user-cognizable digital element; and based at least on data indicative of a user selection of the user-selectable indicator, causing automatic accessing of the at least one secondary digital content element.

14. The method of claim 11, wherein the processing further comprises (i) identifying a group of contiguous frames of image data from the plurality of frames of image data, and (ii) sampling the at least one of the plurality of frames of image data and the one or more others of the plurality of frames of image data from within the group of contiguous frames of image data based at least in part on one or more sampling criteria.

15. The method of claim 14, wherein the at least one of the plurality of frames of image data and the one or more others of the plurality of frames of image data from within the group of contiguous frames of image data based at least in part on the one or more sampling criteria comprises:

evaluating a composition of individual ones of the group of contiguous frames of image data; and sampling each of the at least one of the plurality of frames of image data and the one or more others of the plurality of frames of image data from within the group of contiguous frames of image data based at least on the evaluating, each of the at least one of the plurality of frames of image data and the one or more others of the plurality of frames of image data meeting at least one criterion of dissimilarity in its composition relative to at least one adjacent frame in the group of contiguous frames.

16. The method of claim 11, wherein:

the object analysis further comprises one or more of color analysis, shape analysis, or texture analysis of the sub-object performed on the at least one of the plurality of frames of image data;

the processing further comprises:

generating characterizing data based on the one or more of color analysis, shape analysis, or texture analysis of the sub-object in the first frame; and based at least in part on the characterizing data, enabling selection of the at least one secondary digital content element from a plurality of second digital content elements, the at least one secondary digital content element related to the sub-object; and the method further comprises:

based at least in part on the mapping data, associating the characterizing data with the one or more others of the plurality of frames of image data without performing the one or more of color analysis, shape analysis, or texture analysis of the sub-object thereon; and enabling storage, at a digital content database, of at least a portion of the generated characterizing data associated with the identification data for the at least one primary digital content asset.

17. A method for automatically providing secondary digital content relating to a user-cognizable digital element present in primary digital content via one or more computer programs operative to run on a computerized user device, the computerized user device in data communication with a digital content delivery network, the digital content delivery network comprising at least a digital content database, the method comprising:

receiving, at the computerized user device via the digital content delivery network, the primary digital content, the primary digital content comprising a plurality of frames of digital image data;

processing, via the one or more computer programs operative to run on the computerized user device, the received primary digital content, the processing comprising:

performing object analysis on at least one user-cognizable digital element within the received primary digital content;

generating characterizing data related to the at least one user-cognizable digital element based at least on the object analysis; and generating mapping data corresponding to coordinates of the at least one user-cognizable digital element based at least on the object analysis;

causing transmission, from the computerized user device to the digital content database, of at least a portion of the characterizing data and at least a portion of the mapping data, the transmission enabling storage, at the digital content database, of the at least portion of the generated characterizing data and the at least portion of the mapping data associated with at least identifying data for the primary digital content;

causing rendering of the primary digital content on one or more of a display device associated with the computerized user device or a display device associated with at least one other computerized user device;

enabling utilization of (i) the at least portion of the characterizing data and (ii) the at least portion of the mapping data to generate a digital augmentation layer, the digital augmentation layer comprising at least one user-selectable indicator corresponding to the at least one user-cognizable digital element, the user-selectable indicator configured to enable access to secondary digital content related to the at least one user-cognizable digital element; and based at least in part on receipt of data indicative of a user selection of the user-selectable indicator at one of the computerized user device or the at least one other computerized user device, enabling automatic access to the secondary digital content for the one of the computerized user device or the at least one other computerized user device;

wherein the performing the object analysis comprises algorithmically identifying a first shape and a second shape that are each associated with the at least one user-cognizable digital element, the first shape associated with at least a portion of a user of the computerized user device, the second shape associated with a sub-object, the first and second shapes spatially coinciding at least partly with respect to each other.

18. The method of claim 17, wherein the performing the object analysis on the at least one user-cognizable digital element further comprises:

performing one or more of color analysis, shape analysis, or texture analysis of the at least one user-cognizable digital element in a first frame selected from the plurality of frames of digital image data; and mapping coordinates of the at least one user-cognizable digital element in each of the first frame and selected other ones of the plurality of frames of digital image data, the mapping data enabling association of the characterizing data to the selected other ones of the plurality of frames without performing the one or more of color analysis, shape analysis, or texture analysis of the at least one user-cognizable digital element thereon.

* * * * *